US007656558B2

(12) United States Patent
Kakutani

(10) Patent No.: US 7,656,558 B2
(45) Date of Patent: Feb. 2, 2010

(54) IMAGE PROCESSING SYSTEM, IMAGE PROCESSING DEVICE, IMAGE OUTPUT DEVICE, AND METHOD AND PROGRAM PRODUCT THEREFOR

(75) Inventor: Toshiaki Kakutani, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 599 days.

(21) Appl. No.: 11/192,995

(22) Filed: Jul. 28, 2005

(65) Prior Publication Data
US 2006/0158691 A1 Jul. 20, 2006

(30) Foreign Application Priority Data
Jul. 29, 2004 (JP) ............................. 2004-221414

(51) Int. Cl.
H04N 1/405 (2006.01)
(52) U.S. Cl. .................... 358/3.1; 358/1.1; 358/1.9; 358/3.01; 358/3.03; 358/3.06; 358/3.3; 358/3.23; 358/3.13; 358/534
(58) Field of Classification Search ............... 358/1.1, 358/1.9, 3.01, 3.06, 3.23, 3.13
See application file for complete search history.

(56) References Cited

U.S. PATENT DOCUMENTS

| 5,287,209 | A  | * | 2/1994  | Hiratsuka et al. | ............ | 358/1.9 |
| 5,642,439 | A  | * | 6/1997  | Sato et al.      | ............ | 382/254 |
| 6,252,678 | B1 | * | 6/2001  | Shimizu          | ............ | 358/1.9 |
| 6,801,337 | B2 | * | 10/2004 | Bhaskar et al.   | ............ | 358/1.9 |
| 7,139,096 | B2 | * | 11/2006 | Ishikawa         | ............ | 358/1.8 |
| 7,251,060 | B2 |   | 7/2007  | Tonami et al.    |              |         |
| 7,253,926 | B2 |   | 8/2007  | Ohkawa           |              |         |
| 7,352,908 | B2 | * | 4/2008  | Kodama           | ............ | 382/251 |
| 7,580,156 | B2 | * | 8/2009  | Kakutani         | ............ | 358/3.13 |
| 2006/0227379 | A1 | * | 10/2006 | Kakutani      | ............ | 358/3.01 |

FOREIGN PATENT DOCUMENTS

| JP | 2002-185785 | 6/2002 |
| JP | 2002-185789 | 6/2002 |
| JP | 2003-219153 | 7/2003 |

OTHER PUBLICATIONS

Abstract of Japanese Patent Publication No. 2002-185789, Pub. Date: Jun. 28, 2002, Patent Abstracts of Japan.
Abstract of Japanese Patent Publication No. 2002-185785, Pub. Date: Jun. 28, 2002, Patent Abstracts of Japan.
Abstract of Japanese Patent Publication No. 2003-219153, Pub. Date: Jul. 31, 2003, Patent Abstracts of Japan.

* cited by examiner

Primary Examiner—Mark K Zimmerman
Assistant Examiner—Dung D Tran
(74) Attorney, Agent, or Firm—Martine Penilla & Gencarella, LLP

(57) ABSTRACT

A representative gradation value is set collectively for each pixel group of several pixels each, and then the representative gradation value undergoes multilevel halftoning. From the multilevel halftoning result value obtained in this way, the presence or absence of dot formation for each pixel is set and the image is output. Also, based on the resolution ratio of the image data input resolution and output resolution, if the pixel group is divided, it is possible to divide the pixel group into suitable sizes for processing, so it is possible to improve the output image quality. Furthermore, even when the pixel group is divided, it is possible to share data for processing, so it is possible to save memory. In addition, it is possible to rapidly output high quality images with a simple process.

27 Claims, 46 Drawing Sheets

PRIMARY SCAN DIRECTION

SECONDARY SCAN DIRECTION

Fig.6a

360 × 360dpi

| 97 | 98 | 99 |
|---|---|---|
| 97 | 98 | 99 |
| 96 | 97 | 98 |

Fig.6b

1440 × 720dpi

| 97 | 97 | 97 | 97 | 98 | 98 | 98 | 98 | 99 | 99 | 99 | 99 |
|---|---|---|---|---|---|---|---|---|---|---|---|
| 97 | 97 | 97 | 97 | 98 | 98 | 98 | 98 | 99 | 99 | 99 | 99 |
| 97 | 97 | 97 | 97 | 98 | 98 | 98 | 98 | 99 | 99 | 99 | 99 |
| 97 | 97 | 97 | 97 | 98 | 98 | 98 | 98 | 99 | 99 | 99 | 99 |
| 96 | 96 | 96 | 96 | 97 | 97 | 97 | 97 | 98 | 98 | 98 | 98 |
| 96 | 96 | 96 | 96 | 97 | 97 | 97 | 97 | 98 | 98 | 98 | 98 |

Fig.6c

720 × 720dpi

| 97 | 97 | 98 | 98 | 99 | 99 |
|---|---|---|---|---|---|
| 97 | 97 | 98 | 98 | 99 | 99 |
| 97 | 97 | 98 | 98 | 99 | 99 |
| 97 | 97 | 98 | 98 | 99 | 99 |
| 96 | 96 | 97 | 97 | 98 | 98 |
| 96 | 96 | 97 | 97 | 98 | 98 |

Fig.9a

| 97 | 97 | 97 | 97 | 98 | 98 | 98 | 98 |
|----|----|----|----|----|----|----|----|
| 97 | 97 | 97 | 97 | 98 | 98 | 98 | 98 |
| 97 | 97 | 97 | 97 | 98 | 98 | 98 | 98 |
| 97 | 97 | 97 | 97 | 98 | 98 | 98 | 98 |

Fig.9b

| 1   | 177 | 58  | 170 | 70  | 186 | 79  | 161 |
|-----|-----|-----|-----|-----|-----|-----|-----|
| 255 | 109 | 212 | 42  | 242 | 5   | 223 | 48  |
| 123 | 33  | 127 | 181 | 83  | 155 | 105 | 140 |
| 219 | 91  | 237 | 22  | 121 | 198 | 61  | 188 |

| 3 | 4 |
|---|---|
| 3 | 2 |

Fig.10a
| 3 | 4 |
|---|---|
| 3 | 2 |
Fig.10b
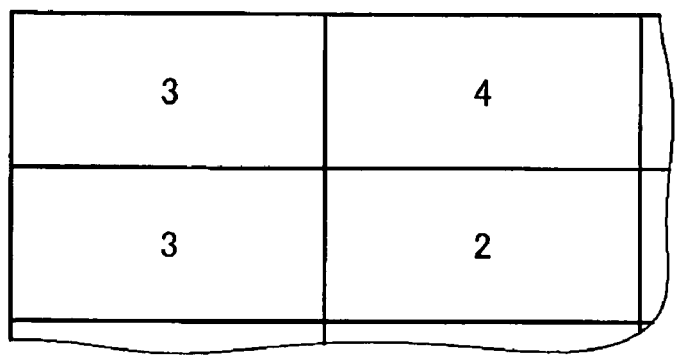
Fig.10c
Fig.10d
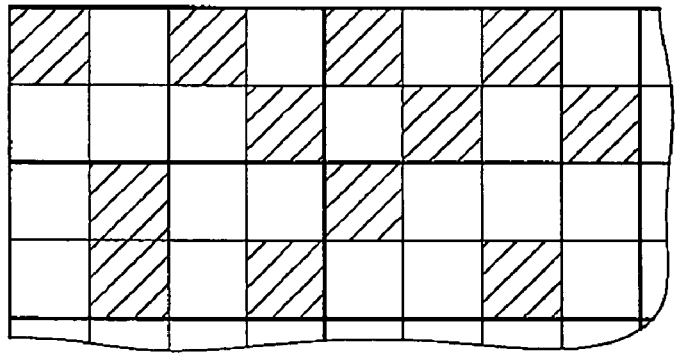

Fig.15a
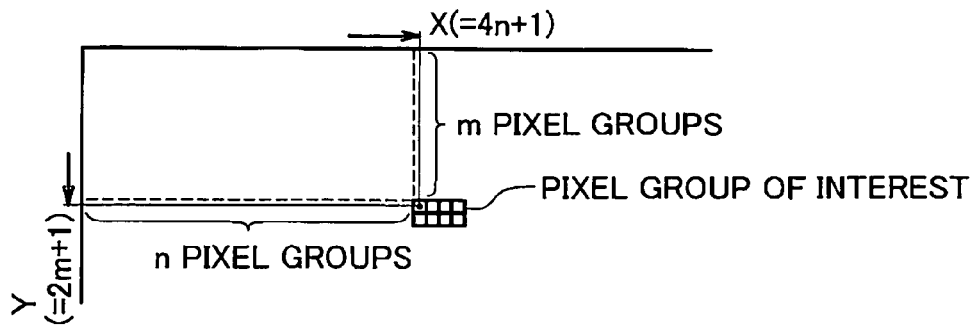
Fig.15b
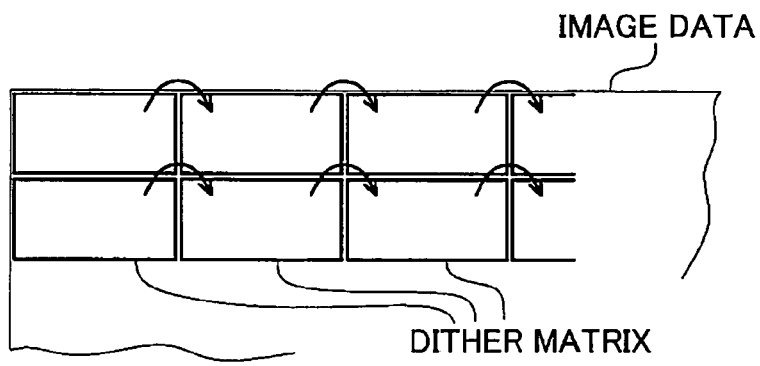
Fig.15c
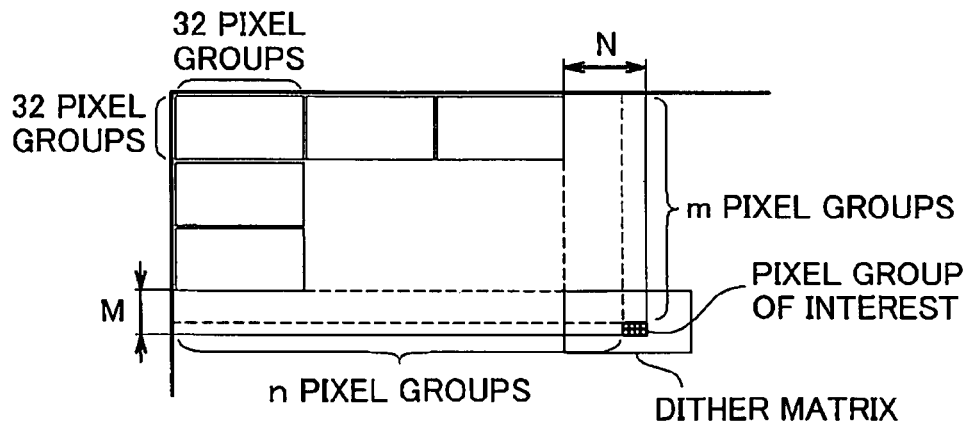
Fig.15d
$$\begin{cases} N = n - \text{int}(n/32) \times 32 + 1 \\ M = m - \text{int}(m/32) \times 32 + 1 \end{cases}$$

Fig.16

(a) X : [1][2][3][4][5][6][7][8][9][10]
⟩ 2 BIT SHIFT RIGHTWARD (b) n : [0][0][1][2][3][4][5][6][7][8]
⟩ 5 BIT SHIFT RIGHTWARD (c) int (n/32) : [0][0][0][0][0][0][0][1][2][3]
⟩ 5 BIT SHIFT LEFTWARD (d) int (n/32) × 32 : [0][0][1][2][3][0][0][0][0][0]

(e) n − int (n/32) × 32 : [0][0][0][0][0][4][5][6][7][8]

(f) MASK DATA : [0][0][0][0][0][1][1][1][1][1]

(g) MASK DATA : [0][0][0][1][1][1][1][1][0][0]

Fig.17

| | REPRESENTATIVE GRADATION VALUE | | | | | | | 253 | 254 | 255 |
|---|---|---|---|---|---|---|---|---|---|---|
| | 0 | 1 | 2 | 3 | 4 | 5 | ••• | | | |
| CLASSIFICATION NUMBER 1 | 0 | 1 | 1 | 1 | 1 | 1 | | 7 | 7 | 8 |
| 2 | 0 | 0 | 0 | 0 | 0 | 1 | | 8 | 8 | 8 |
| 3 | 0 | 0 | 0 | 0 | 0 | | | 8 | 8 | 8 |
| 4 | 0 | 0 | 0 | 0 | | | | | 8 | 8 |
| 5 | 0 | 0 | 0 | 0 | | | | | 8 | 8 |
| 6 | 0 | 0 | 0 | | | | | | 8 | 8 |
| 7 | 0 | 0 | | | | | | | | |
| 8 | 0 | | | | | | | | | |
| 9 | 0 | | | | | | | | | |
| 10 | | | | | | | | | | |

↓
UP TO NUMBER 1024

Fig.23a
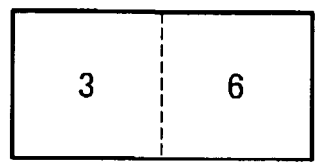
Fig.23b
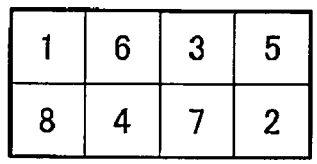
Fig.23c
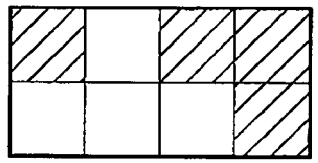
Fig.24
|  | | MULTILEVEL HALFTONING RESULT VALUES | | | | | | | |
|---|---|---|---|---|---|---|---|---|---|
|  |  | 0 | 1 | 2 | 3 | 4 | 5 | 6 | 7 | 8 |
| SEQUENCE VALUES | 1 | 0 | 1 | 1 | (1) | 1 | 1 | 1 | 1 | 1 |
|  | 2 | 0 | 0 | 1 | 1 | 1 | 1 | [1] | 1 | 1 |
|  | 3 | 0 | 0 | 0 | 1 | 1 | 1 | [1] | 1 | 1 |
|  | 4 | 0 | 0 | 0 | (0) | 1 | 1 | 1 | 1 | 1 |
|  | 5 | 0 | 0 | 0 | 0 | 0 | 1 | [1] | 1 | 1 |
|  | 6 | 0 | 0 | 0 | (0) | 0 | 0 | 1 | 1 | 1 |
|  | 7 | 0 | 0 | 0 | 0 | 0 | 0 | [0] | 1 | 1 |
|  | 8 | 0 | 0 | 0 | (0) | 0 | 0 | 0 | 0 | 1 |

Fig.26a
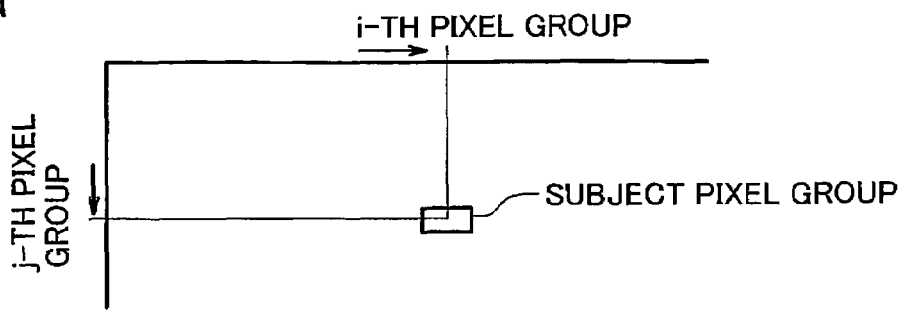
Fig.26b
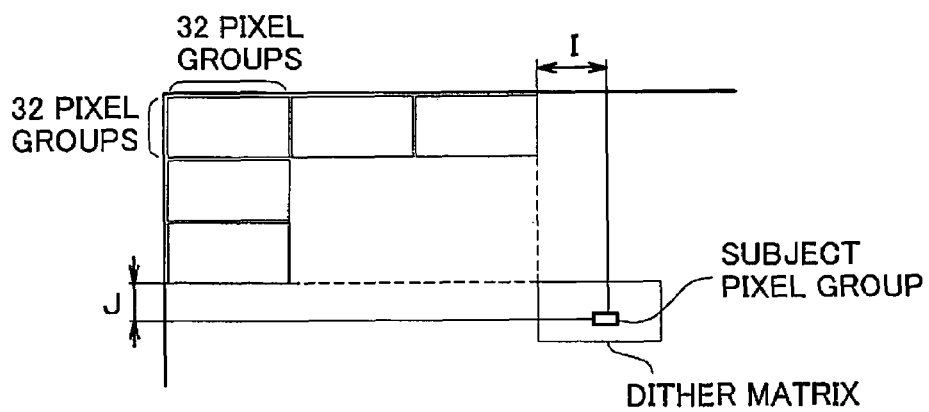
Fig.26c
$$\begin{cases} I = i - \text{int}(i/32) \times 32 \\ J = j - \text{int}(j/32) \times 32 \end{cases}$$
Fig.27
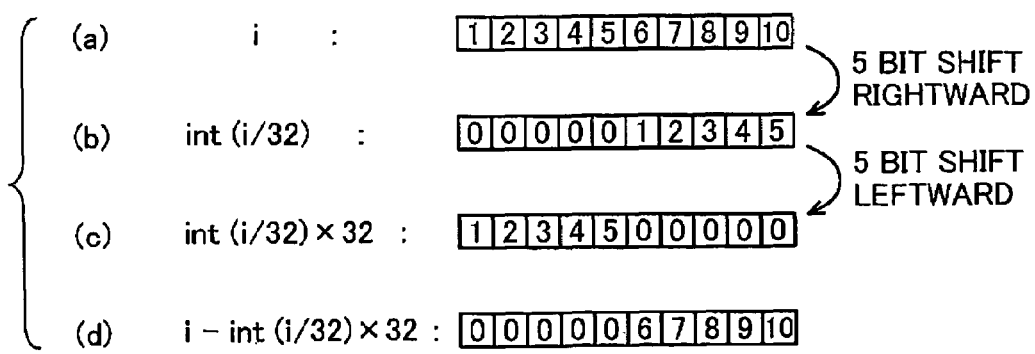

Fig.28
| | | \multicolumn{7}{c}{MULTILEVEL HALFTONING RESULT VALUES} |
|---|---|---|---|---|---|---|---|---|
| | | 0 | 1 | 2 | 3 | 4 | 5 | 6 |
| CLASSIFICATION NUMBER | 1 | DD(1,0) | DD(1,1) | DD(1,2) | DD(1,3) | DD(1,4) | DD(1,5) | DD(1,6) |
| | 2 | DD(2,0) | DD(2,1) | DD(2,2) | DD(2,3) | DD(2,4) | DD(2,5) | |
| | 3 | DD(3,0) | DD(3,1) | DD(3,2) | DD(3,3) | DD(3,4) | DD(3,5) | |
| | 4 | DD(4,0) | DD(4,1) | DD(4,2) | DD(4,3) | DD(4,4) | DD(4,5) | |
| | 5 | DD(5,0) | DD(5,1) | DD(5,2) | DD(5,3) | DD(5,4) | | |
| | 6 | DD(6,0) | DD(6,1) | DD(6,2) | | | | |
| | 7 | | | | | | | |
↓
UP TO NUMBER 1024
Fig.29a
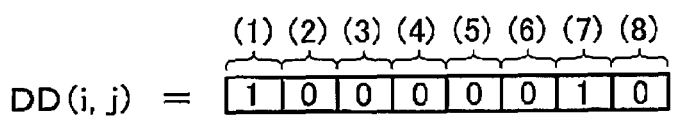
Fig.29b
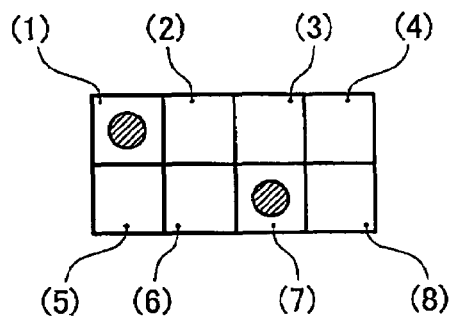

| (LARGE, MEDIUM, SMALL)=(1,2,1) | (0,4,0) | (0,3,1) | |
|---|---|---|---|
| (0,3,0) | (0,2,1) | (1,1,0) | |
| (0,2,3) | (1,2,1) | (0,3,0) | |

| DOT COUNT | | | MULTILEVEL HALFTONING RESULT VALUE |
|---|---|---|---|
| LARGE | MEDIUM | SMALL | |
| 0 | 0 | 0 | 0 |
| 0 | 0 | 1 | 1 |
| 0 | 0 | 2 | 2 |
| 7 | 0 | 0 | 161 |
| 7 | 0 | 1 | 162 |
| 7 | 1 | 0 | 163 |
| 8 | 0 | 0 | 164 |

UP TO NUMBER 1024

| 8-BIT DATA | DATA CONTENTS | 8-BIT DATA | DATA CONTENTS |
|---|---|---|---|
| 0 | MULTILEVEL HALFTONING RESULT VALUE | 128 | MULTILEVEL HALFTONING RESULT VALUE |
| 1 | | ⋮ | |
| 2 | | ⋮ | |
| 3 | | 164 | |
| 4 | | 165 | EMPTY |
| ⋮ | | ⋮ | |
| ⋮ | | ⋮ | |
| 126 | | 254 | |
| 127 | | 255 | ESC CODE |

| MULTILEVEL HALFTONING RESULT VALUE | INTERMEDIATE DATA | CORRESPONDING DOT COUNT | | |
|---|---|---|---|---|
| | | LARGE | MEDIUM | SMALL |
| 0 | 00000000 | 0 | 0 | 0 |
| 1 | 00000001 | 0 | 0 | 1 |
| 2 | 00000011 | 0 | 0 | 2 |
| 3 | 00000111 | 0 | 0 | 3 |
| 160 | 22333333 | 6 | 2 | 0 |
| 161 | 03333333 | 7 | 0 | 0 |
| 162 | 13333333 | 7 | 0 | 1 |
| 163 | 23333333 | 7 | 1 | 0 |
| 164 | 33333333 | 8 | 0 | 0 |

Fig.46a
(1) (2) (3) (4) (5) (6) (7) (8)
DD(i, j) = | 1 | 1 | 0 | 0 | 1 | 0 | 0 | 0 | 0 | 0 | 0 | 1 | 0 | 0 | 1 | 0 |
Fig.46b
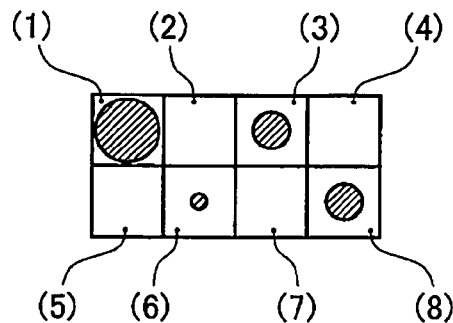
Fig.47
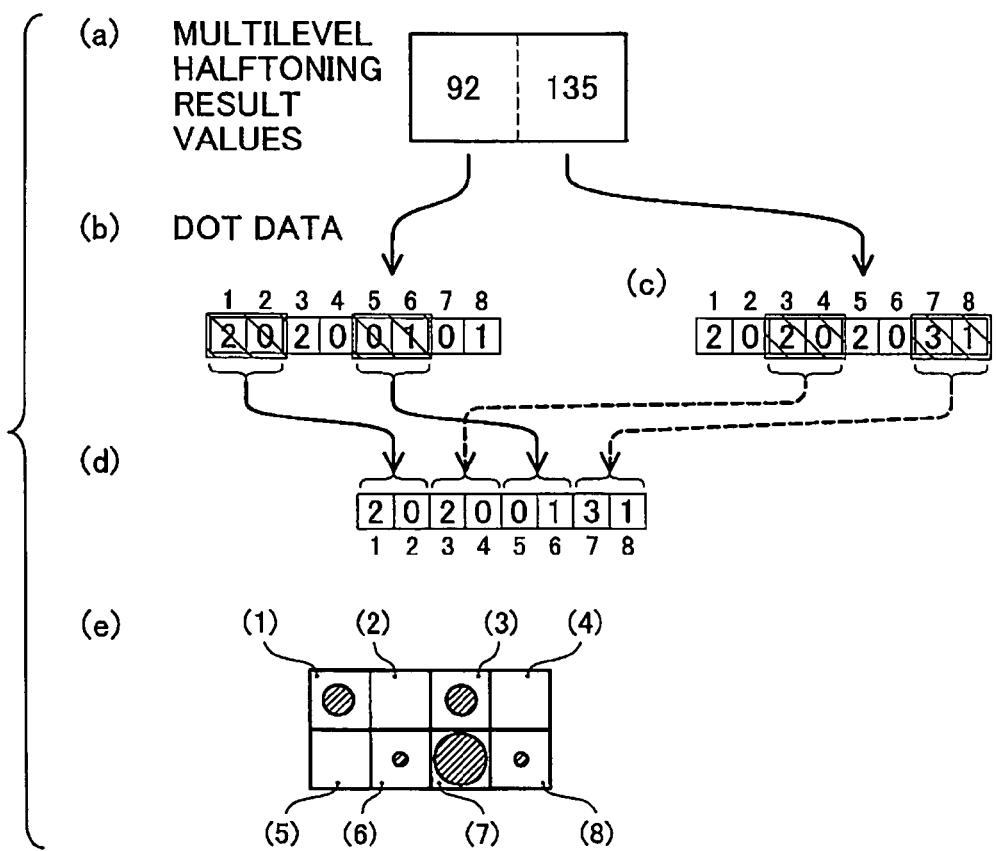

UP TO NUMBER 1024

Fig.51

| 5-BIT DATA | DATA CONTENTS | 5-BIT DATA | DATA CONTENTS |
|---|---|---|---|
| 0 | MULTILEVEL HALFTONING RESULT VALUES | 16 | MULTILEVEL HALFTONING RESULT VALUES |
| 1 | | 17 | |
| 2 | | ⋮ | |
| ⋮ | | ⋮ | |
| 14 | | 29 | |
| 15 | | 30 | EMPTY |
| | | 31 | ESC CODE |

| CLASSIFICATION NUMBER | MULTILEVEL HALFTONING RESULT VALUES | | | | | | |
|---|---|---|---|---|---|---|---|
| | 0 | 1 | 2 | 3 | 4 | 5 | 6 |
| 1 | DD(1,0) | DD(1,1) | DD(1,2) | DD(1,3) | DD(1,4) | DD(1,5) | DD(1,6) |
| 2 | DD(2,0) | DD(2,1) | DD(2,2) | DD(2,3) | DD(2,4) | DD(2,5) | D |
| 3 | DD(3,0) | DD(3,1) | DD(3,2) | DD(3,3) | DD(3,4) | DD(3,5) | |
| 4 | DD(4,0) | DD(4,1) | DD(4,2) | DD(4,3) | DD(4,4) | DD(4,5) | |
| 5 | DD(5,0) | DD(5,1) | DD(5,2) | DD(5,3) | DD(5,4) | | |
| 6 | DD(6,0) | DD(6,1) | DD(6,2) | DD(6 | | | |
| 7 | DD(7 | | | | | | |

UP TO NUMBER 1024

Fig.57

Fig.58
MULTILEVEL HALFTONING RESULT VALUE: 10
CLASSIFICATION NUMBER 1
1 LARGE DOT
2 MEDIUM DOTS
1 SMALL DOT
CLASSIFICATION NUMBER 2
0 LARGE DOTS
1 MEDIUM DOT
2 SMALL DOTS
SERIAL NUMBER 1
| 1 | 177 | 58 | 170 |
|---|-----|----|-----|
| 255 | 109 | 212 | 42 |
SERIAL NUMBER 2
| 70 | 186 | 79 | 161 |
|----|-----|----|-----|
| 242 | 5 | 223 | 48 |
CLASSIFICATION NUMBER 1
(1) (2) (3) (4)
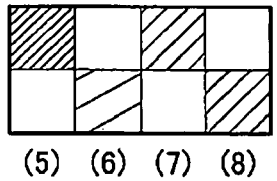
(5) (6) (7) (8)
CLASSIFICATION NUMBER 2
(1) (2) (3) (4)
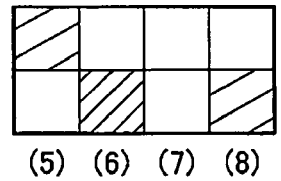
(5) (6) (7) (8)
DD(1,10)
| 3 | 0 | 2 | 0 | 0 | 1 | 0 | 2 |
|---|---|---|---|---|---|---|---|
(1) (2) (3) (4) (5) (6) (7) (8)
DD(2,10)
| 1 | 0 | 0 | 0 | 0 | 2 | 0 | 1 |
|---|---|---|---|---|---|---|---|
(1) (2) (3) (4) (5) (6) (7) (8)

_US 7,656,558 B2_

IMAGE PROCESSING SYSTEM, IMAGE PROCESSING DEVICE, IMAGE OUTPUT DEVICE, AND METHOD AND PROGRAM PRODUCT THEREFOR

CLAIM OF PRIORITY

The present application claims priority from Japanese application P2004-221414A filed on Jul. 29, 2004, the content of which is hereby incorporated by reference into this application.

BACKGROUND

1. Field of the Invention

The present invention relates to technology that outputs an image based on image data, and more specifically relates to technology that outputs an image by performing a specified image process on image data and generating dots at a suitable density.

2. Description of the Related Art

Image output devices that output images by forming dots on various types of output media such as printing media or a liquid crystal screen are widely used as output devices for various types of imaging equipment. With these image output devices, images are handled in a state finely divided into small areas called pixels, and dots are formed on these pixels. When dots are formed on pixels, of course when looking at the pixels one at a time, the only possible states are that a dot is formed or isn't formed. However, when looking at an area having a certain level of width, it is possible that looseness and denseness will occur with the density of the formed dots, and it is possible to output a multi gradation image by changing the dot formation density. For example, when forming black ink dots on printing paper, areas at which dots are formed densely look dark, and conversely, areas at which dots are formed sparsely look light. Also, when bright spot dots are formed on a liquid crystal screen, areas at which dots are formed densely look light, and conversely, areas at which dots are formed sparsely look dark. Therefore, if suitable control is done on the dot formation density, it is possible to output a multi gradation image. In this way, the data for controlling dot formation so as to obtain a suitable formation density is generated by performing specified image processing on an image to be output.

In recent years, there has been demand for higher image quality and larger images for the output images with these image output devices. For the demand for higher quality images, dividing the image into finer pixels is effective. If the pixels are made smaller, the dots formed on the pixels do not stand out, so it is possible to improve the image quality. Also, for the demand for larger images, this can be handled by increasing the pixel count. Of course, it is possible to enlarge the output image even by making each pixel bigger, but this may cause a decrease in image quality, so for the demand for larger size, it is effective to increase the pixel count.

It stands to reason that when the number of pixels that form an image is increased, image processing takes time, and outputting an image rapidly is difficult. In light of this, technology has been proposed that makes it possible to execute image processing rapidly (Unexamined Patent No. 2002-185789).

However, even if the image processing is performed rapidly, when it takes time to transfer image data or to transfer already processed image data, there are inherent limits to the acceleration effect on image output.

Also, in recent years, there is a demand of wanting to directly supply data of images taken by a digital camera or the like to an image output device such as a printing device or the like to be able to output the image immediately. In this kind of case, it is not possible to perform image processing using an image processing device equipped with high processing performance such as a so-called personal computer or the like. Therefore, it is necessary to have a simple image process for which execution is possible on either the image shooting device such as the digital camera or the image output device, or divided between both. Furthermore, even when the resolution is converted during image output, there is demand that image processing can be handled flexibly for this.

SUMMARY

This invention was created to address the problems of the prior art described above, and its purpose is to provide simple image processing technology which, while maintaining sufficient output image quality, is able to execute image processing and data transfer at high speed, and is able to do flexible handling even during resolution conversion.

To address at least part of the problems described above, the image processing system of the present invention uses the following constitution. Specifically, the gist is:

An image processing system that performs specified image processing on image data of a first resolution, and outputs dot data to form dots at a second resolution on a medium based on the results of the image processing, comprising:

encoding preparation unit that prepares a plurality of types in advance of encoding correlations to obtain the code values correlated to the results of multilevel halftoning for each pixel constituting the pixel group based on the representative gradation value that is the gradation value representing the pixel group consisting of a specified number of consecutive pixels;

division determination unit that determines whether or not the sequentially fetched pixel groups from the image data are divided into a plurality of areas and processed based on the first resolution and the second resolution;

representative gradation value setting unit that sets the representative gradation value for the entire pixel group when it is determined to process the pixel group without dividing, and that sets the respective representative gradation values for each area into which the pixel group is divided when it is determined to process the pixel group divided into a plurality of areas;

encoding unit that, using the set representative gradation value, obtains the code value for each of the representative gradation values by referencing the encoding correlation allocated to the pixel group that is any one of the plurality of types of encoding correlations;

decoding preparation unit that correlates the decoding correlation for obtaining the output dot arrangement representing the presence or absence of formation of dots for each pixel within the pixel group to the encoding correlation from the code that has a specific range of values and prepares a plurality of types in advance;

decoding unit that references the decoding correlation corresponding to the encoding correlation allocated to the pixel group based on the obtained code value, and obtains the output dot arrangement corresponding to either the representative gradation value for the entire pixel group or the representative gradation values for each of the areas;

dot arrangement setting unit that synthesizes the applicable obtained output dot arrangement if the obtained output dot arrangement corresponds to the entire pixel group, synthesizes the dot arrangement corresponding to each of the areas of the obtained output dot arrangement if it corresponds to each of the areas, and sets the output dot arrangement for each pixel constituting the pixel group; and output unit that outputs the set output dot arrangement as dot data.

The inventors of this invention also invented the image processing method of the present invention corresponding to the image processing system noted above as well as the invention of a program product on which that method is recorded on a recording medium.

For the image processing system and the image processing method of this invention, first, it is determined whether or not to divide the pixel group for processing based on the first resolution for the image data and the second resolution when outputting the image. When doing this, it is also possible to make a determination using the first and second resolution ratio. Moreover, making a determination based on the resolution ratio is not limited to making a determination based on the resolution ratio calculated from the image data resolution and the image output resolution, but can also be making a determination based on some kind of index reflecting the resolution ratio. Then, the code value corresponding to the multilevel halftoning results is set for each pixel group when processing without dividing the pixel group, and on the other hand, is set for each area in which the pixel group is divided when dividing the pixel group and processing. The code value correlated to the multilevel halftoning results is set by referencing the encoding correlations prepared in advance. A code value correlated to the representative gradation values and the multilevel halftoning results obtained by multilevel halftoning the representative gradation values is associated with the encoding correlation, so it is possible to rapidly set the code value by referencing the multilevel halftoning correlation.

Moreover, various formats can be used if the representative gradation value and the pixel group are set as the encoding correlation, and if one code value is set according to that, for example, it is possible to use a format such as a correspondence chart, a function expression, or the like. Alternatively, as described later, it is also possible to use a format whereby a threshold value for comparing to the representative gradation value is stored for setting the code value. Also, since the representative gradation value and the code value are associated with the encoding correlation, the code value can be set as a result value that can first be interpreted when combined with the pixel group with which that code value was obtained, and also possible to set it as a value that can only be interpreted by the code value, and not using the pixel group.

Next, from this code value, the output dot arrangement at which the dots are formed within the pixel group is obtained for each pixel in the pixel group. When doing this, the decoding correlations sequenced in advance and correlated to the encoding correlation are referenced. As this kind of decoding correlation, when the encoding correlation is number data indicating the number of dots formed within the pixel group, it is also possible to prepare this as a sequence value indicating the sequence in which dots are formed within the pixel group. As a method for specifying the sequence value for each pixel group, it is possible to use various methods, but, for example it is possible to store in advance the sequence value of each pixel for each pixel group, and read the stored sequence values.

The method of setting the presence or absence of dot formation for each pixel within a pixel group from the dot formation number and sequence values that is the method of obtaining the output dot arrangement from the code value is described. First, when processing without dividing the pixel group, the presence or absence of dot formation of each pixel is set based on the dot number and sequence value obtained for the concerned pixel group. The detailed principle is described later, but the reason that it is possible to set the presence or absence of dot formation for each pixel within a pixel group from the pixel group dot formation count and the sequence values is because of the following.

The dot formation count is set based on the representative gradation value of the pixel group. If the dot formation sequence number (sequence value) is given within a plurality of pixels that are in a pixel group, it is possible to set on which of the pixels within the pixel group to form those dots from the number of dots to be formed in the pixel group. From this kind of reason, if the dot formation number of the pixel group and the sequence value for each pixel within the pixel group are known, it is possible to set the presence or absence of dot formation for each pixel within that pixel group.

Meanwhile, when the pixel group is divided and processed, the presence or absence of dot formation for each pixel in an area is set based on the dot formation number and sequence values obtained for each area within the pixel group. Specifically, from the fact that the dot formation count is obtained for each area that the pixel group is divided into, the sequence values specified for each pixel in the pixel group and the dot formation count obtained for each area are combined, and the presence or absence of dot formation for each pixel of each area is set. The reason that this is possible can be understood from considering the following.

As described above, if the pixel group dot formation count and sequence values are known, it is possible to set the presence or absence of dot formation for each pixel within a pixel group. In light of this, even when the dot formation count is obtained for each area, the presence or absence of dot formation for all the pixels within the pixel group is set once. After that, if the setting results for each pixel in the subject area are extracted, it should be possible to obtain the presence or absence for dot formation for each pixel in the area from that area dot formation count and the pixel group sequence values. In fact, the procedure for setting the presence or absence of dot formation for each area from each area dot formation count and sequence values is not limited to this kind of procedure. However, due to the reasons described above, it is possible to set the presence or absence of dot formation for each pixel within the area from the dot formation count obtained for each area.

This kind of setting of the presence or absence of dot formation for each pixel, in addition to using the dot formation count and the sequence values, can also be realized using a method such as by referencing the encoding correlations and the decoding correlations to directly set the dot arrangement on each pixel in the pixel group. It is also possible to have an image processing system that works up to finding the output dot arrangement and outputting the dot data, but to form the image by forming dots based on further obtained setting results. For example, if dots are formed on a medium such as a printing medium or a liquid crystal screen, images will be output onto these media.

The details will be described later, but when compared to the data expressing the presence or absence of dot formation for all the pixels of an image, it is possible to express the code value with a very small data volume. Because of this, it is possible to handle data rapidly, and thus it is possible to output images rapidly. Furthermore, when encoding representative gradation values, by performing this while referencing the encoding correlations, it is possible to also do processing rapidly.

Note that suitable values of pixel counts obtained as the pixel group often depend on the resolution ratio of the image data resolution and the image output resolution. In light of this, if processing with division of the pixel group and processing without dividing are switched according to the resolution ratio, it becomes possible to process a suitable pixel count as one batch, making it possible to improve the image quality. Furthermore, normally, when the size of the pixel group is changed, the referenced multilevel halftoning correlations, sequence values, and the like must also be changed. However, if dividing the pixel group and processing, the pixel group size itself is not changed, so while the multilevel halftoning correlations, sequence values and the like are shared when dividing and when not dividing, it is possible to have the same processing contents. In this way, since it is possible to share processing contents, referenced data, or the like, it is also possible to handle this with flexibility even when the resolution is converted when outputting an image.

Furthermore, the process to generate the code value can be simple processing contents of referencing the preset correlations. Because of this, even for equipment that does not have high level processing capability such as a computer or the like, it is possible to process at a sufficiently practical speed. Therefore, it is also possible to output a suitable image by directly supplying image data to the image output device without going through a computer or the like, and by implementing these imaging processes on the image data inside the image output device, for example.

Moreover, when the code value is generated or when the presence or absence of dot formation is set for each pixel, it is also possible to identify the pixel group using a classification number. If identifying the pixel groups using a classification number, it is possible to suitably identify each pixel group without needlessly increasing the types of pixel groups. Moreover, it is also possible to give the classification number for identifying the pixel group according to the position of the pixel group in the image. In this way, by giving a suitable classification number according to the position in the image, it is possible to generate dots suitably to output a high image quality image.

For the image processing system and the image processing method described above, it is also possible to grasp these as an image processing device for up to receiving the image data and obtaining the code value, as an image output device for up to receiving the code value and outputting dot data based on this, and as a combined relationship for the respective image processing system and image processing method.

The gist of the invention of this kind of image processing device is:

An image processing device that processes image data of a first resolution, the image processing device sending control data obtained by processing the image data to an image output device that outputs an image for which dots are formed at a second resolution, comprising:

encoding preparation unit that prepares a plurality of types in advance of encoding correlations to obtain the code values correlated to the results of multilevel halftoning for each pixel constituting the pixel group based on the representative gradation value that is the gradation value representing the pixel group consisting of a specified number of consecutive pixels;

division determination unit that determines whether or not the sequentially obtained pixel groups from the image data are divided into a plurality of areas and processed based on the first resolution and the second resolution;

representative gradation value setting unit that sets the representative gradation value for the entire pixel group when it is determined to process the pixel group without dividing, and that sets the respective representative gradation values for each area into which the pixel group is divided when it is determined to process the pixel group divided into a plurality of areas;

encoding unit that, using the set representative gradation value, obtains the code value for each of the representative gradation values by referencing the encoding correlation allocated to the pixel group that is any one of the plurality of types of encoding correlations; and control data sending unit that sends the code value as the control data to the image output device. It is also possible to visualize an invention of the image processing method corresponding to this.

The gist of the invention of the image output is also:

An image output device that receives a code value obtained with performance of multilevel halftoning processing on image data that has a pixel group consisting of a plurality of pixels as a unit, and converts this to data of the dots to be formed on the medium;

the code value is generated by referencing one correlation selected from a plurality of encoding correlations prepared in advance for the multilevel halftoning results of the representative gradation value that is the gradation value representing the pixel group and each pixel constituting the pixel group, based on the representative gradation value that represents the gradation of the pixel group or the gradation of each area for which the pixel group is divided into a plurality;

and the image output device comprises:

decoding preparation unit that receives a code value that has a specified range of values, correlates the decoding correlation for obtaining the output dot arrangement representing the presence or absence of formation of dots for each pixel within the pixel group to the encoding correlation from the code value, and prepares a plurality of types in advance;

decoding unit that references the decoding correlation corresponding to the encoding correlation allocated to the pixel group based on the obtained code value, and obtains the output dot arrangement corresponding to either the representative gradation value of the entire pixel group or the representative gradation values for each of the areas;

dot arrangement setting unit that synthesizes the applicable obtained output dot arrangement if the obtained output dot arrangement corresponds to the entire pixel group, synthesizes the dot arrangement corresponding to each of the areas of the obtained output dot arrangement if it corresponds to each of the areas, and sets the output dot arrangement for each pixel constituting the pixel group; and output unit that outputs the set output dot arrangement as dot data. Note that it is also possible to visualize an invention of an image conversion method corresponding to this image output device.

Furthermore, it is possible to grasp this as an invention of a program product that realizes these methods using a computer. If each of the various functions described above is realized using a computer with the program code recorded on a recording medium that forms this kind of program product read into the computer, it is possible to receive the image data rapidly and to output a high image quality image rapidly.

BRIEF DESCRIPTION OF THE DRAWINGS

FIG. 6a through FIG. 6c are explanatory drawings conceptually showing the state of performing the resolution conversion process.

FIG. 9a through FIG. 9d are explanatory drawings showing the state of converting image data using the dither method to data representing the presence or absence of dot formation.

FIG. 10a to FIG. 10d are explanatory drawings showing the state of generating data representing the presence or absence of dot formation for each pixel from the dot count data.

FIG. 15a through FIG. 15d are explanatory drawings showing the method for setting the classification number for each pixel group.

FIG. 16 is an explanatory drawing specifically showing the method of setting the classification number of the pixel group of interest.

FIG. 17 is an explanatory drawing conceptually showing a multilevel halftoning table referenced with the multilevel halftoning result value generating process of the first embodiment.

FIG. 23a through FIG. 23c are explanatory drawings conceptually showing the state of setting the presence or absence of dot formation for each pixel in a pixel group based on the multilevel halftoning result value and the sequence value matrix.

FIG. 24 is an explanatory drawing conceptually showing the conversion table referenced with the process of setting the presence or absence of dot formation of the first embodiment.

FIG. 26a through FIG. 26c are explanatory drawings showing the method of setting the classification number of a pixel group.

FIG. 27 is an explanatory drawing specifically showing the method for finding the position within a dither matrix of a pixel group from the coordinate values of the pixel group.

FIG. 28 is an explanatory drawing conceptually showing a decoding table referenced with the process of setting the presence or absence of dot formation for a variation example of the first embodiment.

FIG. 29a and FIG. 29b are explanatory drawings showing the data structure of the dot data set in the decoding table of the first embodiment.

FIG. 46a and FIG. 46b are explanatory drawings showing the data structure of the dot data set in the decoding table of the second embodiment.

FIG. 47 is an explanatory drawing showing the state of setting the presence of absence of dot formation for each pixel in the pixel group from a plurality of dot data.

FIG. 51 is an explanatory drawing showing the state of correlation of the multilevel halftoning result value and the ESC code showing the division status to 5-bit data.

FIG. 57 is an explanatory drawing conceptually showing the threshold value table referenced for the multilevel halftoning result value generating process of a variation example of the third embodiment.

FIG. 58 is an explanatory drawing showing the state of setting the decoding table for the third embodiment.

DESCRIPTION OF THE PREFERRED EMBODIMENTS

Following, to more clearly describe the operation and effect of this invention, aspects of embodiments of the invention are described according to the kind of sequence that follows.

Figure 1:
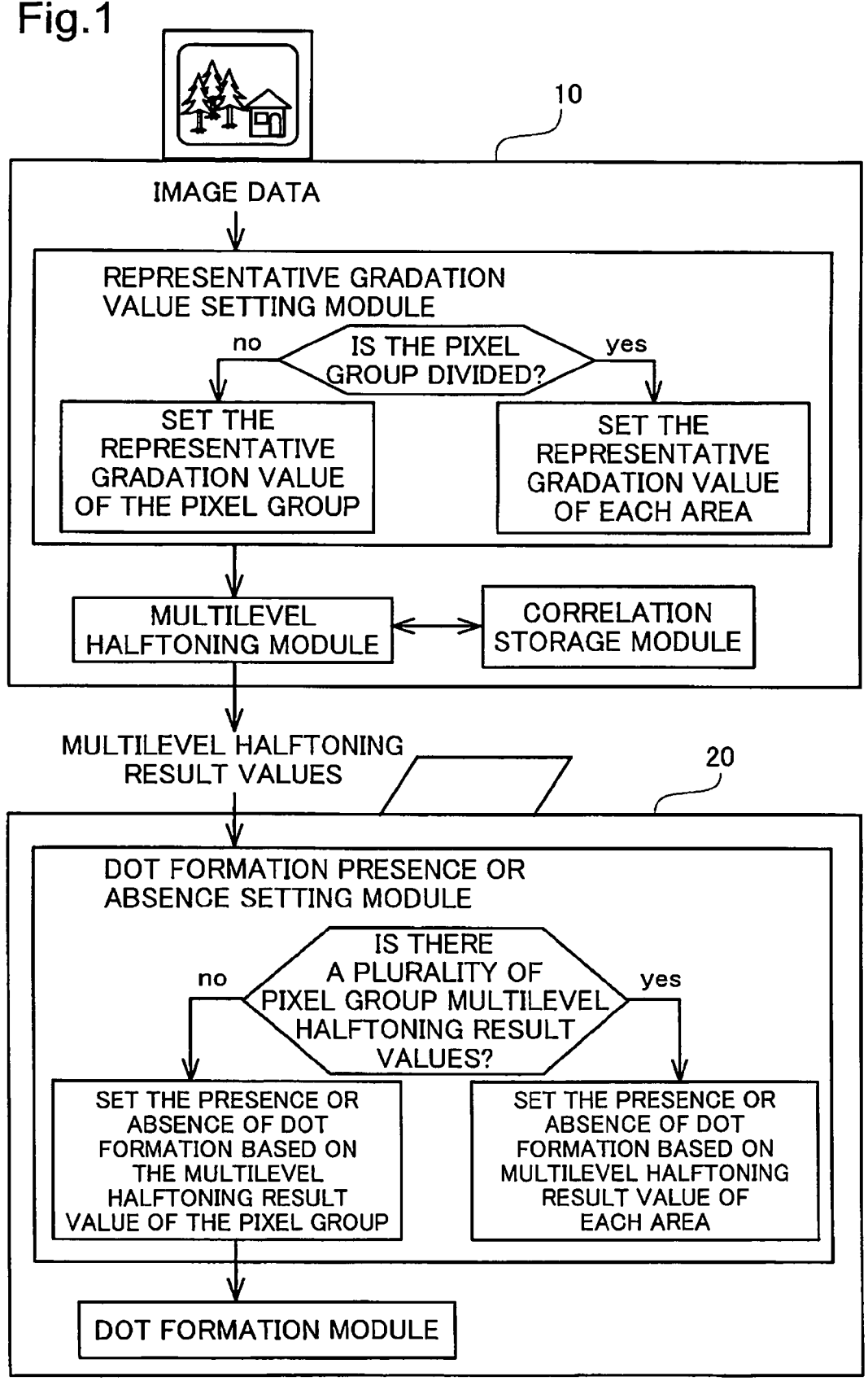
FIG. 1 is an explanatory drawing explaining the summary of this embodiment using a printing system as an example.

A. Summary of the Embodiments:
B. Device Constitution:
C. Summary of the Image Printing Process of the First Embodiment:
   C-1. Principle by Which the Pixel Position Can Be Set by the Number Data:
   C-2. Multilevel Halftoning Result Value Generating Process of the First Embodiment:
   C-3. Classification Number Setting Method:
   C-4. Multilevel Halftoning Table:
   C-5. Multilevel Halftoning Result Value Data Format:
   C-6. Dot Formation Presence or Absence Setting Process of the First Embodiment:
   C-7. Variation Example of the First Embodiment:
D. Second Embodiment:
   D-1. Summary of the Image Printing Process of the Second Embodiment:
   D-2. Multilevel Halftoning Result Value Generating Process of the Second Embodiment:
      D-2-1. Process of Setting the Large, Medium and Small Dot Formation Count Using the Dither Method:
      D-2-2. Contents of the Multilevel Halftoning Result Value Generating Process of the Second Embodiment:
   D-3. Dot Formation Presence or Absence Setting Process of the Second Embodiment:
   D-4. Variation Example of the Second Embodiment:
E. Third Embodiment:
   E-1. Multilevel Halftoning Result Value Generating Process of the Third Embodiment:
   E-2. Dot Formation Presence or Absence Setting Process of the Third Embodiment:
   E-3. Multilevel Halftoning Table Setting Method of the Third Embodiment:
   E-4. Multilevel Halftoning Result Value Generating Process of a Variation Example of the Third Embodiment:
   E-5. Dot Formation Presence or Absence Setting Process of a Variation Example of the Third Embodiment:

Before giving a detailed description of the embodiments, a summary of the embodiments is described while referring to FIG. 1. FIG. 1 uses an example of a printing system, and is an explanatory drawing to describe a summary of this embodiment. This printing system consists of a computer 10 as an image processing device, a printer 20 as an image output device, and the like, and when a specified program is loaded into the computer 10, the computer 10, the printer 20, and the like as an entirety function as one image output system. The printer 20 prints an image by forming dots on a printing medium. The computer performs specified image processing on the image data of the image to be printed, and by doing this generates data for controlling the formation of dots for each pixel by the printer 20, and supplies this to the printer 20.

With a typical printing system, images are printed in the following way. First, by performing specified image processing with the computer, image data is converted to data representing the presence or absence of dot formation for each pixel. Next, the obtained data is supplied to the printer, and an image is printed by the printer by forming dots according to the supplied data. Here, when the image to be printed has a high pixel count, the time required for image processing increases accordingly, and printing images rapidly is difficult. Also, as the pixel count becomes higher, the data volume of the data representing the presence or absence of dot formation for each pixel increases, so the time required to output data to the printer from the computer becomes longer, and the time required for printing increases by that amount.

Taking into consideration this kind of point, with the printing system shown by example in FIG. 1, images are printed in the following manner. First, at the computer 10, a specified plurality each of the pixels that form an image are consolidated to generate a pixel group. Next, a determination is made of whether or not the pixel group is divided for processing based on the first resolution that is the image data resolution and the second resolution that is the image output resolution. Note that with this embodiment, the determination is made using the resolution ratio of the first and second resolutions. When determining, it is possible to determine that the pixel group is divided for processing if the resolution ratio is less than a specified value, for example. Next, when processing without dividing the pixel group, the representative gradation value that represents the pixel group is set based on the gradation value of each pixel included in that pixel group. Meanwhile, when dividing the pixel group and processing, the representative gradation value is set for each area into which the pixel group is divided.

The representative gradation values obtained in this way are supplied to the multilevel halftoning module, undergo multilevel halftoning, and converted to the code value indicating the multilevel halftoning result. Following, this code value is called the multilevel halftoning result value. Multilevel Halftoning of the representative gradation values is performed by referencing the multilevel halftoning correlations stored in the multilevel halftoning correlation storage module. Following, with the described embodiments, as the encoding correlations, the multilevel halftoning correlations for which the representative gradation values and the multilevel halftoning result values are associated with each pixel group are used. A plurality of types of encoding correlations can be prepared, and it is not absolutely necessary to associate in advance with each pixel group. It is sufficient to perform encoding using one encoding correlation for the selected pixel group, and after that, to perform decoding using the decoding correlation correlated to this. The correlations used with encoding and decoding do not necessarily have to be the same correlations, but it is necessary to have some kind of correlation between the two. A simple method for performing correlation is to associate this correlation to each pixel group. By doing this, it is possible to easily specify mutual correlations. Therefore, with the following embodiments, the encoding correlations and the decoding correlations are correlated via the classification number of the pixel group. Also, the code value obtained using the encoding correlation may also reflect the multilevel halftoning results for the pixel group, and as long as the output dot arrangement can be generated using the decoding correlation, it is possible to use this with a code value defined by any kind of system. With the embodiments below, because the multilevel halftoning results, the obtained number data, and the like are used as the encoding correlations, the encoding correlations are called "multilevel halftoning correlations." Note that the decoding correlation and the decoding correlation are the same. With this embodiment, by referencing the concerned multilevel halftoning correlation, it is possible to rapidly convert the representative gradation values to the multilevel halftoning result values.

Note that the representative gradation values are set for each area within a pixel group, so it is possible to also obtain multilevel halftoning result values for each area. Of course, with determination of whether or not the pixel group is divided, for pixel groups for which it is determined not to divide, only one multilevel halftoning result value will be obtained. The computer 10 outputs the multilevel halftoning result values obtained in this way toward the printer 20.

The dot formation presence or absence setting module of the printer 20 sets the presence or absence of dot formation for each pixel in the following manner when it receives the multilevel halftoning result value. When one multilevel halftoning result value at a time is received per pixel group, the presence or absence of dot formation is set for each pixel in the pixel group. When setting the presence or absence of dot formation, the sequence value indicating the sequence in which dots are formed for each pixel within the pixel group is specified for each pixel group, and it is possible to set the presence or absence of dot formation for each pixel in the pixel group based on the concerned sequence value and multilevel halftoning result value. Alternatively, it is also possible to store in advance the decoding correlation for which the multilevel halftoning result value and the data representing the presence or absence of dot formation for each pixel in the pixel group are associated for each pixel group, and by referencing the concerned decoding correlation from the multilevel halftoning result value, it is possible to convert the multilevel halftoning result value to data representing the presence or absence of dot formation for each pixel in the pixel group.

Meanwhile, when receiving a plurality of multilevel halftoning result values per pixel group, the pixel group is divided into a plurality of areas, and the presence or absence of dot formation for each pixel is set for each area from the multilevel halftoning result value. When setting the presence or absence of dot formation for each pixel of each area, it is possible to set this based on the sequence value for each pixel in the pixel group and on the multilevel halftoning result value of each area, or alternatively, it is also possible to set the presence or absence of dot formation for each pixel in each area by referencing the decoding correlation from the multilevel halftoning result value of each area. The image is printed by the dot forming module forming dots according to the results of setting the presence or absence of dot formation obtained in this way.

Here, if compared to the data representing the presence or absence of dot formation for each pixel, it is possible to make the multilevel halftoning result value for each pixel group a much smaller data volume. Therefore, instead of supplying data representing the presence or absence of dot formation for each pixel to the printer 20 from the computer 10, if the multilevel halftoning result value of each pixel is supplied, it is possible to transfer the data very rapidly.

It is also possible to find the multilevel halftoning result value rapidly by referencing the multilevel halftoning correlation for which the representative gradation values and the multi threshold result values are associated. Because of this, in combination with being able to rapidly supply the generated multilevel halftoning result values to the printer 20, it is also possible to rapidly print images even for images with a high pixel count, for example. If the multilevel halftoning result value is generated by referencing the correlations, it is also possible to generate using a very simple process. Because of this, to generate multilevel halftoning result values, even when not using equipment having high level processing capability such as the computer 10, it is possible to do generation within the printer 20 or a digital camera or the like, for example.

Furthermore, for the series of processes described above, it is possible to do processing without dividing the pixel group or to do processing for each area with the pixel group divided, and when dividing for processing, it is possible to do processing of areas smaller than the pixel group consolidated into one batch. However, in this kind of case as well, for the multilevel halftoning correlations, the sequence values, or the decoding correlations or the like, it is possible to use an item as is without dividing for processing. Specifically, even when doing processing for smaller pixel groups, by dividing existing pixel groups and processing rather than generating new small pixel groups, the multilevel halftoning correlations, sequence values, or decoding correlations or the like for small pixel groups are not necessary. As a result, it is possible to save the storage capacity for storing these.

As will be described later, since the suitable pixel group size differs by the resolution ratio of the image data resolution and the image output resolution, if a determination is made of whether to divide the pixel group for processing according to the resolution ratio, even without preparing multilevel halftoning correlations, sequence values, or decoding correlations for small pixel groups, essentially, it is possible to do processing with suitably sized pixel groups, and it is possible to rapidly output high image quality images. Following, by using this kind of printing system as an example, the various embodiments of this invention are described in detail.

B. Device Constitution

Figure 2:
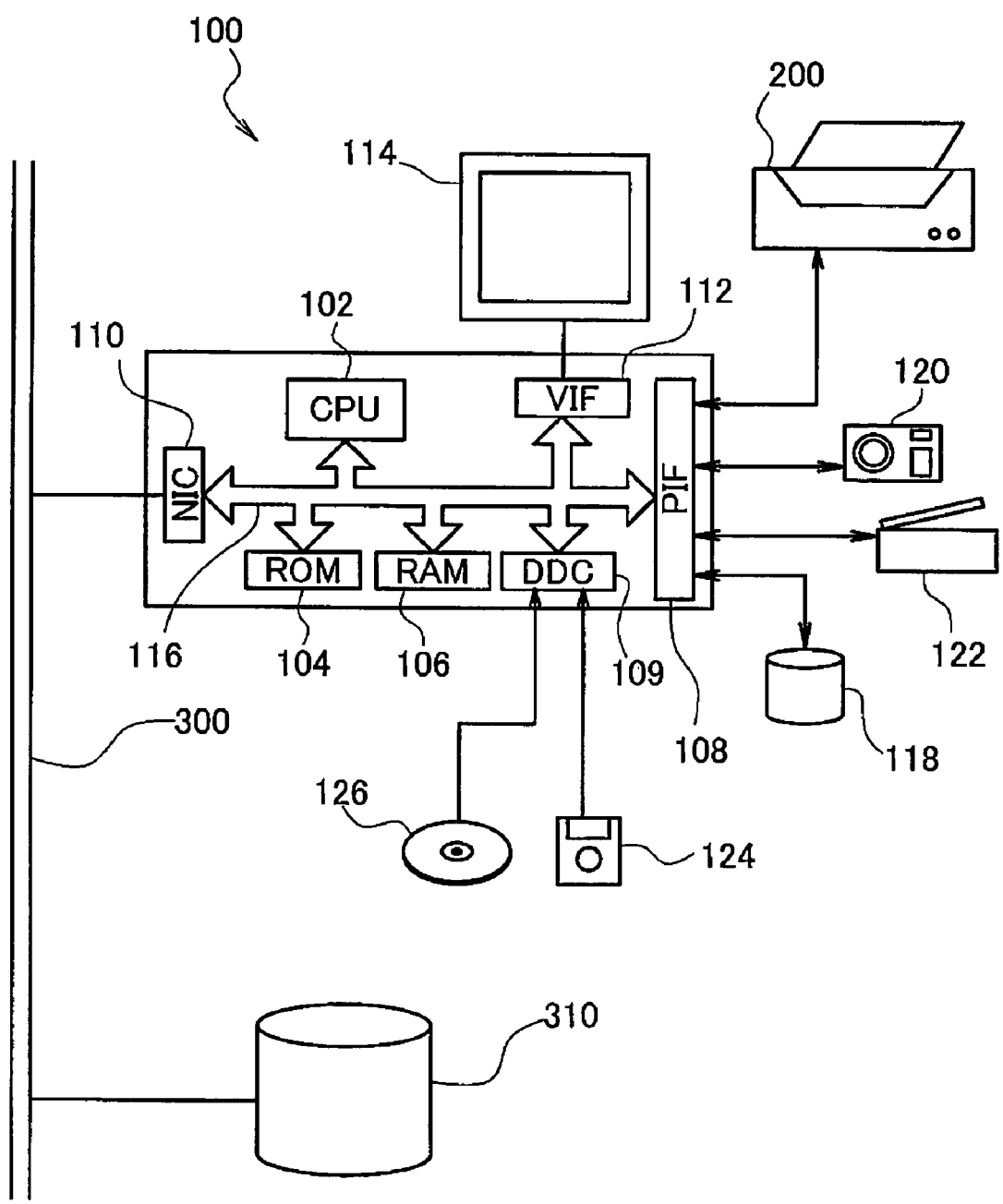
FIG. 2 is an explanatory drawing showing the constitution of a computer as the image processing device of this embodiment.

FIG. 2 is an explanatory drawing showing the constitution of a computer 100 as the image processing device of this embodiment. The computer 100 is a known computer constituted with the CPU 102 at the center, and ROM 104, RAM 106 and the like mutually connected via a bus 116.

Connected to the computer 100 are a disk controller DDC 109 for reading data such as a flexible disk 124 or compact disk 126 or the like, a peripheral device interface PIF 108 for performing sending and receiving of data with peripheral devices, a video interface VIF 112 for driving a CRT 114, or the like. Connected to the PIF 108 are a control printer 200 described later, a hard disk 118, or the like. Also, if a digital camera 120 or a color scanner 122 or the like are connected to the PIF 108, it is also possible to print images imported by the digital camera 200 or the color scanner 122. Furthermore, if a network interface card NIC 110 is mounted, the computer 100 can be connected to a communication line 300 and data stored in a storage device 310 connected to the communication line can be fetched.

Figure 3:
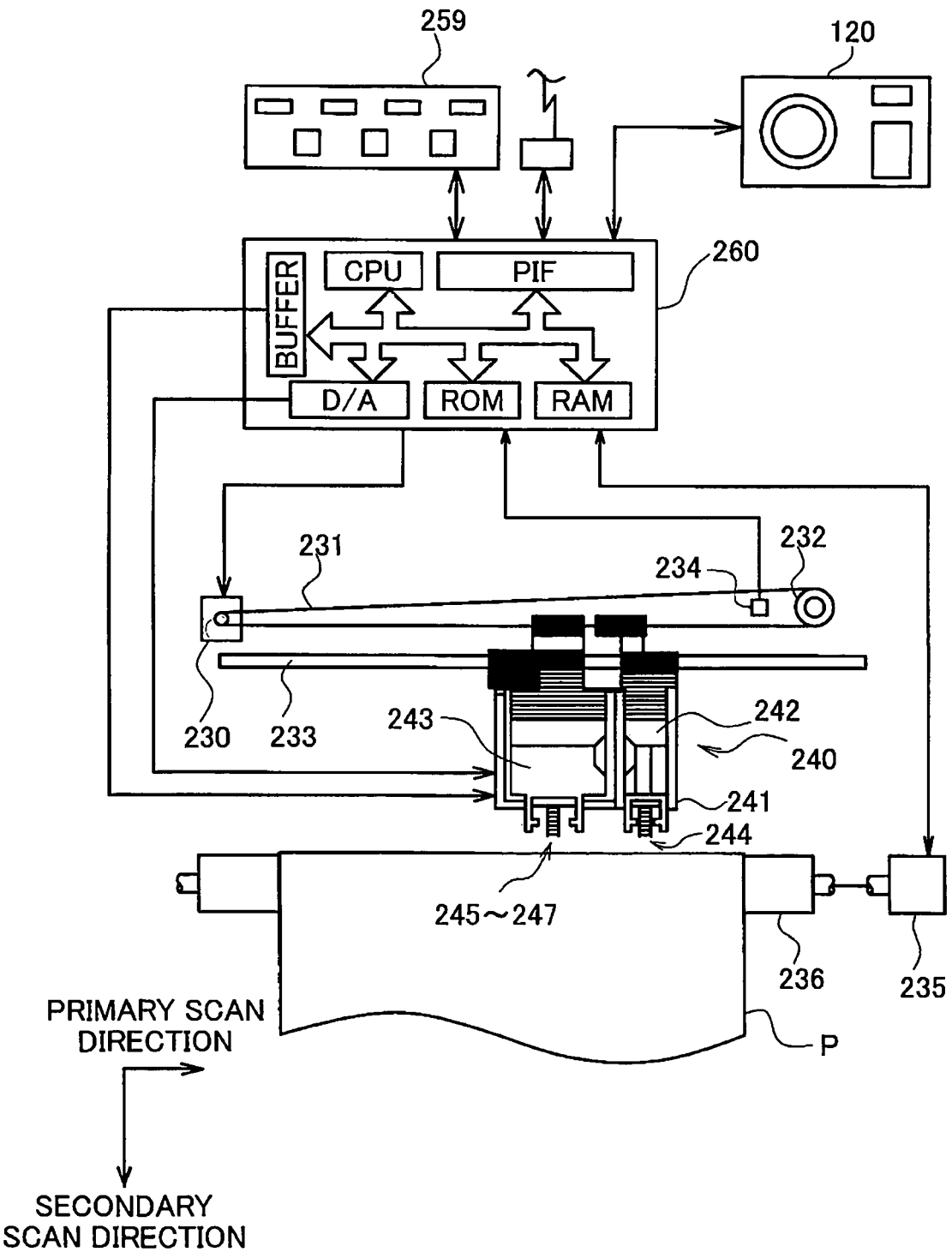
FIG. 3 is an explanatory drawing showing the schematic structure of a color printer of this embodiment.

FIG. 3 is an explanatory drawing showing the schematic structure of the color printer 200 of this embodiment. The color printer 200 is an inkjet printer capable of forming dots of four colors of ink, cyan, magenta, yellow and black. Of course, it is also possible to use an inkjet printer capable of forming dots of a total of six colors including, in addition to these four colors of ink, a low dye or pigment density cyan (light cyan) ink, and a low dye or pigment density magenta (light magenta) ink. Note that hereafter, in some cases, the cyan ink, magenta ink, yellow ink, black ink, light cyan ink, and light magenta ink may respectively be called C ink, M ink, Y ink, K ink, LC ink, and LM ink.

As shown in the figure, the color printer 200 consists of a mechanism that drives a printing head 241 placed on a carriage 240 and performing ink spray and dot formation, a mechanism that moves this carriage 240 back and forth in the axial direction of the platen 236 by a carriage motor 230, a mechanism that transports the printing paper P by a paper feed motor 235, a control circuit 260 that controls the dot formation, the movement of the carriage 240, and the transport of the printing paper, and the like.

Mounted on the carriage 240 is an ink cartridge 242 that stored the K ink and an ink cartridge 243 in which is stored the various inks including C ink, M ink, and Y ink. When the ink cartridges 242 and 243 are mounted in the carriage 240, each ink within the cartridges pass through an introduction tube (not illustrated) and is supplied to the ink spray heads 244 to 247 of each color provided at the bottom surface of the printing head 241.

Figure 4:
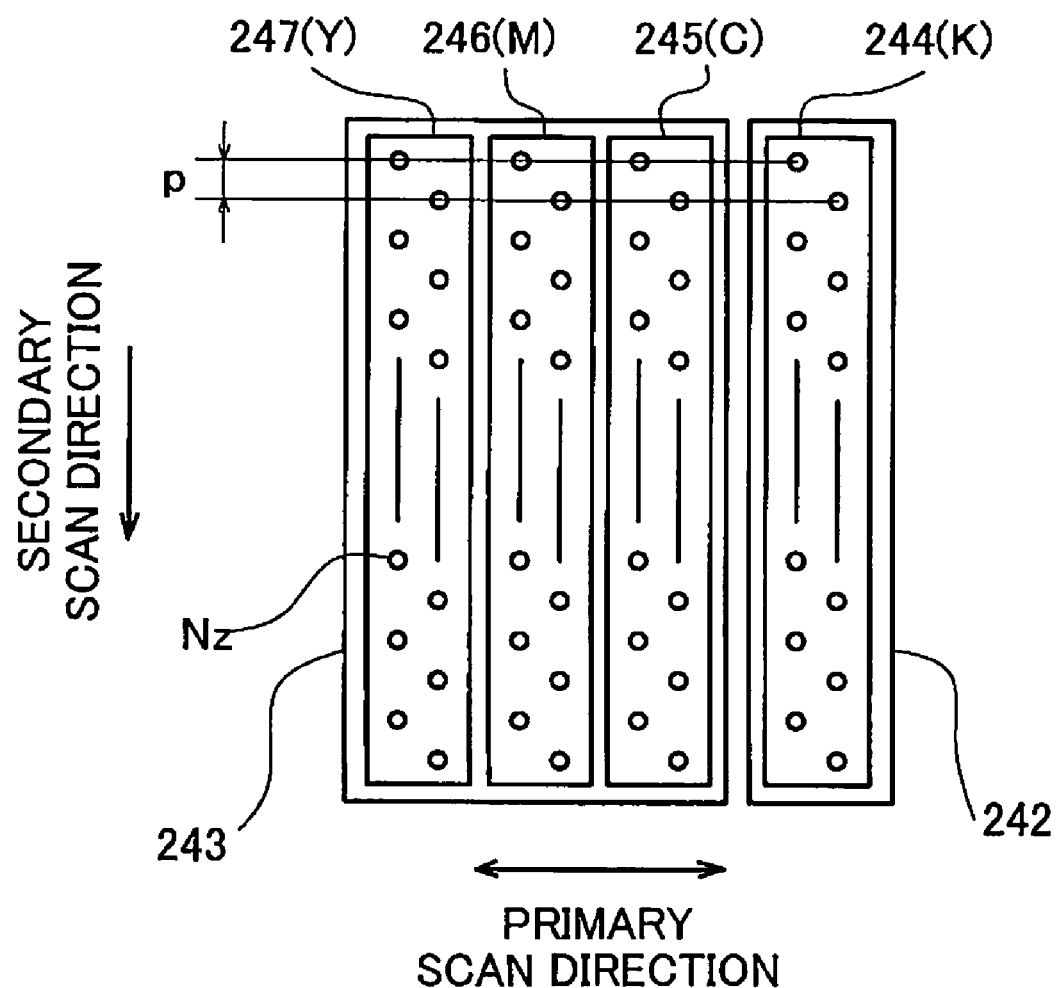
FIG. 4 is an explanatory drawing showing a row of inkjet nozzles in the ink spray head.

FIG. 4 is an explanatory drawing showing a row of inkjet nozzles Nz in the ink spray heads 244 to 247. As shown in the figure, on the bottom surface of the ink spray heads are formed four sets of nozzle rows that spray each color of ink C, M, Y, and K, and 48 nozzles Nz per one set of nozzle rows are arranged at a fixed nozzle pitch k.

The control circuit 260 is constituted with a CPU, ROM, RAM, PIF (peripheral device interface) and the like mutually connected by a bus. The control circuit 260 controls the primary scan operation and the secondary scan operation of the carriage 240 by controlling the operation of the carriage motor 230 and the paper feed motor 235, and also controls the spray of ink drops at a suitable timing from each nozzle based on the printing data supplied from the computer 100. In this way, by forming each color of ink dots at suitable positions on the printing medium under the control of the control circuit 260, it is possible for the color printer 200 to print color images.

Note that it is possible to use various methods for the method of spraying ink drops from each color ink spray head. Specifically, it is possible to use a method of spraying ink drops using a piezo element, a method of spraying ink drops by generating bubbles within the ink path with a heater installed in the ink path, or the like. Also, instead of spraying ink drops, it is also possible to use a printer using the method of forming ink dots on the printing paper using a phenomenon such as thermal transfer or the like, or a printer using a method of attaching each color of toner powder onto the printing medium using static electricity.

The color printer 200 having the kind of hardware constitution described above moves each color ink spray head 244 to 247 in the primary scan direction in relation to the printing paper P by driving the carriage motor 230, and moves the printing paper P in the secondary scan direction by driving the paper feed motor 235. By the control circuit 260 spraying ink drops while driving the nozzles at a suitable timing while synchronizing to the primary scan and secondary scan movement of the carriage 240, the color printer 200 prints a color image on the printing paper.

Note that for the color printer 200 as well, since a CPU, RAM, ROM and the like are placed within the control circuit 260, it is also possible to execute the process performed by the computer 100 within the color printer 200. In this kind of case, the image data of images taken by the digital camera 120 or the like are directly supplied to the color printer 200, and by executing the necessary image processing within the control circuit 260, it is also possible to print images directly from the color printer 200.

C. Summary of the Image Printing Process of the First Embodiment

Following is described the image process (image processing process) performed respectively within the kind of computer 100 and the color printer 200 noted above to print an image. Here, to make it easier to understand, first, a simple description is given of the overall image of the image printing process, and next, a description is given of the principle that this kind of image printing process is possible.

Note that hereafter, the description is with the first half of the image printing process executed by the computer 100 and the latter half executed by the color printer 200, but it is also possible to have these processes executed within the color printer 200, or to have them executed within the device that generates the image data such as the digital camera 120 or the like. Of course, it is also possible to execute the first half of the image printing process with the digital camera 120 or the like, and to execute the latter half of the process with the color printer 200. Specifically, with the image printing process of this embodiment, as will be described in detail later, it is possible to make the first half of the process and the latter half of the process simple. Because of this, even when using a device such as the color printer 200 or the digital camera 120 that does not have the high processing capability of the computer 100, it is possible to rapidly execute the image printing process, and therefore, it is possible to constitute a sufficiently practical printing system without using the computer 100.

Figure 5:
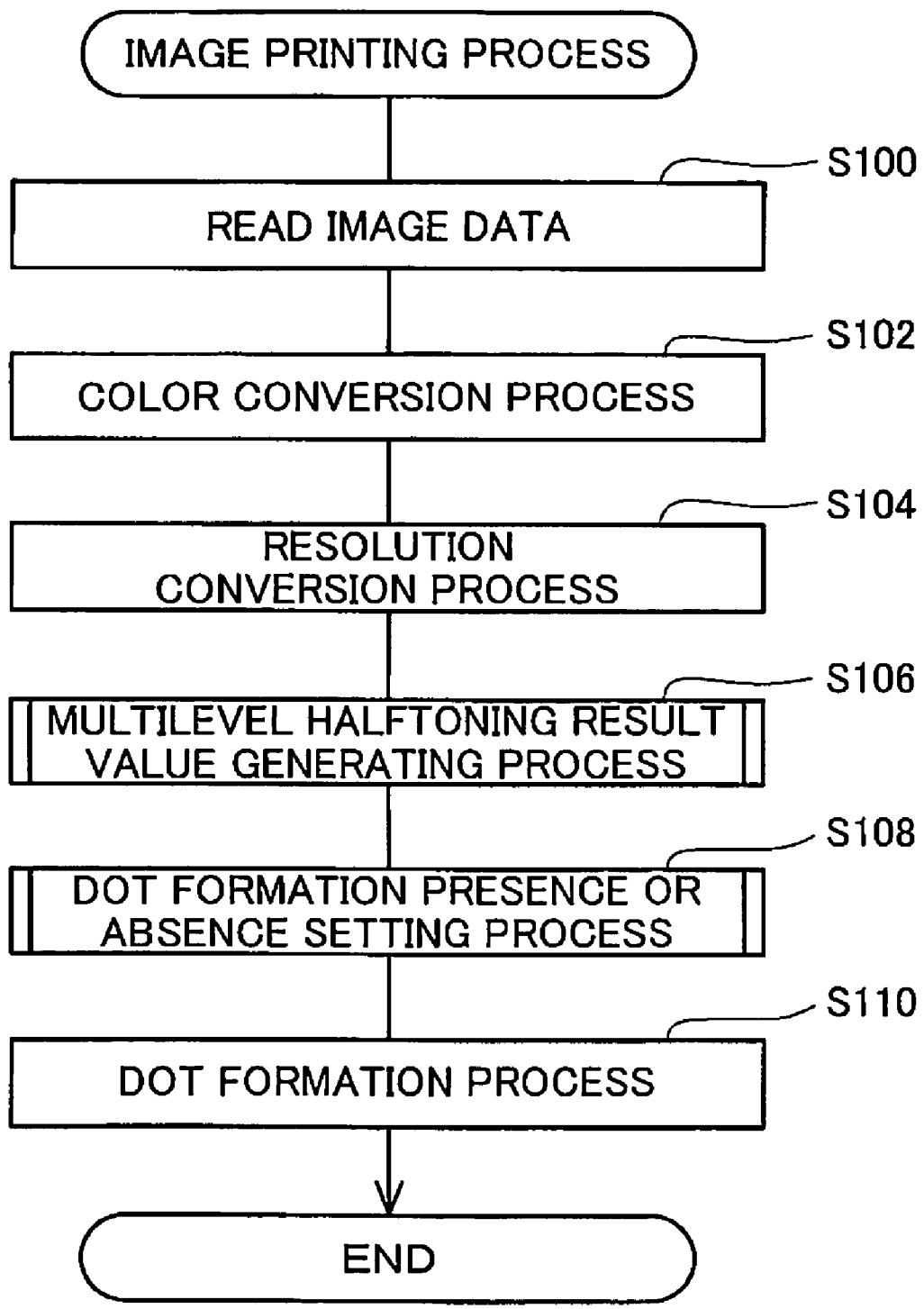
FIG. 5 is a flow chart showing the overall flow of the image printing process of the first embodiment.

FIG. 5 is a flow chart showing the overall flow of the image printing process of the first embodiment. Following, a simple description is given of the overall image of the image printing process while referring to FIG. 5. When the image printing process of the first embodiment is started, first, the computer 100 starts reading the image data (step S100). Here, the image data is described as being RGB color image data, but this is not limited to being color image data, and can also be used in the same way for black and white image data. It is also possible to use this in the same way for a single color printer, and is not limited to color printers.

After reading the color image data, the color conversion processing is performed (step S102). Color conversion processing is the process of converting the RGB color image data expressed by a combination of R, G, and B gradation values to image data expressed by a combination of gradation values for each ink color used for printing. As described previously, the color printer 200 prints images using the four ink colors C, M, Y, and K. When doing this, with the color conversion process of the first embodiment, the image data expressed by the colors R, G, and B is converted to data expressed by the gradation values of each color C, M, Y, and K. The color conversion process is performed by referencing a three dimensional mathematical table called a color conversion table (LUT). Stored in advance in the LUT are the gradation values of each color C, M, Y, and K obtained by the color conversion for the RGB color image data. With the process of step S102, by referencing this LUT, it is possible to do rapid color conversion of the RGB color image data to image data of each color C, M, Y, and K.

When the color conversion process ends, the resolution conversion process starts (step S104). The resolution conversion process is the process of converting the image data resolution to the resolution (printing resolution) at which the printer 200 prints the image. When the image data resolution is lower than the printing resolution, new image data is generated between pixels, and conversely, when the image data resolution is higher than the printing resolution, by culling data at a fixed rate, processing is performed to match the image data resolution and the printing resolution.

Today, along with demand for higher image quality or demand for larger images, with the resolution conversion process, conversion of image data to high resolution printing resolution is often performed. In this case, it is also possible to perform interpolation calculation and generate new data between pixels, but generating new image data by simply dividing one pixel into a plurality of pixels is also widely performed.

FIG. 6 shows explanatory drawings conceptually showing the state of performing this kind of resolution conversion process. FIG. 6a represents the image data before resolution conversion. When one pixel of this image data is increased to a higher resolution by dividing into four parts in the primary scan direction (lateral direction in the drawing), and dividing into two parts in the secondary scan direction (vertical direction in the drawing), it is possible to obtain the data shown in FIG. 6b. Also, when one pixel of the source image data is divided into two parts in both the primary scan direction and secondary scan direction, it is possible to obtain the data shown in FIG. 6c. Of course, when one pixel is simply divided in this way to achieve a higher resolution, this does not mean that a smoother gradation change is expressed between adjacent pixels, and essentially it does not mean that the resolution has increased, so this is nothing more than having increased the apparent resolution. However, when printing an image by forming dots, the number of gradations that can be expressed with one pixel is no more than a few gradations, and since this is much smaller than the number of gradations that can be expressed by the image data, even with this kind of resolution conversion it is effective in increasing the image quality, and simply dividing pixels to heighten the resolution of the apparent resolution is also a typically performed resolution conversion process.

To describe in accordance with the example shown in FIG. 6, if the source image data resolution is 360×360 dpi (360 dpi in both the primary scan direction and the secondary scan direction), by performing the kind of resolution conversion shown in FIG. 6b, the apparent resolution has a heightened resolution to 1440×720 dpi (1440 dpi in the primary scan direction, 720 dpi in the secondary scan direction), and as a result, it is possible to obtain a higher image quality image. Also, when it is not necessary to have image quality that is that high, it is also possible to improve the image quality by performing resolution conversion like that shown in FIG. 6c and increase the resolution to an apparent resolution of 720× 720 dpi.

When the resolution is converted to a printing resolution as described above, the computer 100 starts the multilevel halftoning result value generating process (step S106 in FIG. 5). The detailed contents of the multilevel halftoning result value generating process will be described in detail later, so only a summary is described here. With this process, by consolidating a specified number at a time of pixels into a pixel group after the resolution conversion process, one image is divided into a plurality of pixel groups. Here, four pixels in the primary scan direction and two pixels in the secondary scan direction are consolidated into a pixel group for a total of eight pixels. Then, a determination is made of whether or not to divide the pixel group for processing based on the resolution ratio after conversion for the resolution conversion process described above (step S104).

For example, when the resolution conversion shown in FIG. 6b is performed, the resolution ratio before and after conversion is 4× in the primary scan direction and 2× in the secondary scan direction. Here, since the pixel group is four pixels each consolidated in the primary scan direction and two pixels each in the secondary scan direction, the resolution ratio in the primary scan direction and the secondary scan direction matches the pixel count consolidated in the pixel group. In light of this, in this case, this is determined to be processed without dividing the pixel group. On the other hand, when performing the resolution conversion shown in FIG. 6c, for example, the resolution ratio before and after conversion is 2× in both the primary scan direction and the secondary scan direction. In light of this, in this case, this is determined to be processed with the pixel group divided equally in two in the primary scan direction. As a result, the number of pixels included in each area generated by dividing in the pixel group is two pixels each in both the primary scan direction and the secondary scan direction, and the resolution ratio before and after conversion matches. Also, when the resolution ratio before and after conversion is 2× in the primary scan direction and 1× in the secondary scan direction, it can be determined to process one pixel group into two equal parts in both the primary scan direction and the secondary scan direction. By doing this, the number of pixels included in each area generated by dividing is 2 pixels in the primary scan direction and 1 pixel in the secondary scan direction, making it possible to match the pixel count and the resolution ratio.

After a determination is made of whether or not to divide the pixel group for processing as described above, when processing without dividing, the gradation value representing the image data within the pixel group (representative gradation value) is set, and conversion to the multilevel halftoning result value is done by multilevel halftoning the obtained gradation value. On the other hand, when dividing the pixel group for processing, the representative gradation value for each area generated by division is obtained, and each representative gradation value is converted to a multilevel halftoning result value. Ultimately, when processing without dividing the pixel group, one multilevel halftoning result value at a time is obtained for each pixel group, and on the other hand, when dividing the pixel group for processing, a plurality of multilevel halftoning result values is obtained for each pixel group. With the multilevel halftoning result value generating process, after doing multilevel halftoning of the representative gradation value in this way, the obtained multilevel halftoning result value is output to the color printer 200.

Note that the multilevel halftoning result value generating process can be executed simply and rapidly by referencing the multilevel halftoning table described later. It is also possible to indicate any kind of contents using the multilevel halftoning result value, but here, this is data showing the number of dots to be formed within the pixel group. Specifically, since the representative gradation value is a gradation value representing the image data of each pixel within a pixel group, when the representative gradation value becomes bigger, the number of dots formed within the pixel group increases accordingly. Therefore, it is possible to view the process of setting the number of dots formed within the concerned pixel group from the representative gradation value of the pixel group as one type of multilevel halftoning, and in this case, the number of dots correlates to the multilevel halftoning result value. Note that the multilevel halftoning result value does not necessarily have to be the dot count itself, but can also be a value representing the number of dots indirectly as long as it is a value that can be converted to the dot count.

When the multilevel halftoning result value is received from the computer 100, the CPU built into the control circuit 260 of the color printer 200 starts the dot formation presence or absence setting process (step S108). Specifically, the color printer 200 prints images by forming dots on each pixel that forms an image, so it is necessary to set whether or not to form dots for each pixel ahead of printing the image. In light of this, the process of setting whether or not to form dots for each pixel is performed based on the multilevel halftoning result value received from the computer 100. Note that as described above, with the multilevel halftoning result value generating process, this depends on processing with division of the pixel group and processing without dividing, and when processing without dividing, one multilevel halftoning result value at a time is supplied to each pixel group, and on the other hand, when dividing for processing, a plurality of multilevel halftoning result values at a time is supplied to each pixel group. In correspondence with this, for the dot formation presence or absence setting process as well, when the multilevel halftoning result values are obtained one at a time for each pixel group, the presence or absence of dot formation for each pixel is set for each pixel group, and on the other hand, when the multilevel halftoning result values are obtained a plurality at a time for each pixel group, the presence or absence of dot formation for each pixel is set for each area. The detailed contents of the dot formation presence or absence setting process are described later.

Also, as a method for setting the presence or absence of dot formation for each pixel within the pixel group from the multilevel halftoning result value, a method called the so-called density pattern method is known, but with the dot formation presence or absence setting process of this embodiment, the big difference is that in addition to the multilevel halftoning result value, the dot formation presence or absence is also set using the sequence value set for each pixel group. If the presence or absence of dot formation for each pixel is set in this manner, it is possible to obtain the following kind of significant advantages. Specifically, with the typical density pattern method, the resolution essentially drops to the resolution of the pixel group for which multilevel halftoning was performed, and there is a tendency for image quality to degrade easily. In contrast to this, with the dot formation presence or absence setting process of this embodiment, because the presence or absence of dot formation is set while referencing the sequence values stored for each pixel group, there is no degradation of the image quality depending on the size of the pixel group. Furthermore, it is also possible to print a high quality image with good dispersion of dots such as that realized by using a dither matrix called a so-called blue noise mask or green noise mask. The detailed contents of the dot formation presence or absence setting process of this embodiment and the reason it is possible to obtain this kind of characteristics by setting the presence of dot formation by performing this process are described in detail later.

By doing as noted above, once the presence or absence of dot formation for each pixel in the pixel group is set, the process of forming dots on the output medium is performed according to the set dot formation presence or absence (step S110 in FIG. 5). Specifically, as described using FIG. 3, by spraying ink drops while driving the ink spray heads while repeating the primary scan and the secondary scan of the carriage 240, ink dots are formed on the printing paper. By forming dots in this way, images corresponding to the image data are printed.

In this way, with the image printing process of this embodiment, though the multilevel halftoning result value is supplied toward the color printer 200 from the computer 100, data indicating the presence of absence of dot formation for each pixel is not supplied. Compared to expressing the presence or absence of dot formation for each pixel, since it is possible to express the multilevel halftoning result value with a much smaller data volume, by using this kind of method, it is possible to supply data very rapidly toward the color printer 200 from the computer 100.

For example, it is possible to have a single type of dot that can be formed on each pixel. In this case, each pixel can only be in the state of have either having dots formed or not, so the data length necessary to express the presence or absence of dot formation for 1 pixel is 1 bit. Also, since here, 8 pixels are included in the pixel group, to express the presence or absence of dot formation for all the pixels in the pixel group, 8 bits of data length are needed. Meanwhile, the number of dots formed within the pixel group can only be one of 9 choices of 0 through 8. If there are 9 choices, then if there are 4 bits, expression is possible. Therefore, if the representative gradation value of the pixel group undergoes multilevel halftoning to become dot count data, it is possible to express the multilevel halftoning result value with 4 bits of data length. In this way, compared to data representing the presence or absence of dot formation for each pixel, it is possible to express the multilevel halftoning result value with a much smaller data volume, so it is possible to supply data very rapidly to the color printer 200 from the computer 100.

In addition, the details will be described later, but if the presence or absence of dot formation for each pixel is suitably set, even when multilevel halftoning result values are supplied, there is no degradation of the image quality. In particular, under specific conditions, it is possible to obtain exactly the same results as when supplying data representing the presence or absence of dot formation for each pixel.

Of course, when dividing the pixel group, a plurality of multilevel halftoning result values must be supplied per pixel group, so there is a diminishment of the merit of printing images rapidly by supplying the multi threshold result value rapidly. However, if the pixel group is divided for processing, it is possible to use as is the multilevel halftoning table and sequence values set for existing pixel groups, and to have a state of generating the same kind of dots as when processing using smaller pixel groups. Therefore, it is possible to have dots generated suitably without increasing the types of multilevel halftoning tables and sequence values to be stored.

If the algorithm described later is used, it is also possible to realize the process of generating multilevel halftoning result values or the process of setting the presence or absence of dot formation for each pixel from the multilevel halftoning result values using a very simple process, and to execute this very rapidly. Because of this, even when not using an image processing device having a high level processing capability such as the computer 100, it is possible to do executing within the digital camera 120, the color printer 200 or the like, for example. When working in this way, it is possible to directly supply the image data taken using the digital camera 120 to the color printer 200, and to print a high image quality color image.

C-1. Principle by which the Pixel Position can be Set from the Number Data:

Following, described is the principle of why it is possible to print images without degradation of the image quality when using the method described above, specifically, even when supplying the multilevel halftoning result value indicating the number of dots formed in the pixel group to the color printer 200 from the computer 100, and setting the presence or absence of dot formation for each pixel within the pixel group based on this multilevel halftoning result value.

For purposes of the description, first, the dither method is described. The dither method is a typical method used to convert image data to data representing the presence or absence of dot formation for each pixel. With this method, a threshold value is set in a matrix called the dither matrix, the image data gradation value is compared for each pixel with the threshold value set in the dither matrix, and it is determined that dots are formed for pixels for which the image data gradation value is bigger, and it is determined that dots are not formed for pixels for which this is not the case. If this kind of determination is performed for all the pixels in an image, it is possible to convert the image data to data representing the presence or absence of dot formation for each pixel.

Figure 7:
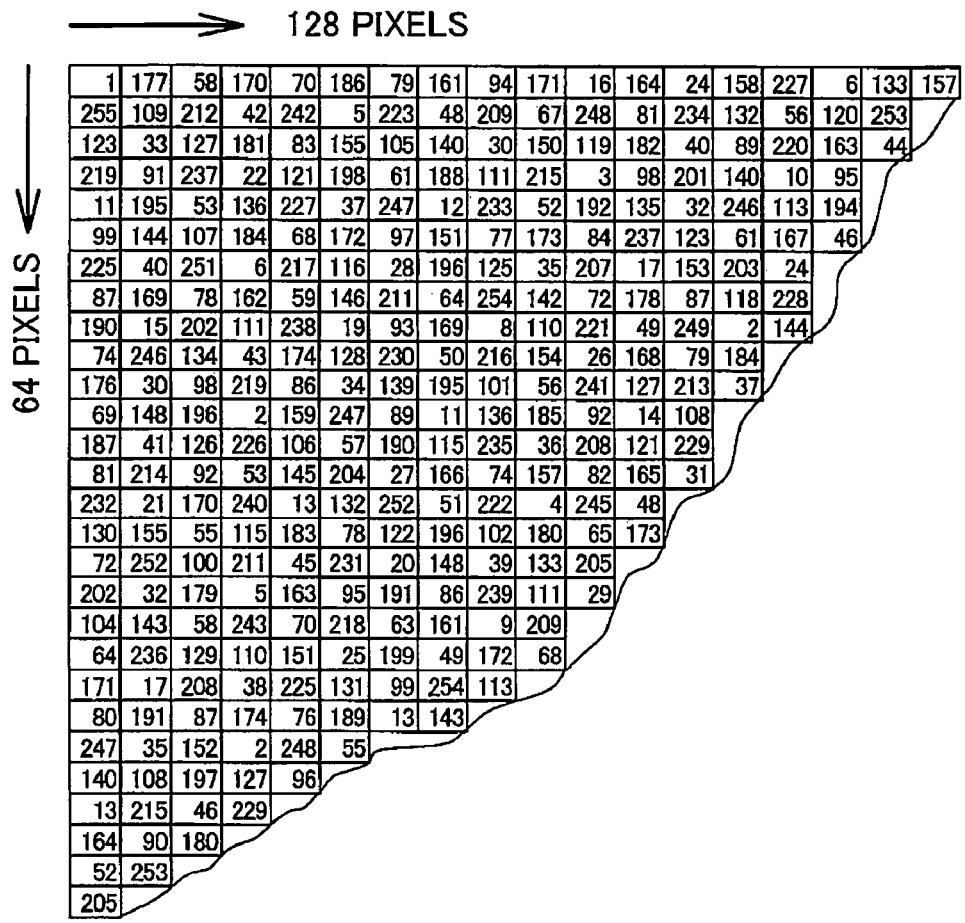
FIG. 7 is an explanatory drawing conceptually showing an example of part of a dither matrix.

FIG. 7 is an explanatory drawing conceptually showing an example of part of a dither matrix. In the matrix shown in the drawing, threshold values thoroughly selected from the range of gradation values 1 to 255 are randomly stored in a total of 8192 pixels, with 128 horizontal (primary scan direction) pixels and 64 vertical (secondary scan direction) pixels. Here, the reason that the gradation value of the threshold value is selected from a range of 1 to 255 is because with this embodiment, the value of the gradation value 0 to 255 obtained by the image data is 1-byte data, and also, when the image data gradation value and the threshold value are equal, it is determined that dots are formed on that pixel.

Specifically, when dot formation is limited to pixels for which the image data gradation value is bigger than the threshold value (in other words, dots are not formed on pixels for which the gradation value and the threshold value are equal), dots are not formed on pixels having a threshold value with the same value as the maximum gradation value that the image data can have. To avoid this situation, the range for obtaining the threshold value is a range that excludes the maximum gradation value from the range that the image data can have. Conversely, when having dots formed even on pixels for which the image data gradation value and the threshold value are equal, dots will always be formed on pixels having a threshold value with the same value as the minimum gradation value that the image data can have. To avoid this situation, the range for obtaining the threshold value is a range that excludes the minimum gradation value from the range that the image data can have. With this embodiment, the gradation value that the image data can have is from 0 to 255, and since dots are formed on pixels for which the image data and the threshold value are equal, the range for obtaining the threshold value is from 1 to 255. Note that the size of the dither matrix is not limited to the size shown by example in FIG. 6, but can also be various sizes including matrixes for which the vertical and horizontal pixel count is the same.

Figure 8:
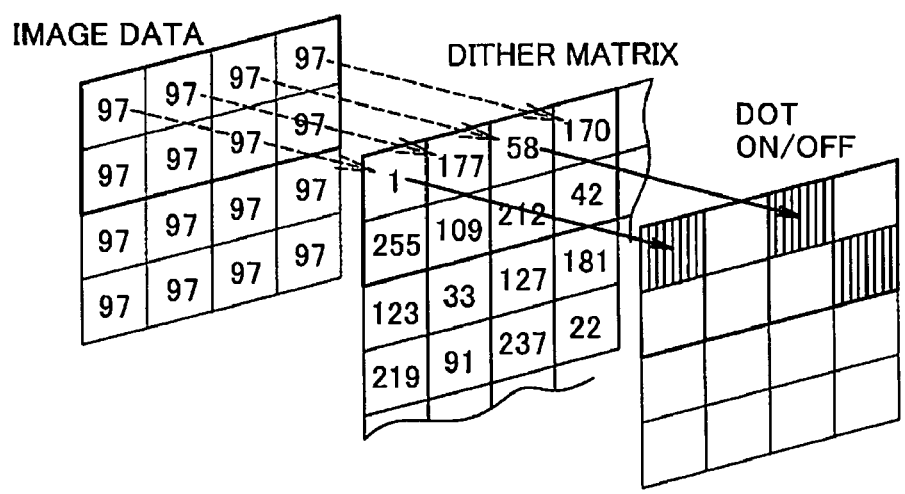
FIG. 8 is an explanatory drawing conceptually showing the state of determining the presence or absence of dot formation for each pixel while referencing the dither matrix.

FIG. 8 is an explanatory drawing conceptually showing the state of determining the presence or absence of dot formation for each pixel while referencing the dither matrix. When determining the presence or absence of dot formation, first, the pixel for which to make a determination is selected, and for this pixel, the gradation value of the image data and the threshold value stored at the corresponding position within the matrix are compared. The thin, dotted line arrow shown in FIG. 8 typically represents the comparison for each pixel of the image data gradation value and the threshold value stored in the dither matrix. For example, for the pixel at the upper left corner of the image data, the image data gradation value is 97, and the dither matrix threshold value is 1, so it is determined that dots are formed in this pixel. The arrow indicated by a solid line in FIG. 8 typically represents the state of determining the dot formation for this pixel and writing the determination results to memory. Meanwhile, for the pixel at the adjacent right of this pixel, the image data gradation value is 97, and the dither matrix threshold value is 177, and the threshold value is larger, so it is determined that dots are not formed for this pixel. With the dither method, by determining whether or not to form dots on each pixel while referencing the dither matrix in this way, the image data is converted to data representing the presence or absence of dot formation for each pixel.

FIG. 9 is an explanatory drawing showing the state of converting image data using the dither method to data representing the presence or absence of dot formation. FIG. 9a is an expanded view of part of the image data, the small rectangles in the drawing represent pixels, and the numerical values displayed in each of those rectangles represents the image data gradation value. As illustrated in the drawing, there is a tendency with the image data for similar (or the same) gradation values to be allocated between adjacent pixels. In recent years, there is a tendency for the image data resolution to be higher due to demand for higher image quality, but the tendency for a similar or the same gradation value to be allocated between adjacent pixels becomes more marked as the image data resolution becomes higher. Furthermore, as described above, when converting the image data resolution to the printing resolution, when dividing the pixel into a plurality of pixels to increase the resolution, the pixels generated by division from the same pixel will have exactly the same gradation value.

FIG. 9b shows the state of the threshold value being set at a corresponding position in the dither matrix. By comparing the image data gradation value shown in FIG. 9a and the threshold value of the dither matrix shown in FIG. 9b for each pixel, the presence or absence of dot formation is determined. FIG. 9c shows the results of determination of the presence of absence of dot formation for each pixel in this way, and the pixels with the diagonal lines in the drawing are the pixels for which it is determined that dots are formed.

Here, a specified number each of adjacent pixels is consolidated as a pixel group, and we consider counting the number of pixels for which it is determined that dots are formed within the pixel group. As an example, a total of 8 pixels, with 4 pixels in the primary scan direction (the horizontal direction in FIG. 9) and 2 pixels in the secondary scan direction (the vertical direction in FIG. 9) are consolidated as the pixel group. FIG. 9d shows the dot count obtained by counting the pixels for which it is determined that dots are formed for each of the pixel groups consolidated in this way. For the image printing process of the first embodiment, the multilevel halftoning result value supplied from the computer 100 to the color printer 200 does not include information relating to the position of pixels at which dots are formed. However, if the following is performed, from the dot count, it is possible to restore the information of the position of pixels at which dots are formed, and to generate data representing the presence or absence of dot formation for each pixel.

FIG. 10 is an explanatory drawing showing the state of generating data representing the presence or absence of dot formation for each pixel from data showing the dot count. FIG. 10a represents the value obtained by counting the number of dots for which dots are formed for each pixel group with FIG. 9. Also, FIG. 10b shows the dither matrix referenced for determining the presence or absence of dot formation for each pixel with FIG. 9. As described above, with the dither method, a comparison is done of the image data gradation value and the threshold value set in the corresponding pixel position in the dither matrix, and if the image data gradation value is larger, it is determined that dots are formed for that pixel, and the smaller the threshold value of the dither matrix, the easier it is for dots to be formed. From this fact, it is possible to think of the dither matrix as representing the sequence of pixels for which dots are formed.

If the focus is on these kinds of properties that the dither matrix has, it is possible to set the presence or absence of dot formation for each pixel from the number of dots formed within the pixel group. For example, describing the pixel group at the farthest upper left corner shown in FIG. 10a, the number of dots formed in this pixel group is 3. Also, if the dither matrix shown in FIG. 10b is referenced, we can say that within this pixel group, the pixel position at the upper left corner, in other words, the pixel position for which a threshold value of "1" is set, is the pixel for which it is easiest for dots to be formed. Therefore, one of the three dots formed within this pixel group can be thought of as being formed in the pixel of the upper left corner. Similarly, the remaining two dots can be thought of as being formed at the pixel for which the dot formation is second easiest within this pixel group (in other words, the pixel for which the threshold value is set to "42" with the dither matrix of FIG. 10b), and at the pixel for which dot formation is the third easiest (in other words, the pixel for which the threshold value is set to "58").

Of course, the presence or absence of dot formation is affected not just by the threshold value set in the dither matrix, but also by the image data gradation value, so if the image data gradation value is extremely large, it is possible for dots to be formed sooner than pixels for which a smaller threshold value is set. However, as described above, since there is a tendency for similar (or the same) gradation value to be allocated to adjacent pixels for the image data, in almost all cases, it can be thought that dots are formed from the pixel for which dot formation is the easiest (in other words, the pixel with a small threshold value set in the dither matrix).

For the other pixel groups shown in FIG. 10a as well, in the same way, it is possible to set the presence or absence of dot formation for each pixel based on the dot count and the dither matrix threshold value. For example, for the pixel group under the pixel group described above of FIG. 10a (the second pixel group from the top of the left edge), the number of dots is 3, so if the dither matrix of FIG. 10b is referenced, these 3 dots can be thought of as respectively being formed at the pixel for which the threshold value is set to "22," the pixel for which the threshold value is set to "33," and the pixel for which the threshold value is set to "91."

For the four pixel groups shown in FIG. 10a, when the pixel position at which dots are formed is set from the data of the dot count in this way, it is possible to obtain the results shown in FIG. 10c. In FIG. 10c, the pixels shown with diagonal lines are the pixels for which it is determined that dots are formed. As is clear from comparing FIG. 10c and FIG. 9c, the distribution of dots set based on the dot count matches the distribution of dots set by comparing the image data and the threshold value for each pixel. This indicates that if a determination is made of the presence or absence of dot formation for each pixel by referencing the dither matrix, and only the number of dots formed within the pixel group is known, even if the pixel position is not known, it is possible to suitably set the presence or absence of dot formation for each pixel based on the dither matrix and the dot count. From this, even if the multilevel halftoning result value showing the number of dots formed in the pixel group is supplied to the color printer 200 from the computer 100, it is possible to suitably set the presence or absence of dot formation on the color printer 200 side, so an image can be printed without degradation of the image quality.

It is also possible to not have a big difference of the image data gradation value within a pixel group to suitably set the position of pixels at which dots are formed from the number data. As described above, the image data has the characteristic of having similar gradation values between adjacent pixels, so this condition is established in almost all cases, and therefore, even when the multilevel halftoning result value indicating the dot count is supplied to the color printer 200 and the presence or absence of dot formation is set from the multilevel halftoning result value, it is possible to print images without degradation of the image quality. In particular, when the following two conditions are satisfied, the image data gradation value and the dither matrix threshold value are compared, and exactly the same dot distribution is obtained as the results for the determination of each pixel of the presence or absence of dot formation. First, the first condition is that the gradation values of each pixel within the pixel group have the same value. Also, the details are described later, but with the multilevel halftoning result value generating process of this embodiment, it is possible to generate multi threshold result values with division of the pixel group into a plurality of areas, and in this case, it is sufficient if the gradation value of each pixel within the divided areas have the same value. For the resolution conversion process described above, when one pixel is divided into a plurality of pixels to achieve higher resolution, by consolidating pixels generated from the same pixel into a pixel group, the first condition is satisfied automatically. Also, even in cases when pixels generated from a different pixel are included in one pixel group, if the pixel group is divided so that only pixels divided from the same pixel are included for each area, it is also possible to satisfy the first condition.

The second condition is that the dither matrix referenced when determining the presence or absence of dot formation for each pixel on the computer 100 side is the same matrix as the dither matrix referenced for setting the pixel position from the number data on the color printer 200 side.

Note that for the dither method described using FIG. 8, the threshold value set in the dither matrix and the gradation value of the image data are compared, and the presence or absence of dot formation is determined based on whether either of the values is larger. In comparison to this, when the presence or absence of dot formation is set for each pixel from the dot count, as described using FIG. 10, it is determined that dots are formed for pixels for which the sequence number in which the dot is formed within the pixel group is smaller than the dot count, or for pixels for which the dot count is the same, and it is determined that dots are not formed for pixels other than these. Specifically, to set the pixel position, knowledge up to the value of the threshold value is not necessary, and it is sufficient to know the sequence for which it is easy for dots to be formed within the pixel group (in other words, the sequence number for which the dot is formed). From this, instead of the dither matrix shown in FIG. 10b, for each pixel shown within a pixel group like that shown in FIG. 10d, a matrix is stored for which the values indicating the sequence number in which dots are formed (sequence values) are set (with this specification, this kind of matrix is called a sequence value matrix), and it is possible to set the presence or absence of dot formation for each pixel while referencing the sequence value matrix for each pixel group.

In addition, when setting the presence or absence of dot formation based on the dither matrix in this way, it is possible to obtain almost the same dot distribution as when the presence or absence of dot formation using the dither method. From this, by suitably designing the dither matrix characteristics, it is possible to control the dot distribution. For example, if a matrix having the so-called blue noise mask characteristics or a matrix having green noise mask characteristics is used, regardless of the fact that image data is processed in pixel group units, it is possible to obtain images of dot distribution depending on these dither matrix characteristics. Following, this point is described with some supplementation.

Figure 11:
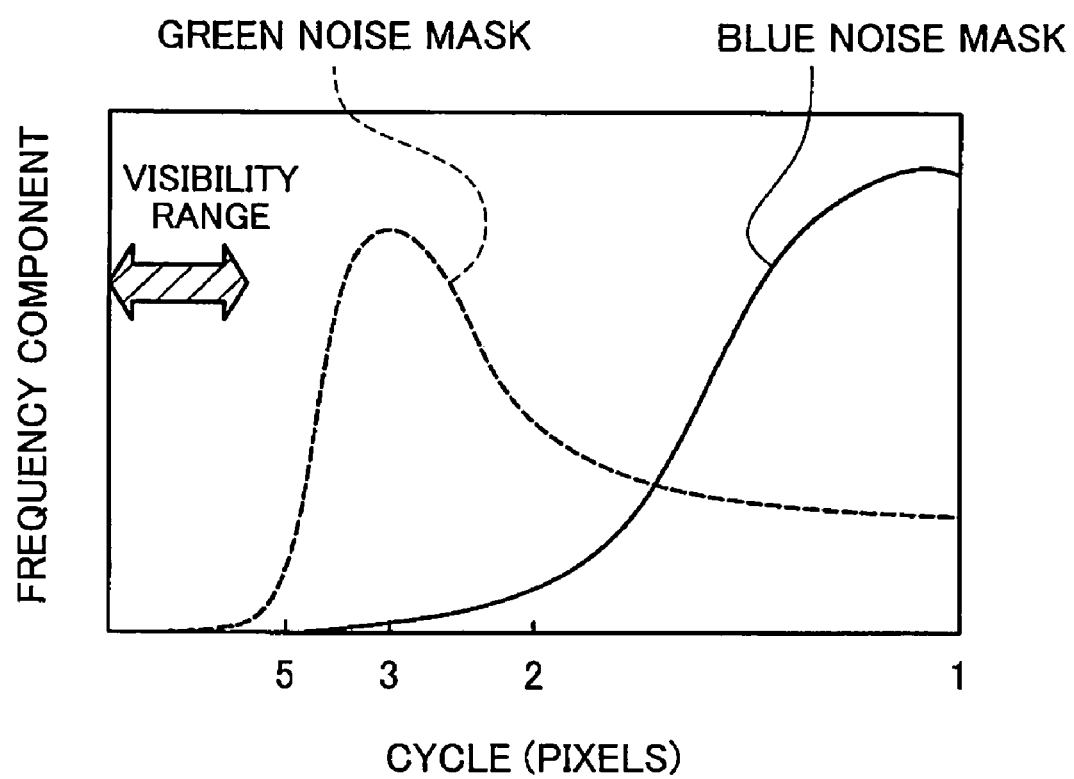
FIG. 11 is an explanatory drawing conceptually showing an example of the spatial frequency characteristics of the threshold value set in the matrix for a dither matrix having blue noise mask characteristics and a dither matrix having green noise mask characteristics.

FIG. 11 is an explanatory drawing conceptually showing an example of the spatial frequency characteristics of the threshold value set in the matrix for a dither matrix having blue noise mask characteristics and a dither matrix having green noise mask characteristics. With FIG. 11, due to display circumstances, for the horizontal axis, the cycle is used for display instead of the spatial frequency. It goes without saying that the shorter the cycle, the higher the spatial frequency. Also, the vertical axis of FIG. 11 is shown as the spatial frequency component for each cycle. Note that the illustrated frequency component indicates the smoothed state so that the change is smooth to some degree.

The solid line in the drawing conceptually shows the spatial frequency component of the blue noise mask. As shown in the drawing, the blue noise mask has the largest frequency component in the high frequency area for which one cycle length is 2 pixels or less. With the blue noise mask threshold value, from the fact that this is set to have this kind of spatial frequency characteristics, when the presence or absence of dot formation is determined based on the blue noise mask, there is a tendency for dots to be formed in a state mutually separated from each other. Also, the dotted line in the drawing conceptually shows the spatial frequency component of the green noise mask. As shown in the drawing, the green noise mask has the largest frequency component in the intermediate frequency area for which one cycle length is from 2 pixels to ten or more pixels. With the green noise mask threshold value, since this is set to have this kind of spatial frequency characteristics, when the presence or absence of dot formation is determined based on a green noise mask, while adjacent dots are formed in several dot units, there is a tendency for groups of dots to be formed in a dispersed state as a whole.

Therefore, if the pixel group number data is set or the pixel position is set based on a dither matrix having this kind of blue noise mask characteristics or green noise mask characteristics, regardless of if processing is done in pixel group units, it is possible to form dots so that the distribution reflects the blue nose mask characteristics or the green noise mask characteristics.

Also, with the description above, as shown in FIG. 10, described was a case of storing in advance a plurality of types of sequence value matrixes generated based on a dither matrix, and when number data of a pixel group is received, the presence or absence of dot formation of each pixel is set using the sequence value matrix corresponding to that pixel group. However, more simply, it is also possible to set the presence or absence of dot formation as follows. Specifically, a plurality of sequence value matrixes is stored in advance, and when number data is received, it is also possible to set the presence or absence of dot formation for each pixel using one sequence value matrix selected at random for each pixel group. Furthermore, even more simply, only one sequence value matrix set is stored, and it is possible to set the presence or absence of dot formation for each pixel using this matrix.

Figure 12:
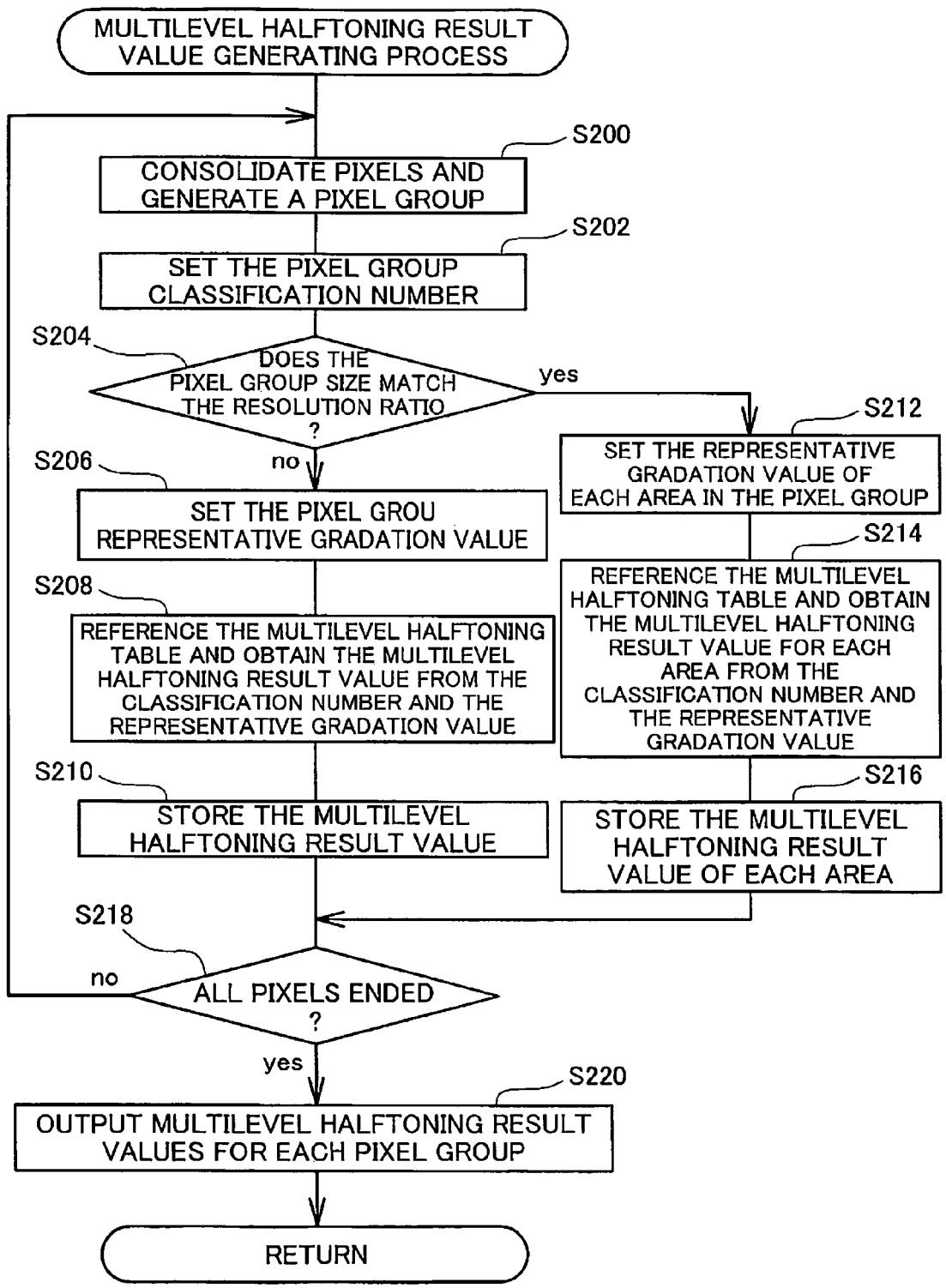
FIG. 12 is a flow chart showing the flow of the multilevel halftoning result value generating process of the first embodiment.

C-2. Multilevel Halftoning Result Value Generating Process of the First Embodiment:

Following, for the image printing process of the first embodiment shown in FIG. 5, described is the process of generating multilevel halftoning result values from the image data (step S106). FIG. 12 is a flow chart showing the flow of the multilevel halftoning result value generating process of the first embodiment. Here, the multilevel halftoning result value generating process is described as being executed by the computer 100, but as described later, it is possible to use a simple process for the multilevel halftoning result value generating process, so it is also possible to execute within the color printer 200, the digital camera 120, or the like.

Also, here, to avoid the description being complex, with the resolution conversion process (see FIG. 5) performed before the multilevel halftoning result value generating process, as shown by example in FIG. 6b, one pixel before conversion is divided into 4 parts in the primary scan direction and divided into 2 parts in the secondary scan direction, divided into a total of 8 pixels, or as shown by example in FIG. 6c, both the primary scan direction and the secondary scan direction are divided into 2 parts for division into a total of 4 pixels, and higher resolution is achieved by either of these methods. Therefore, if the resolution before the resolution conversion process is 360×360 dpi, the resolution after the conversion is either a resolution of 1440×720 dpi or 720×720 dpi. Following, the multilevel halftoning result value generating process of the first embodiment is described according to the flow chart of FIG. 12.

When the multilevel halftoning result value generating process of the first embodiment starts, first, a specified number of mutually adjacent pixels is consolidated to generate a pixel group (step S200). As described previously, the pixel group is generated from a total of 8 pixels with 4 pixels each in the primary scan direction and 2 pixels each in the secondary scan direction.

Next, the classification number of the pixel group is set (step S202). The meaning of the classification number is described later, but here, we will consider this to be the number used for identification of the pixel group. If the method described later is used, it is very easy to set the classification number of the pixel group.

Then, a determination is made of whether or not the size of the pixel group (number of pixels contained in the pixel group) matches the resolution ratio before and after the resolution conversion (step S204), and if it does match (step S204: yes), it is determined that processing is done without dividing the pixel group, and the representative gradation value of the pixel group is set (step S206). On the other hand, when the pixel group size and the resolution ratio do not match (step S204: no), it is determined that processing is done with the pixel group divided, and the representative gradation value is set for each area generated by dividing the pixel group (step S212).

Figure 13A:
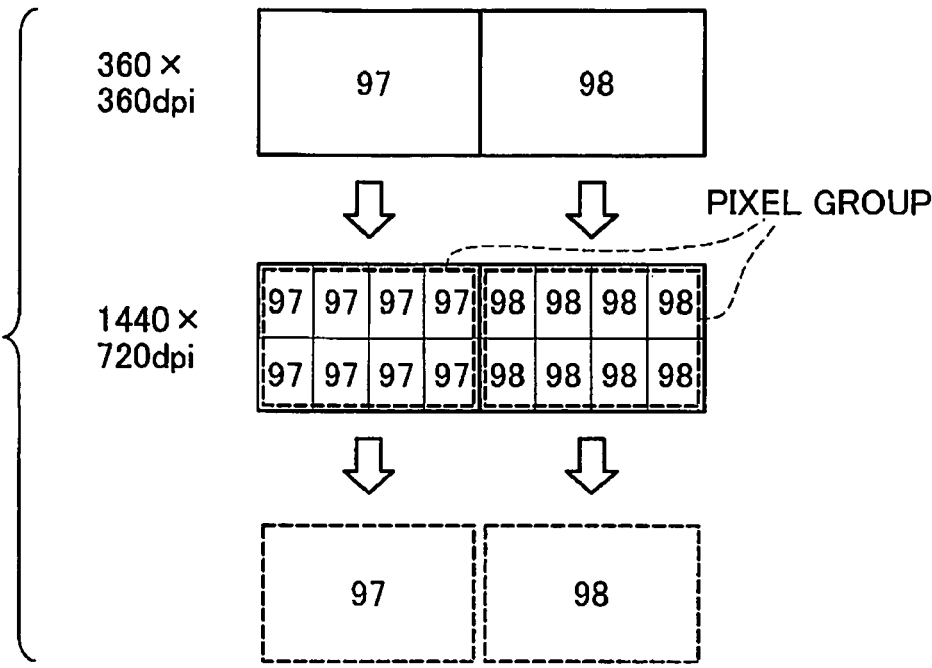
FIG. 13a and FIG. 13b are explanatory drawings conceptually showing the state of setting the representative gradation value after determining whether or not to divide the pixel group based on the resolution ratio before and after resolution conversion.

FIG. 13 is an explanatory drawing conceptually showing the state of setting the representative gradation value after determining whether or not to divide the pixel group based on the resolution ratio before and after resolution conversion. FIG. 13a shows a case when one pixel is divided into 4 parts in the primary scan direction and 2 parts in the secondary scan direction by the resolution conversion process. For example, if the image data resolution before conversion is 360×360 dpi, then the resolution after conversion will be 1440×720 dpi. When this kind of resolution conversion is performed, the primary scan direction resolution ratio is 4, and the secondary scan direction resolution ratio is 2. Also, a pixel group is generated by consolidating a total of 8 pixels, with 4 pixels each in the primary scan direction and 2 pixels each in the secondary scan direction. The rectangles shown by the dotted line in the drawing represents the state of these 8 pixels being consolidated into a pixel group.

With the example shown in FIG. 13a, the pixel group size and the resolution ratio matches for both the primary scan direction or the secondary scan direction. Specifically, for the primary scan direction, there is a match when the pixel group size is 4 pixels and the resolution ratio is 4, and for the secondary scan direction, there is a match when the pixel group size is 2 pixels and the resolution is 2. In light of this, as shown in FIG. 13a, when the pixel group size and the resolution ratio match (FIG. 12, step S204: yes), it is judged that processing is done without dividing the pixel group, and the representative gradation value of the pixel group is set (FIG. 12, step S206). With the example shown in FIG. 13a, the pixels consolidated in the pixel group all have the same gradation value, so that gradation value can be set as the representative gradation value.

Figure 13B:
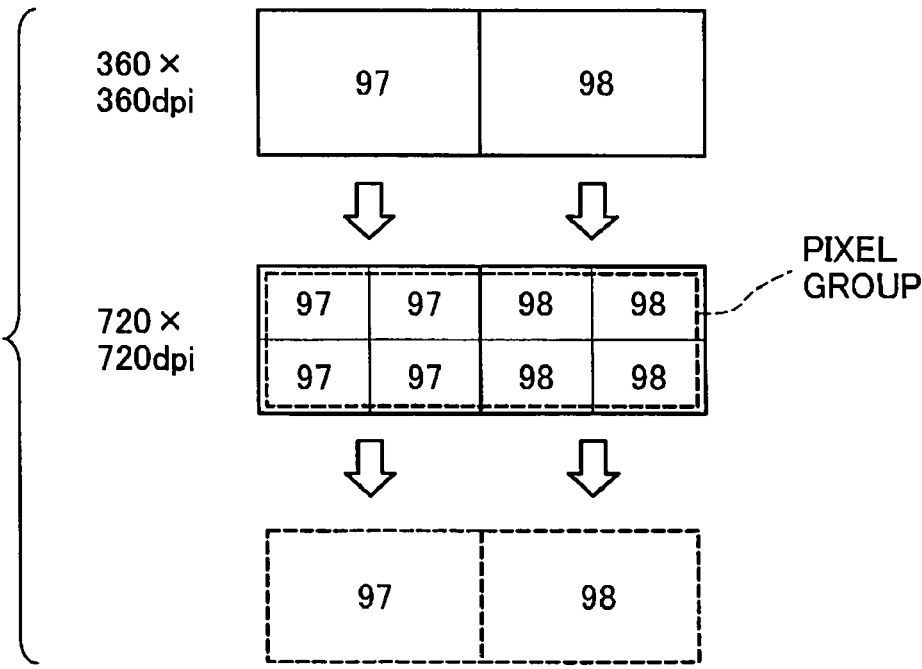

Meanwhile, FIG. 13b shows a case when one pixel is divided into 2 parts for both the primary scan direction and the secondary scan direction. For example, if the image data resolution before conversion is 360×360 dpi, the resolution after conversion is 7200×720 dpi. Even when the pixel group has this kind of resolution conversion performed, the pixel group is generated by consolidating a total of 8 pixels, with 4 pixels each in the primary scan direction and 2 pixels each in the secondary scan direction. The rectangles shown by the dotted lines in FIG. 13b represent the state of these 8 pixels consolidated into a pixel group.

With the example shown in FIG. 13b, though the pixel group size and the resolution ratio match for the secondary scan direction, they do not match for the primary scan direction. Specifically, for the secondary scan direction, there is a match because the pixel group size is 2 pixels and the resolution ratio is 2, but in the primary scan direction, there is no match because the pixel group size is 4 pixels and the resolution ratio is 2. In light of this, in this way, when the pixel group size and the resolution ratio do not match (FIG. 12, step S204: no), it is determined that processing is done with the pixel group divided, and after the pixel group is divided into 2 equal parts in the primary scan direction, the representative gradation value for each area generated by division is set (FIG. 12, step S212). By dividing the pixel group into two areas in this way, the size of each area matches the resolution ratio for both the primary scan direction and the secondary scan direction. With the example shown in FIG. 13b, the pixels within each area all have the same gradation value, so that gradation value can be used as the representative gradation value for each area.

Note that with the example shown in FIG. 13b, the pixel group is divided into 2 parts only in the primary scan direction, and is not divided in the secondary scan direction. With the example shown in FIG. 13b, this corresponds to having the pixel group size and the resolution ratio match in the secondary scan direction. Also, since having the number of divisions in the primary scan direction be 2 divisions unit that the primary scan direction pixel group size is 4 pixels and the resolution ratio is 2, if the pixel group is divided into 2 parts, this corresponds to being able to have the pixel group size and the resolution ratio match.

As is clear from the description above, for example, when with the resolution conversion process, only the primary scan direction resolution is converted to 2×, and the secondary scan direction resolution is not converted, the pixel group can be divided into 2 parts in both the primary scan direction and the secondary scan direction. By working in this way, the size of each area generated by division can match the resolution for both the directions of the primary scan direction and the secondary scan direction.

As described above, if the classification number of the pixel group is set, and one or a plurality of (2 with this embodiment) representative gradation values are set for the pixel group, by referencing the multilevel halftoning table described later, the representative gradation value is converted to the multilevel halftoning result value (step S208 or step S214). Though described in detail later, in the multilevel halftoning table, a combination of the pixel group classification number and representative gradation value is correlated, and suitable multilevel halftoning result values are stored in advance. Therefore, if the classification number and the representative gradation value are found, it is possible to find the multilevel halftoning result value immediately by referencing the multilevel halftoning table. Also, when the pixel group is divided, it is possible to obtain a plurality of multilevel halftoning result values for that pixel group.

Once the multilevel halftoning result values are obtained as described above, the multilevel halftoning result values obtained for the pixel group are stored (step S210) When the pixel group is divided, the multilevel halftoning result value obtained for each area is stored (step S216). The data format for storing the multilevel halftoning result value is described later. Next, a determination is made of whether or not the process has ended for all the pixels of the image data (step S218), and when unprocessed pixels remain (step S218: no), the process returns to step S200 and a new pixel group is generated, and the subsequent series of processes are repeated. This kind of operation is repeated, and when it is determined that the process has ended for all pixels (step S218: yes), the obtained multilevel halftoning result value is output to the color printer 200 (step S220), and the multilevel halftoning result value generating process of the first embodiment shown in FIG. 12 ends.

C-3. Classification Number Setting Method:

Here, the method of setting the pixel group classification number during the multilevel halftoning result value generating process of the first embodiment described above is described. Following, first, after describing the concept of giving a pixel group classification number, the specific method of giving the classification number is described.

Figure 14A:
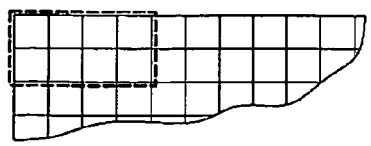
FIG. 14a through FIG. 14c are explanatory drawings showing the concept for setting a classification number for each pixel group.

FIG. 14 is an explanatory drawing showing the concept for setting a classification number for each pixel group. FIG. 14a conceptually shows the state of generating one pixel group by consolidating a total of 8 pixels with 4 pixels in the horizontal direction and 2 pixels in the vertical direction for the location at the most upper left corner of the image.

Figure 14B:
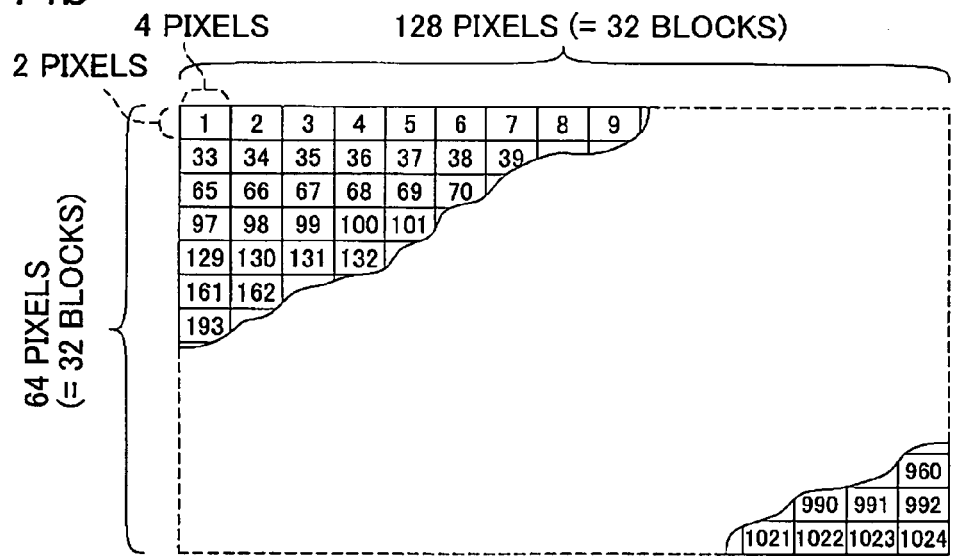

As described above, with the dither method, the gradation value of the image data allocated to a pixel and the threshold value set at a corresponding position of the dither matrix are compared, and a determination is made of whether or not to form dots for each pixel. On the other hand, with this embodiment, since a specified number of adjacent pixels are consolidated as a pixel group, a block is generated by consolidating a specified number each of the threshold values set in the dither matrix corresponding to the pixel group. FIG. 14b shows the state of generation of a plurality of blocks with 4 of the threshold values set in the dither matrix shown in FIG. 7 consolidated in the horizontal direction, and 2 each consolidated in the vertical direction. The dither matrix shown in FIG. 7 has a total of 8192 pixels of threshold values set with 128 pixels in the horizontal direction (primary scan direction) and 64 pixels in the vertical direction (secondary scan direction), so the dither matrix is divided into a total of 1024 blocks with the vertical and horizontal directions respectively having 32 each.

Figure 14C:
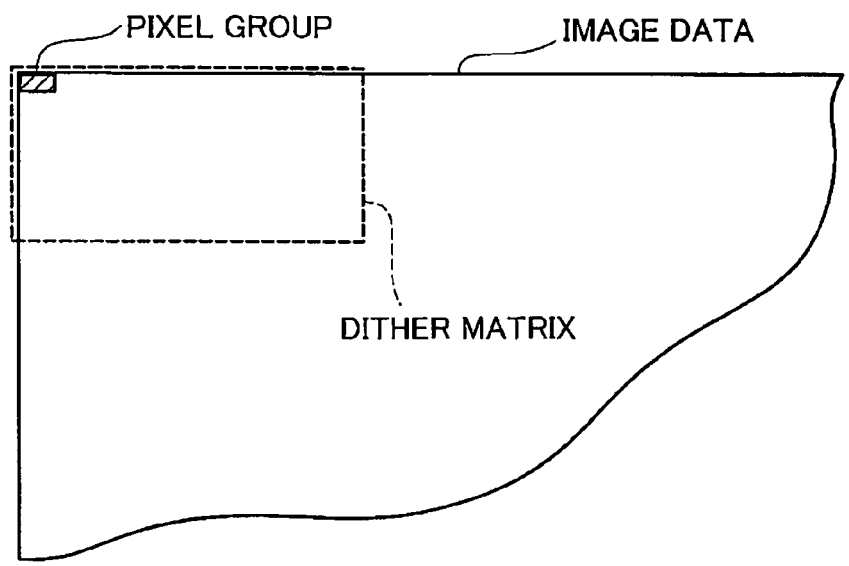

Now, as shown in FIG. 14b, a serial number from 1 to 1024 is given to these blocks. Then, when a dither matrix is used for the image data, the pixel group is classified by the block series number used for the position of each pixel group. For example, as shown in FIG. 14c, the first block of the serial number in FIG. 14b is used for the pixel group at the most upper left corner of the image, so this pixel group is classified as a pixel group of classification number 1.

The description above is the basic concept when classifying pixel groups. With step S202 of FIG. 12, when the dither matrix is used for the image data in this way, each pixel group is classified using the block serial number used for the pixel group, and the process of setting the corresponding classification number and giving it to a pixel group is performed.

Next, the specific method for setting the classification number of the pixel group is described. FIG. 15 is an explanatory drawing showing the method for setting the classification number of the pixel group. FIG. 15a represents one pixel group generated in the image. Here, focusing on this pixel group, the method of setting the classification number is described. Note that following, the pixel group focused on for setting the classification number will be called the pixel group of interest.

Now, using the pixel at the most upper left corner of the image as an origin point, the pixel position is represented by the pixel count from the origin point in the primary scan direction and in the secondary scan direction. Also, the position of the pixel group is represented by the pixel position of the pixel at the upper left corner of the pixel group. With FIG. 15a, the pixel indicating the position of the pixel group of interest is displayed with a black circle attached. We will assume that the pixel position of this pixel is (X, Y). Accordingly, the size of each pixel group is 4 pixels in the primary scan direction and 2 pixels in the secondary scan direction, so there are n and m (here, n and m are positive integers of 0 or greater) for which X=4n+1 and Y=2m+1. To say this another way, there are n pixel groups aligned at the left side of the pixel group of interest, and m pixel groups aligned at the top size of the pixel groups of interest.

Here, as described above, the pixel groups are classified based on the serial number of the block used for the pixel group of interest when using a dither matrix for the image data (see FIG. 14), and the method of using the dither matrix while moving for the image data, even with the same pixel group, classification may be done with different classification numbers. Actually, any method is acceptable for the method of using the dither matrix while moving for the image data, but here, for convenience of the description, the simplest method, specifically, moving the dither matrix in the horizontal direction, is described. FIG. 15b conceptually shows the state of repeatedly using the dither matrix for the image data while moving it a small amount at a time in the horizontal direction.

FIG. 15c conceptually shows a state of using the dither matrix for the pixel group of interest shown in FIG. 15a while repeatedly using the dither matrix as shown in FIG. 15b. When the dither matrix is moved in this way, one of the blocks in the dither matrix is used for the pixel group of interest. Here, for the pixel group of interest, the M row and N column block in the dither matrix is used. By doing this, as shown in FIG. 15a, there are n pixel groups at the left side of the pixel group of interest, and since there are m pixel groups at the time side, between N and n and M and m, a relationship is respectively established of N=n−int (n/32)×32+1, and M=m−int (m/32)×32+1. Here, int is an operator representing rounding off numbers below the decimal point to make an integer. Specifically, int (n/32) represents an integer value obtained by rounding off the numerical value below the decimal point in relation to the calculation result of n/32. In this way, if the position of the pixel group of interest is known, the numerical values M and N are found from the relational expression described above and displayed in FIG. 15d, and the block number of the block that is at the M row and N column in the dither matrix can be used as the classification number of that pixel group of interest. It is understandable that in fact, the value of M and N can be found very easily even without executing the kind of calculation shown in FIG. 15d. This point is described below.

FIG. 16 is an explanatory drawing specifically showing the method of setting the classification number of the pixel group of interest. With the position of the pixel group of interest as (X, Y), X and Y are expressed by 10 bits. FIG. 16(a) conceptually shows 10-bit binary data representing the numerical value X. In the drawing, to identify each bit, a serial number is attached and displayed from 1 to 10 going from the most significant bit to the least significant bit.

As described previously using FIG. 15, it is possible to obtain the number n of the pixel groups that are at the left side of the pixel group of interest by subtracting 1 from the numerical value X and dividing by 4. Here, dividing by 4 can be executed by shifting rightward by an amount of 2 bits, so it is sufficient to subtract 1 from the numerical value X, and to do a bit shift of the obtained binary data of 2 bits in the rightward direction. Furthermore, the numerical value X does not use just any value, but rather uses only numerical values that can be expressed by the 4n+1 expression, so it is possible to obtain the number n of pixel groups without subtracting 1, simply by doing a bit shift of 2 bits in the rightward direction of the binary data. FIG. 16(b) conceptually shows the number n binary data obtained by bit shifting the numerical value X in this way.

Next, int (n/32) is calculated. Specifically, the number n is divided by 32, and a rounding off operation of the numerical value below the decimal point is performed. Division by 32 can be executed by doing a bit shift of the binary data by an amount of 5 bits in the rightward direction, and if data is handled as an integral expression, the numerical value below the decimal point is rounded off automatically. In the end, the binary data of int (n/32) can be obtained simply by bit shifting the number n binary data by an amount of 5 bits in the rightward direction. FIG. 16(c) conceptually shows the int (n/32) binary data obtained by bit shifting the number n.

The int (n/32) obtained in this way is multiplied by 32. Multiplication by 32 can be executed by bit shifting the binary data by an amount of 5 bits in the leftward direction. FIG. 16(d) conceptually shows the binary data of the int (n/32)×32 obtained by bit shifting the number n.

Next, if int (n/32)×32 is subtracted from the number n, it is possible to obtain the numerical value N described above. As is clear from comparing the number n binary data (see FIG. 16(b)) and the binary data of int (n/32)×32 (see FIG. 16(d)), the upper 5 bits are common to these binary data, and all of the lower 5 bits of the numerical values on the subtraction side are "0." Therefore, if the lower 5 bits of the numerical value (number n) on the subtraction side are extracted as is, it is possible to obtain the found numerical value M. Specifically, simply by finding the logical product of the binary data shown in FIG. 16(b) and the mask data such as that shown in FIG. 16(f), it is possible to obtain the numerical value N extremely easily. Alternatively, by finding the logical product of the binary data of the numerical value X indicating the position of the pixel group of interest shown in FIG. 16(a) and the kind of mask data shown in FIG. 16(g), even with direct extraction of the 4th to 8th bit data, it is possible to obtain the numerical value N.

With FIG. 16, described was a case of finding the numerical value N indicating the block position in the dither matrix from the numerical value X of the coordinate value (X, Y) indicating the position of the pixel group of interest, but it is possible to find the numerical value M indicating the block position from the numerical value Y in exactly the same manner. In the end, if the position of the pixel group of interest is known, it is possible to know which block of which row and which column in the dither matrix the pixel group of interest corresponds to simply by extracting the data of a specific bit position from the binary data, and it is possible to rapidly set the classification number of the pixel group of interest using the serial number of this block.

C-4. Multilevel Halftoning Table:

As described previously using FIG. 12, with step S206 or step S214 of the multilevel halftoning result value generating process of the first embodiment, from the pixel group classification number and representative gradation value obtained in this way, the representative gradation value undergoes multilevel halftoning by referencing the multilevel halftoning table. Following, the multilevel halftoning table referenced for doing multilevel halftoning of the representative gradation value is described.

FIG. 17 is an explanatory drawing conceptually showing the multilevel halftoning table of the first embodiment referenced for obtaining the multilevel halftoning result value from the pixel group classification number and the representative gradation value. As shown in the drawing, combinations of the pixel group classification number and the representative gradation value are correlated and a suitable multilevel halftoning result value is stored in advance in the multilevel halftoning table of the first embodiment. As described previously using FIG. 14, here, the pixel group is classified to one of the classification numbers 1 to 1024. Also, if the image data is made to be 1 byte of data, since one of the gradation values 0 to 255 is used for the representative gradation value, for the combination of the classification number and the representative gradation value, there is the combination of 1024×256=262144. Set in the multilevel halftoning table are multilevel halftoning result values for all of these combinations. Note that with this embodiment, the multilevel halftoning result values are stored in a table having as parameters the classification number and the representative gradation value, but if the classification number and the representative gradation value are set, if the corresponding multilevel halftoning result value is the kind with one set, it is not absolutely necessary to store the multilevel halftoning result value in the table format.

Figure 18:
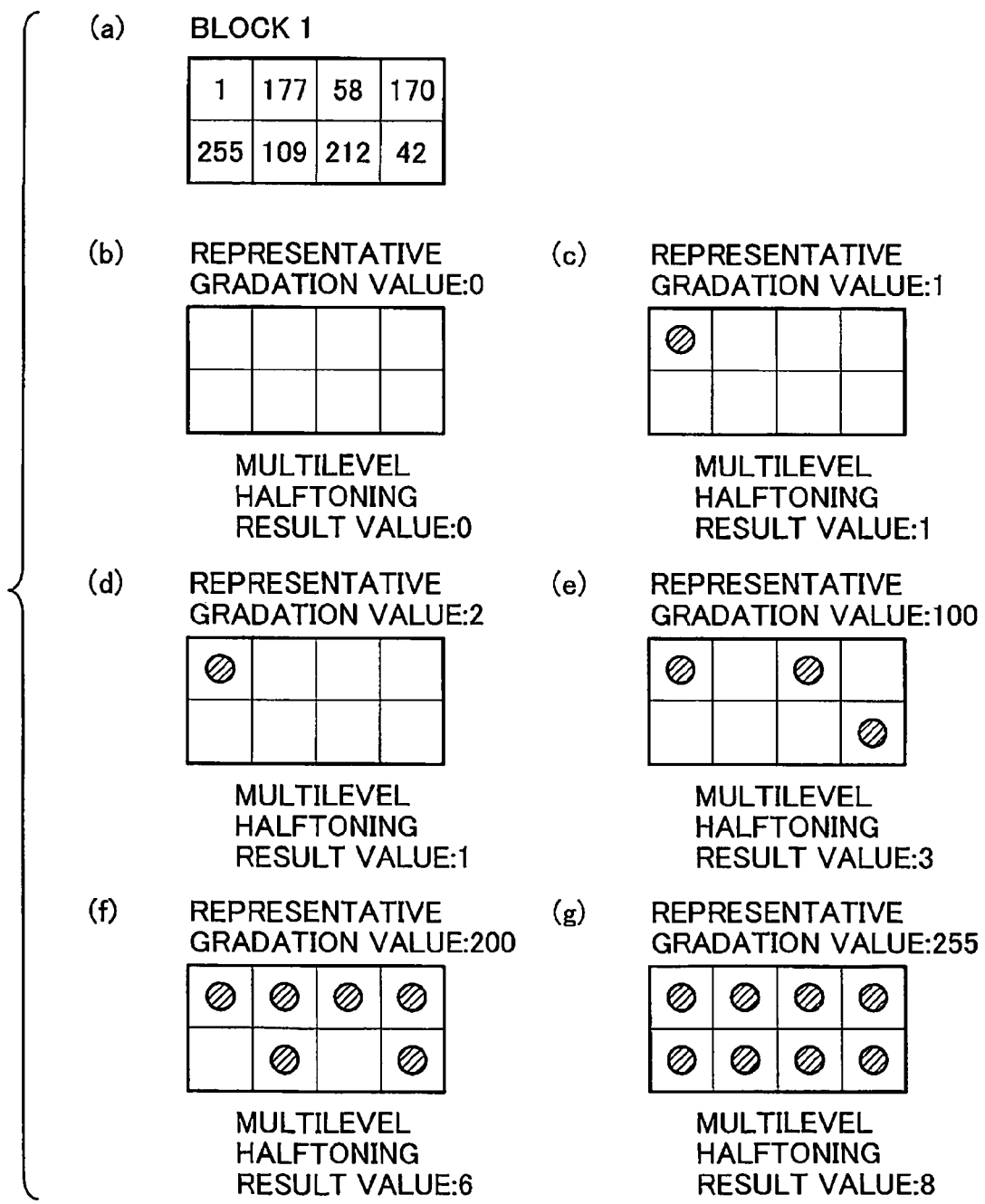
FIG. 18 is an explanatory drawing conceptually showing the state of setting a suitable multilevel halftoning result value according to a combination of the pixel group classification number and representative gradation value.

FIG. 18 is an explanatory drawing conceptually showing the state of setting a suitable multilevel halftoning result value according to a combination of the pixel group classification number and representative gradation value. As an example, the pixel group classification number is 1. The block with the serial number 2 in the dither matrix is used for the pixel group of the classification number 1. Shown in FIG. 18(a) are the threshold values set for the block of serial number 1.

Now, we will assume that the representative gradation value is "0." In this case, all of the pixels in the pixel group have image data of the gradation value 0. Then, when the gradation value of each pixel (specifically "0") and the threshold values shown in FIG. 18(a) are compared, for pixels for which the gradation value is larger (or the same), this is determined as having dots formed. After making this kind of determination for all the pixels of the pixel group, the number of dots is counted, and the obtained number is used as the multilevel halftoning result value. Any of the threshold values shown in FIG. 18(a) is also larger than the gradation value 0, so there are no pixels for which it is determined that dots are formed. In light of this, for a combination for which the classification number is 1 and the representative gradation value is "0," the multilevel halftoning result value 0 is set. FIG. 18(b) conceptually shows the state of "0" being set as the multilevel halftoning result value in relation to the representative gradation value of 0 in this way.

FIG. 18(c) conceptually shows the state of the multilevel halftoning result value being set in relation to the classification number 1 and the representative gradation value 1. In this case, all the pixels in the pixel group have image data of the gradation value 1, and the gradation value of each pixel is compared with the threshold values shown in FIG. 18(a). As a result, with the pixel at the upper left corner within the pixel group, the image data gradation value and threshold value are equal, it is determined that dots are formed, and for other pixels, it is determined that dots are not formed. The circles attached to the diagonal lines displayed in FIG. 18(c) represent the determination that dots are to be formed on that pixel. As a result, for the combination of a classification number 1 and representative gradation value "1," the multilevel halftoning result value 1 is set.

By performing this kind of operation for all the representative gradation values from 0 to 255, the multilevel halftoning result values are set. For example, when the representative gradation value is 2, as shown in FIG. 18(d), the multilevel halftoning result value is "1," and when the representative gradation value is "100," as shown in FIG. 18 (e), the multilevel halftoning result value is "3." In FIG. 18(f) and FIG. 18(g) are conceptually shown the state of respectively setting the multi threshold result value when the representative gradation value is "200," and when the representative gradation value is "255." In the multilevel halftoning table shown in FIG. 17, in the part of the line correlating to the classification number 1 (horizontal direction space shown in the table), the multilevel halftoning result values set correlated to the respective representative gradation values are values set in this way. If this kind of operation is performed for all the classification numbers from 1 to 1024, ultimately, it is possible to set the multilevel halftoning result value for all the possible combinations of all the classification numbers and all the representative gradation values. In the multilevel halftoning table shown in FIG. 17, the corresponding multilevel halftoning result value according to the combination of the classification number and the representative gradation value are set in advance.

C-5. Multilevel Halftoning Result Value Data Format:

As described previously using FIG. 12, with step S210 or step S216 of the multilevel halftoning result value generating process of the first embodiment, the obtained multilevel halftoning result values are stored, and at step S220, the stored multilevel halftoning result values are output to the color printer 200. When processing without dividing the pixel group, the multilevel halftoning result values are output one at a time to each pixel group, and when processing with the pixel groups divided, a plurality (2 each with this embodiment) are output to each pixel group. Here, as shown in FIG. 17, for the multilevel halftoning table referenced to obtain the multilevel halftoning result value, the same multilevel halftoning table is referenced whether not dividing the pixel groups or dividing the pixel groups, and therefore, the same kind of multilevel halftoning result values are obtained regardless of the presence or absence of pixel group division. In light of this, to make it possible to distinguish between items obtained for pixel groups for which the multilevel halftoning result value is unified and items obtained for each area of a divided pixel group, with steps S210 or step S216 of FIG. 12, the obtained multilevel halftoning result values are stored using the following kind of data format.

Figure 19:
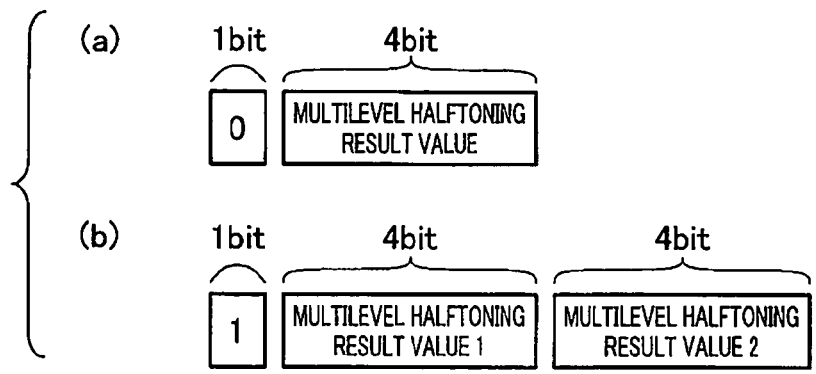
FIG. 19 is an explanatory drawing showing an example of the data format for storing the multilevel halftoning result values.

FIG. 19 is an explanatory drawing showing an example of the data format for storing the multilevel halftoning result values. With the example in the drawing, in a state with a bit indicating whether or not processing is done with the pixel group divided attached at the start of the multilevel halftoning result value, the multilevel halftoning result values are stored. For example, when processing without dividing the pixel group, as shown in FIG. 19(a), 1 bit data of value "0" is attached to the start of the multilevel halftoning result value. Here, the pixel group is constituted from 8 pixels, and since the multilevel halftoning result value represents the number of dots formed in the pixel group, as described previously, if one multilevel halftoning result value is 4 bits, this is sufficient. Therefore, when processing without dividing the pixel group, the multilevel halftoning result value is stored as a total of 5 bits of data with 1 bit added at the start.

Also, when processing with the pixel groups divided, as shown in FIG. 19(b), after the 1 bit of data of value "1," the multilevel halftoning result values of each area are stored in sequence. With this embodiment, the pixel group division format is a state with only division into 2 parts at left and right, so if the start bit is "1," there will be subsequently two 4-bit multilevel halftoning result values corresponding to the left and right areas. Therefore, when processing with the pixel group divided, the multilevel halftoning result values are stored as a total of 9 bits. Note that as the pixel group division format, this does not necessarily have to be limited to a format of division into two areas, but can also be division into a higher number of areas. For example, when the pixel group is divided into 4 areas and processed, following the 1-bit data indicating that it is divided, there are subsequently four 4-bit data indicating the multilevel halftoning result values of the respective areas, with the multilevel halftoning result values stored as a total of 17 bits of data.

Figure 20:
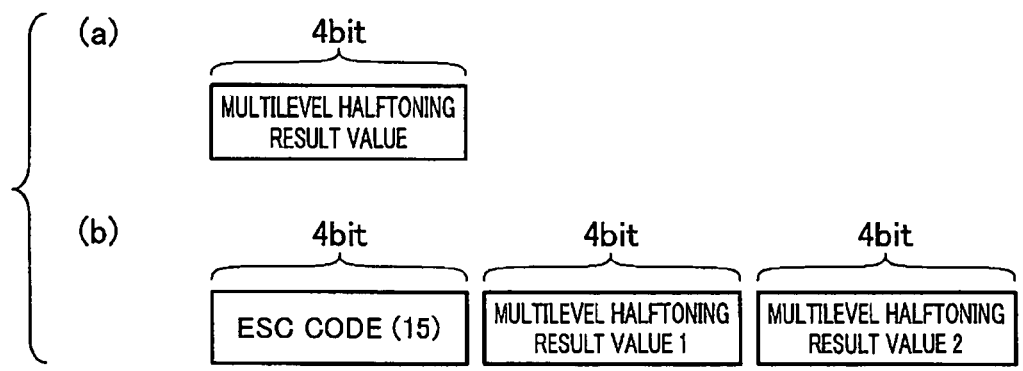
FIG. 20 is an explanatory drawing showing another example of the data format for storing the multilevel halftoning result values.

FIG. 20 is an explanatory drawing showing another example of the data format for storing the multilevel halftoning result values. As shown in the drawing, it is also possible to store data indicating there is division together with the multilevel halftoning result value only in cases when processing with the pixel group divided. Specifically, when processing as is without dividing the pixel group, as shown in FIG. 20(a), only the multilevel halftoning result values are stored as is. Meanwhile, when processing with the pixel group divided, as shown in FIG. 20(b), subsequent to special data expressing that there is division, it is also possible to store the multilevel halftoning result value of each area. As special data expressing that there is division (following, this kind of data is called ESC code), it is also possible to use any kind of data as long as it is possible to distinguish it from the multilevel halftoning result values. For example, with this embodiment, the multilevel halftoning result values is 4-bit data that can be expressed in 16 modes, but since only 9 of the modes can actually be used for the multilevel halftoning result value, 5 modes are not used and the remaining count is used. In light of this, one of the unused modes can be selected and used as the ESC code representing that the pixel group is divided. With the example shown in FIG. 20, data for which all 4 bits are "1" (with decimal display, "15") is used as the ESC code.

Note that with the description above, it is possible to display whether or not the pixel group is divided for each of the pixel groups. However, if we consider that the printing resolution does not switch within one image, it is also possible to supply data indicating whether or not processing is done with division of the pixel group in advance before supplying the multilevel halftoning result value for one image. By doing this, since it is not necessary to display whether or not processing was done with that pixel group divided for each pixel group, it is possible to rapidly supply multilevel halftoning result values.

Figure 21:
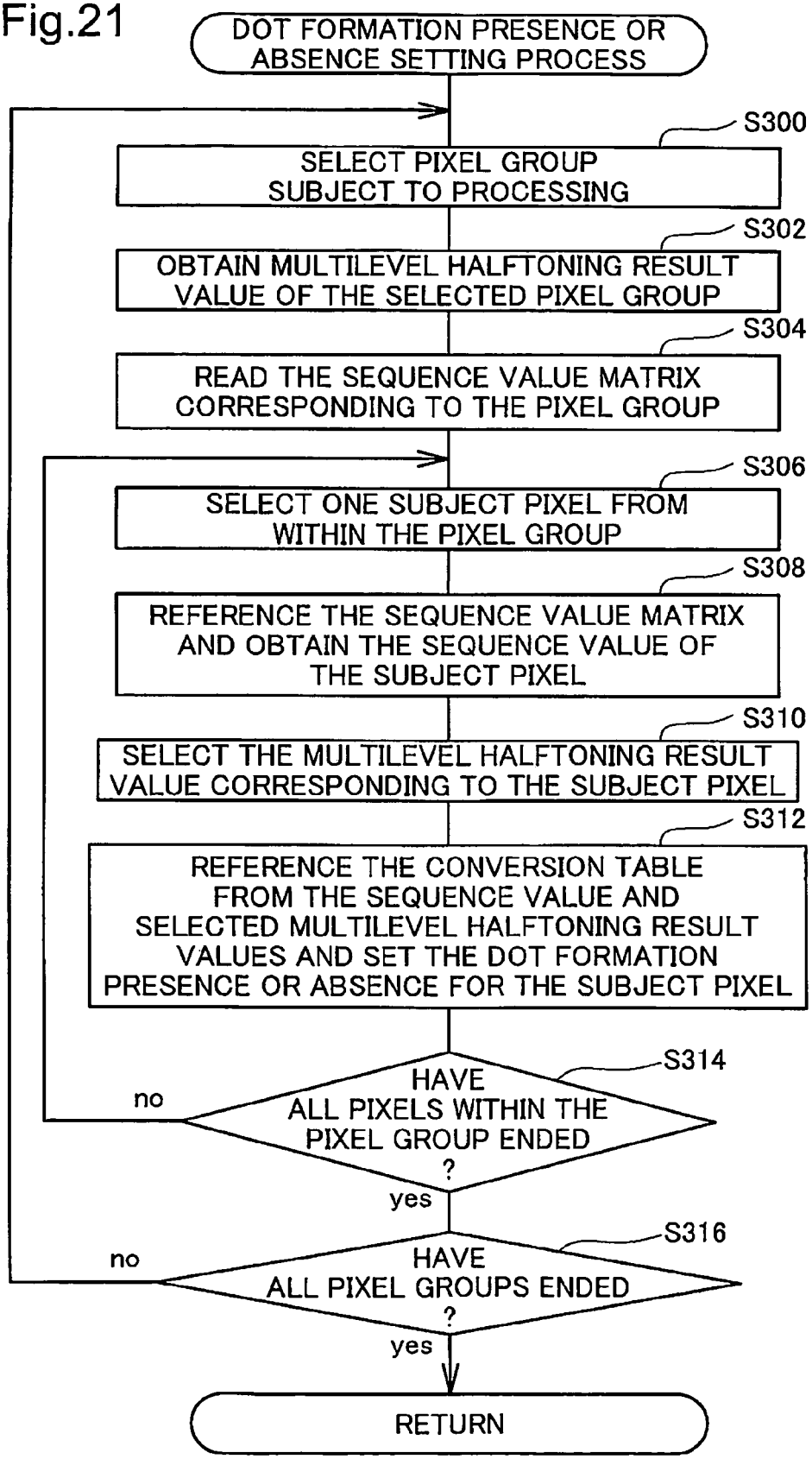
FIG. 21 is a flow chart showing the flow of the process of setting the presence or absence of dot formation of the first embodiment.

C-6. Dot Formation Presence or Absence Setting Process of the First Embodiment:

Next, for the image printing process of the first embodiment described previously, the process of setting the presence or absence of dot formation for each pixel in a pixel group based on the multilevel halftoning result values (step S108 in FIG. 5) is described. FIG. 21 is a flow chart showing the flow of the process of setting the presence or absence of dot formation of the first embodiment. This process is a process executed by the CPU built into the control circuit 260 of the color printer 200. Following, the process of setting the presence or absence of dot formation for each pixel in a pixel group based on the multilevel halftoning result values is described according to the flow chart.

When the dot formation presence or absence setting process starts, first, one pixel group subject to processing is selected (step S300), and the multilevel halftoning result values of that pixel group are obtained (step S302). For the multilevel halftoning result value generating process described previously is processed with the pixel group divided, a plurality of multilevel halftoning result values are generated, so at step S302, a plurality of multilevel halftoning result values per one pixel group are obtained.

Next, the process of reading the sequence value matrix corresponding to the selected pixel group is performed (step S304). The sequence value matrix is the matrix for which the sequence in which dots are formed is set for each pixel in the pixel group. As described previously using FIG. 10, the threshold values set for each pixel of the dither matrix can be thought of as expressing the sequence in which dots are formed for each pixel in the pixel group, so it is possible to generate the sequence value matrix corresponding to the pixel group based on the dither matrix.

Figure 22A:
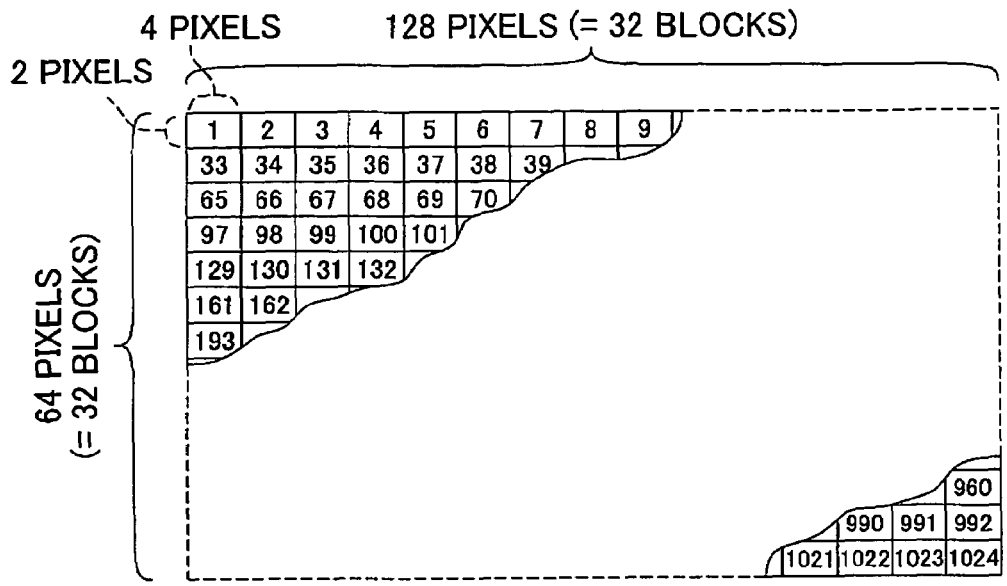
FIG. 22a through FIG. 22c are explanatory drawings showing the state of the sequence value matrix being generated based on the dither matrix.

FIG. 22 is an explanatory drawing showing the state of the sequence value matrix being generated based on the dither matrix. When generating the sequence value matrix, first, the dither matrix is divided in to the same size as the pixel groups. FIG. 22*a* conceptually shows the state of the dither matrix shown in FIG. 7 being divided. The dither matrix shown in FIG. 7 has the threshold values set for 128 pixels in the primary scan direction and for 64 pixels in the secondary scan direction, and the pixel group size is 4 pixels in the primary scan direction and 2 pixels in the secondary scan direction, so the dither matrix is divided into 1024 blocks. Then the same as when giving the classification number to the pixel group, serial numbers are attached to these blocks from number 1 to 1024.

Figure 22B:
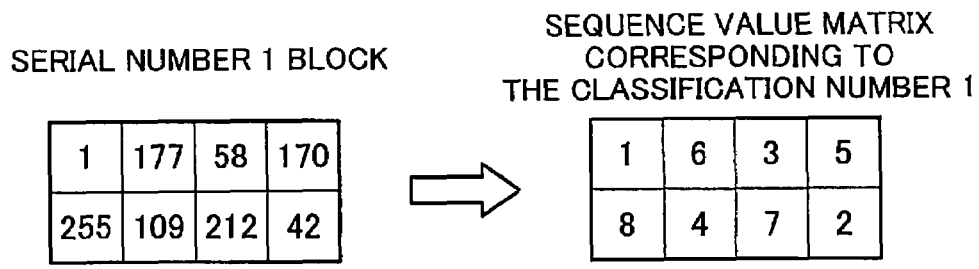
Figure 22C:
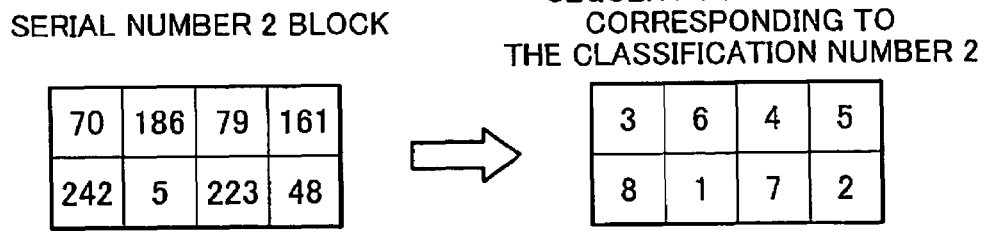

The left half of FIG. 22*b* shows the threshold values set for the serial number 1 block. As described previously, the smaller the pixel for which the threshold value is set in the dither matrix, the easier it is to form dots, so the pixel for which the threshold value "42" is set has dot formed second most easily. The pixel for which it is third easiest for dots to be formed is the pixel for which the threshold value "58" is set. In this way, it is possible to set the sequence for which dots are formed based on the threshold value set for each pixel within a block, and to generate a sequence value matrix. It is also possible to generate a sequence value matrix for the serial number 2 block in the same manner. FIG. 22*c* shows the sequence value matrix generated from the serial number 2 block. In this way, a sequence value matrix is generated and stored for all the blocks from serial number 1 through 1024. This kind of sequence value matrix is stored in the memory of the color printer 200. Then, at step S304 of FIG. 21, when the pixel group selected as the subject of processing is a classification number 1 pixel group, the sequence value matrix generated from the serial number 1 block is read, and if it is a classification number 2 pixel group, the reading process of the sequence value matrix generated from the serial number 2 block is performed.

Working in this way, once the multilevel halftoning result value and the sequence value matrix of the selected pixel group are read, this time, while selecting one at a time of the subject pixels from within the pixels contained in the pixel group, the presence or absence of dot formation is set based on the multi threshold result value and the sequence value matrix (steps S306, S308, and S310). Following, the state of setting the presence or absence of dot formation for each pixel is described while referencing FIG. 23.

FIG. 23 is an explanatory drawing conceptually showing the state of setting the presence or absence of dot formation for each pixel in a pixel group based on the multilevel halftoning result value and the sequence value matrix. FIG. 23*a* shows the read multilevel halftoning result values for the selected pixel group. Here, the pixel group is divided into two area and processed, and the multilevel halftoning result value 3 is obtained for the left area and the multilevel halftoning result value 6 is obtained for the right area. FIG. 23*b* shows the read sequence value matrix corresponding to the selected pixel group.

When setting the presence or absence of dot formation, first, one pixel is selected from within the pixel group as a subject (step S306, FIG. 21). Here, the pixel at the upper left corner within the pixel group is selected. Next, by referencing the sequence value matrix, the sequence value of the pixel that is subject, specifically, the sequence number at which the dot is formed within the pixel group, is obtained (step S310). If the sequence value matrix shown in FIG. 23*b* is referenced, it is known that the sequence value of the pixel at the upper left corner in the pixel group is "1." Next, the multilevel halftoning result value corresponding to this pixel is selected (step S310 in FIG. 21). With the example shown in FIG. 23*a*, the pixel group is divided and processed, and for each of the two areas left and right, one multilevel halftoning result value at a time is read, but since the subject pixel is the pixel at the upper left corner, the multilevel halftoning result value "3" is selected for the left side area. Of course, for the multilevel halftoning result value generating process described above, when processing is done without dividing the pixel group, only one multilevel halftoning result value is read, so this result value can be selected.

When the sequence value and the multilevel halftoning result value of the subject pixel is obtained in this way, by referencing the conversion table, the presence or absence of dot formation is set (step S312 in FIG. 21). FIG. 24 is an explanatory drawing conceptually showing the conversion table referenced for setting the presence or absence of dot formation for the subject pixel. Here, since the pixel group consists of 8 pixels, the sequence values have values from 1 to 8, and the number data has values from 0 to 8, so in the conversion table are correlated 72 combinations with these combined, and values indicating the presence or absence of dot formation are set. With the example shown in FIG. 24, "1" is set for combinations that form dots, and "0" is set for combinations that do not form dots.

For the pixel at the upper left corner of the pixel group, the sequence value is "1" and the multilevel halftoning result value is "3," so the value "1" meaning that dots are formed at the concerned location of the conversion table is set, and it is possible to determine that dots are formed for this pixel. When the presence or absence of dot formation is set for one pixel in this way, a determination is made of whether or not this is setting is done for all the pixels in the pixel group (step S314), and when there are still unset pixels (step S314: no), the process returns to step S306, and after one new pixel is selected, by performing the same operation on the selected pixel, the presence or absence of dot formation is set (steps S308, S310, and S312).

The pixel group shown in FIG. 23*a* reads the multilevel halftoning result value "3" for the left side area and the multilevel halftoning result value "6" for the right side group.

Also, as shown in the sequence value matrix of FIG. 23b, the four sequence values "1," "4," "6," and "8" are set in the area at the left side of this pixel group. Therefore, for each pixel at the left side of the pixel group, from within the conversion table shown in FIG. 24, by reading the values set at locations marked by a dotted line circle, specifically, the values set at the respective combinations of the combination of the multilevel halftoning result value "3" and the sequence value "1," or the combination of the multilevel halftoning result value "3" and the sequence value "4," the multilevel halftoning result value "3" and the sequence value "6," and the multilevel halftoning result value "3" and the sequence value "8," it is possible to set the presence or absence of dot formation. Similarly, for the area at the right side of the pixel group, the multilevel halftoning result value is "6," and for the sequence values, the four values of "1," "4," "6," and "8" are set. Therefore, for each pixel in the right side of the pixel group, it is possible to set the presence or absence of dots by reading the value set at locations marked by a dotted line square from within the conversion table shown in FIG. 24.

By working in this way, when it is determined to set the presence or absence of dot formation for all pixels contained in the selected pixel group (FIG. 21, step S314: yes), this time, a determination is made of whether or not the operation described above was performed for all the pixel groups (step S316). Then, when there are unprocessed pixel groups remaining (step S316: no), the process returns to step S300, one new pixel group is selected, and the series of operations described above is performed. When this kind of operation is repeated, and it is determined that the presence or absence of dot formation was set for all the pixel groups (step S316: yes), the dot formation presence or absence setting process of the first embodiment shown in FIG. 21 ends, and the process returns to the image printing process in FIG. 5.

Above, a detailed description was given of the multilevel halftoning result value generating process (step S106 in FIG. 5) and the dot formation presence or absence setting process (step S108 in FIG. 5) performed during the image printing process of the first embodiment. With the multilevel halftoning result value generating process described above, a specified number of pixels is consolidated to generate a pixel group, and after the classification number and the representative gradation value for that pixel group is set, the multilevel halftoning result value is generated. As described above, it is easy to find the pixel group classification number and the representative gradation value, and if the multilevel halftoning table is referenced, it is possible to very easily obtain the multilevel halftoning result value from the representative gradation value. The multilevel halftoning result values obtained in this way have a much smaller data volume compared to the data representing the presence or absence of dot formation for each pixel, so it is possible to very rapidly output data to the color printer 200 from the computer 100.

Also, with the dot formation presence or absence setting process described above, when the multilevel halftoning result value supplied rapidly from the computer 100 is received, the sequence value matrix is referenced and the sequence value for each pixel within the pixel group is obtained. Next, by referencing the conversion table based on the multilevel halftoning result values and the sequence values, the presence or absence of dot formation for each pixel is set. If the setting is done while referencing the sequence value matrix and the conversion table in this way, it is possible to rapidly set the presence or absence of dot formation for each pixel in the pixel group.

Furthermore, since it is possible to generate the multilevel halftoning result values by referencing the multilevel halftoning table, it is possible to do generation using a relatively simple process. Similarly, since it is also possible to set the presence or absence of dot formation for each pixel by referencing the sequence value matrix or the conversion table, it is possible to do setting relatively simply. Because of this, for either process, even when using equipment not equipped with high data processing capability such as the computer 100, it is possible to do processing at a sufficiently practical speed.

In addition, as described above, with the multilevel halftoning result value generating process and the dot formation presence or absence setting process, it is also possible to do processing with the pixel group divided into a plurality of areas. Therefore, if a determination is made of whether or not the pixel group is divided for processing based on the resolution ratio before and after resolution conversion, for example, even when the pixel group size is too large, it is possible to divide into more suitable size and process. Of course, rather than dividing the pixel group, it is also possible to suitably change the pixel group to be a suitable size. However, when the size of the pixel group changes, the multilevel halftoning table and the sequence values to be referenced also change, so it is necessary to prepare several tables and sequence values. In contrast to this, if processing by dividing the pixel group, the size of the pixel group itself does not change, and it is not necessary to prepare several tables and sequence values. Therefore, while it is possible to suitable change the essential processing unit, it is possible to use simple processing contents.

C-7. Variation Example of the First Embodiment:

With the first embodiment described above, when the multilevel halftoning result value is received, the sequence value for each pixel is found once from the pixel group classification number and the multilevel halftoning result value, and next, the presence or absence of dot formation for each pixel was set using the obtained sequence value and multilevel halftoning result value. In contrast to this, by referencing the decoding table described later, it is also possible to set the presence or absence of dot formation for each pixel immediately from the pixel group classification number and multilevel halftoning result value. Following, this kind of variation example of the first embodiment is described.

Figure 25:
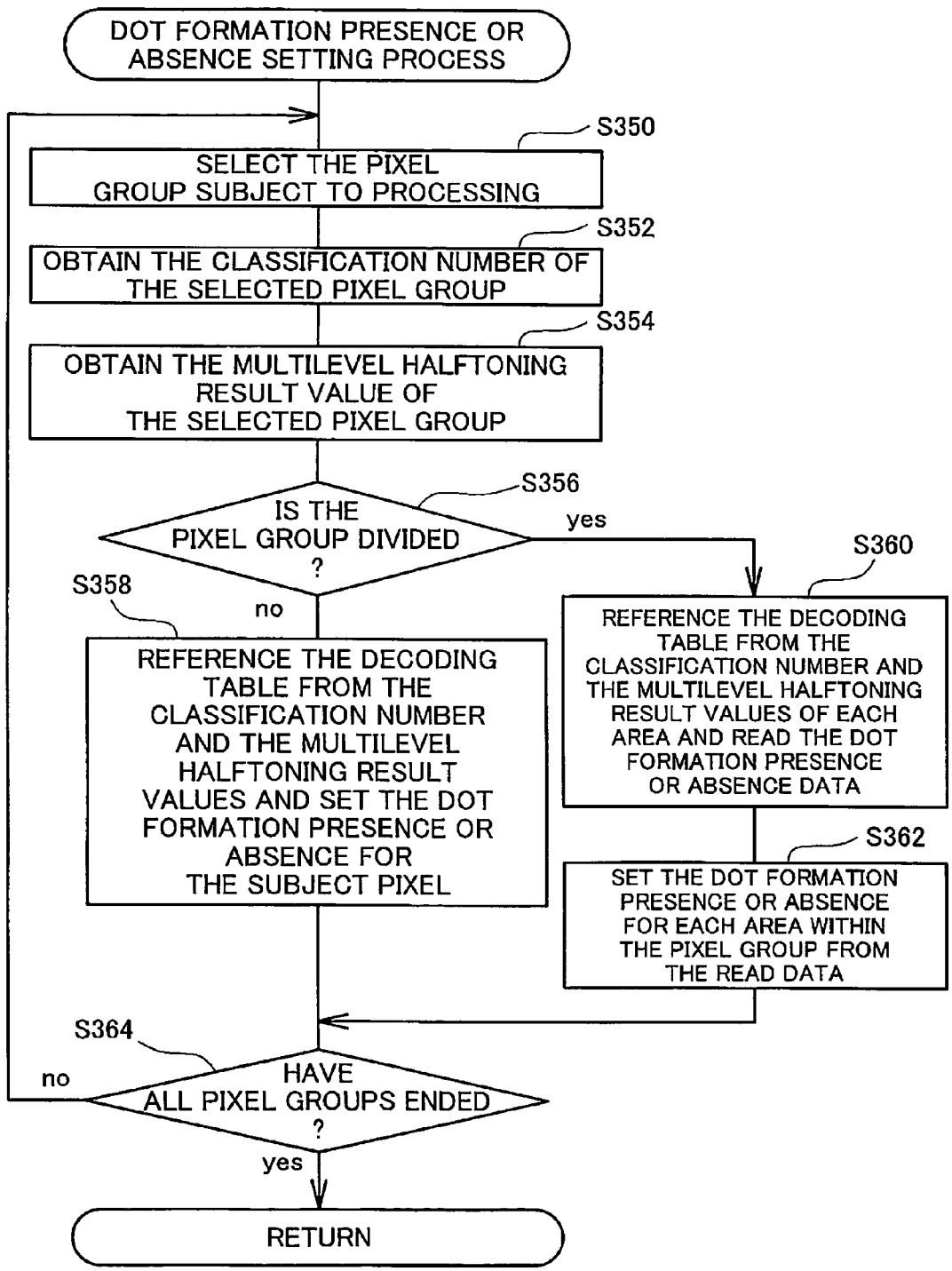
FIG. 25 is a flow chart showing the flow of the process of setting the presence or absence of dot formation for a variation example of the first embodiment.

FIG. 25 is a flow chart showing the flow of the process of setting the presence or absence of dot formation for a variation example of the first embodiment. With this process as well, the same as the dot formation presence or absence setting process of the first embodiment described above, is a process executed by the CPU built into the control circuit 260 of the color printer 200. Following, a description will be given according to the flow chart.

When the dot formation presence or absence setting process of the variation example of the first embodiment starts, first, one pixel group is selected as the processing subject (step S350), and the classification number of that pixel group is obtained (step S352). The same as with the multilevel halftoning result value generating process of the first embodiment described above, the classification number of the pixel group can be rapidly obtained from the position of the pixel group in the image.

FIG. 26 is an explanatory drawing showing the method of setting the classification number of a pixel group. Now, as shown in FIG. 26a, the pixel group subject to setting of the presence or absence of dot formation is at a position with the i-th pixel group in the primary scan direction and the j-th pixel group in the secondary scan direction with the most upper left corner of the image as a reference. Also, this kind of pixel group position is expressed by coordinate values (i, j). Also, normally, the dither matrix size is not large like the image, so as described previously using FIG. 15b, the dither matrix is used repeatedly while moving in the primary scan direction.

In one dither matrix, 32 blocks each are respectively included in the primary scan direction and the secondary scan direction (see FIG. 14b), so in the dither matrix, if the position of the subject pixel group is row I and column J, I and J can be found using the following expression.

$$I=i-int(i/32) \times 32$$

$$J=j-int(j/32) \times 32$$

Here, int is the operator described previously representing rounding off below the decimal point to make an integer. Therefore, by finding I and J using the expression above for the coordinate values (i, j) of the pixel group, it is known that that pixel group is at row I and column J in the dither matrix. From this, the classification number can be found using $$I+(J-1) \times 32 \qquad (1)$$

Also, the values I and J representing the position of the pixel group in the dither matrix can also be found very simply without executing the kind of calculation described above, simply by extracting data of specified bits from the i and j binary display. FIG. 27 is an explanatory drawing specifically showing the method for finding the position within a dither matrix of a pixel group from the coordinate values (i, j) of the pixel group. FIG. 27(a) conceptually shows 10-bit binary display data representing the numerical value i. Note that with FIG. 27(a), to identify each bit, display is done with a serial number from 1 to 10 attached from the most significant bit to the least significant bit.

When finding the value I indicating the position of the pixel group, first, by bit shifting the binary data of i by 5 bits in the rightward direction, int (i/32) is calculated (see FIG. 27(b)). Next, by bit shifting the int (i/32) binary data by 5 bits in the leftward direction, int (i/32)×32 is calculated (see FIG. 27(c)). Finally, if int (i/32)×32 is subtracted from the numerical value i, it is possible to obtain the target numerical value I. This operation ultimately is nothing more than extracting only the lower 5 bits from the binary data of the numerical value i, so it is possible to obtain the numerical value I very easily. If the numerical values I and J are found in this way, it is possible to calculate the classification number using the equation (1) described above. With step S302 in FIG. 25, as described above, the classification number of the pixel group selected as the processing subject is obtained.

Next, after obtaining the multilevel halftoning result value obtained for the selected pixel group (step S354), whether or not the pixel group was divided for processing is determined based on the read multilevel halftoning result value (step S356). As described previously using FIG. 19, when the multilevel halftoning result value has a format with a bit indicating the presence or absence of pixel group division attached at the start, if the start bit is "0," it can be determined that the pixel group is not divided for processing, and if the start bit is "1," it can be determined that processing was done in a state with the pixel group divided. In contrast to this, when the presence or absence of pixel group division is represented using the ESC code as shown in FIG. 20, if the start data of the read multilevel halftoning result value is ESC code, it is possible to determine that processing is done with the pixel group in a divided state, and when that is not the case, it is possible to determine that processing is done without dividing. Also, here, the pixel group division pattern is only a pattern with the pixel group divided equally into two areas at left and right, so two multilevel halftoning result values can be read for the divided pixel group.

Note that as described for the multilevel halftoning result value generating process of the first embodiment described above as well, the mode of pixel group division is not limited to the pattern of dividing into two parts left and right. Whether or not the pixel group is divided, rather than being displayed for each pixel group, display can also be done in advance for each image.

When processing is done without dividing the pixel group (step S356: no), the presence or absence of dot formation for each pixel in the pixel group is set by referencing the decoding table based on the pixel group classification number and the multilevel halftoning result value (step S358). Data representing the presence or absence of dot formation for each pixel in the pixel group is stored in the decoding table, and by reading the concerned data, it is possible to rapidly set the presence or absence of dot formation.

FIG. 28 is an explanatory drawing conceptually showing a decoding table referenced with the process of setting the presence or absence of dot formation for a variation example of the first embodiment. As shown in the drawing, combinations of the pixel group classification number and multilevel halftoning value are correlated to the decoding table referenced with the variation example of the first embodiment, and data representing the presence or absence of dot formation for each pixel within that pixel group is set. Note that hereafter, this kind of data representing the presence or absence of dot formation for each pixel may also be called dot data DD. Also, the dot data DD (i, j) represents dot data for pixel groups for which the classification number is i-th and the multilevel halftoning result value is "j."

FIG. 29 is an explanatory drawing showing the data structure of the dot data DD set in the decoding table of the first embodiment. As shown in FIG. 29a, the dot data DD is 8-bit data, and each bit is correlated in advance to the 8 pixels in the pixel group. With the example shown in the drawing, the start bit of the dot data DD (the bit numbered 1 in the drawing) is correlated to the pixel in the upper left corner of the pixel group, and the second bit from the start (the bit numbered 2 in the drawing) is correlated to the second pixel from the top level left in the pixel group. The remaining bits as well are each correlated to the pixels in the pixel group in the same way. In this way, the dot data DD for this embodiment being 8-bit data corresponds to the pixel group consisting of 8 pixels. Therefore, if the number of pixels in the pixel group is N, then the dot data DD is also N-bit data.

Also, the bit in the dot data DD set to "1" represents that dots are formed in the corresponding pixel, and the bit set to "0" represents that dots are not formed in the corresponding pixel. The dot data DD shown in FIG. 29a has the start bit and the 7th bit set to "1," and the other bits set to "0," so as shown in FIG. 29b, this represents that dots are formed at the pixel at the top level left edge of the pixel group and the 3rd pixel from the left of the bottom level. With step S358 of FIG. 25, the process of setting the presence or absence of dot formation for each pixel for the pixel group subject to processing is performed by referencing the decoding table shown in FIG. 28 and reading this kind of dot data DD. Note that the method of setting the kind of decoding table shown in FIG. 28 is described later.

Meanwhile, when dividing the pixel group and processing (step S356: yes), multilevel halftoning result values are obtained for each area generated by dividing the pixel group. With this embodiment, when the pixel group is divided, since it is divided into two equal areas left and right (see FIG. 13), two multi threshold result values are obtained for the divided pixel group. In light of this, the plurality of obtained multi-level halftoning result values are combined with the pixel group classification number, and by referencing the decoding table shown in FIG. 28, the dot data DD corresponding to each combination is read (step S360) Specifically, for pixel groups divided for processing, a plurality of dot data DD is also obtained. The presence or absence of dot formation for each pixel in the pixel group is set by extracting the data of each area from the plurality of dot data DD obtained in this way (step S362).

Figure 30:
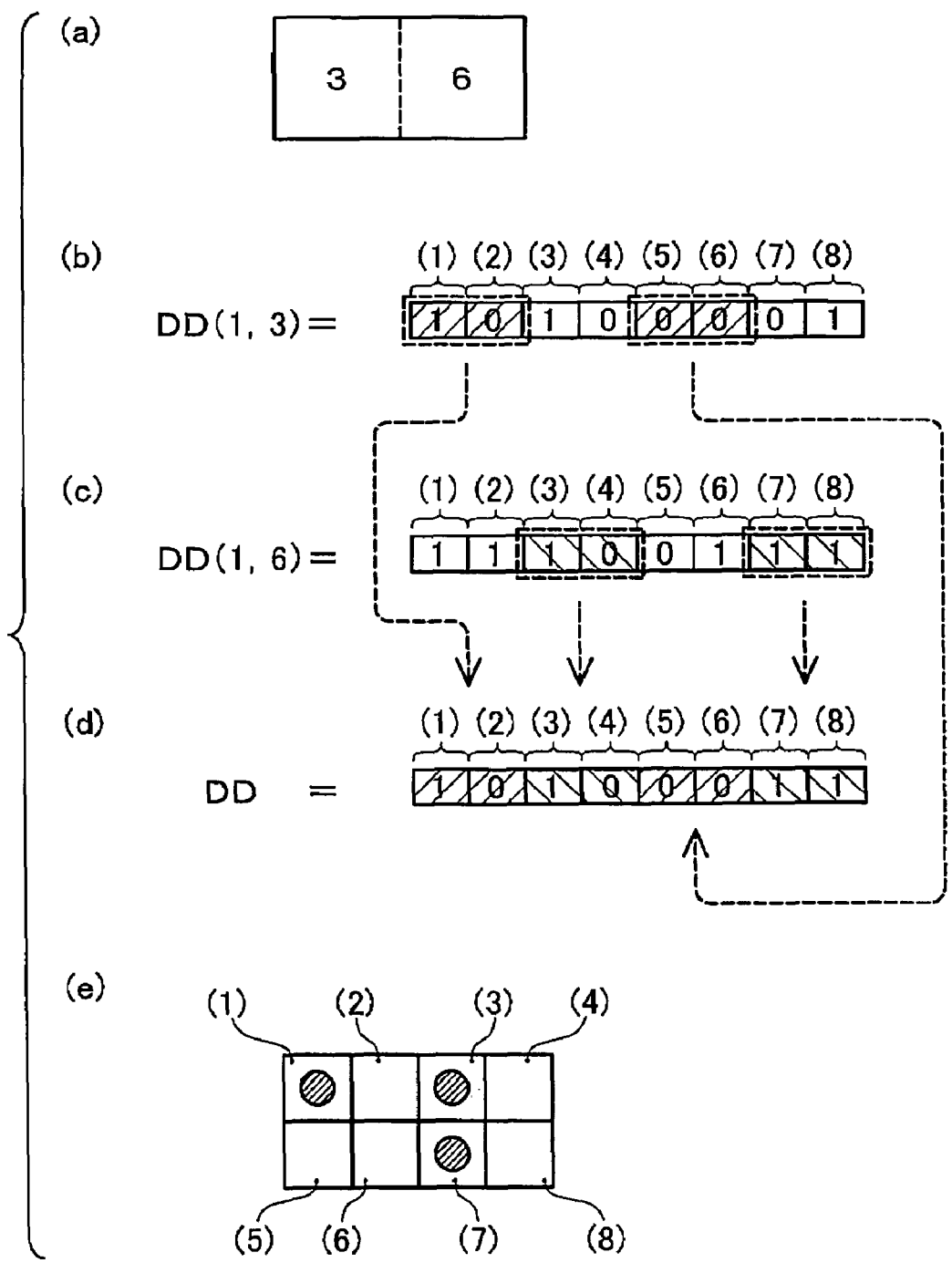
FIG. 30 is an explanatory drawing showing the state of setting the presence or absence of dot formation for each pixel within the pixel group by combining a plurality of obtained dot data.

FIG. 30 is an explanatory drawing showing the state of setting the presence or absence of dot formation for each pixel within the pixel group by combining a plurality of obtained dot data DD. Here, the pixel group classification number is "1," and as shown in FIG. 30(*a*), the left side area multilevel halftoning result value is "3" and the right side area multilevel halftoning result value is "6."

First, by referencing the decoding table, the dot data obtained from the pixel group left side area is obtained. The pixel group classification number is "1," and the left side area multilevel halftoning result value is "3," so for the left side area, the dot data DD (1, 3) corresponding to the combination of these is obtained. It is possible to obtain dot data DD (1, 6) corresponding to the combination of the classification number 1 and the multilevel halftoning result value 6 by doing the same for the pixel group right side area.

As described using FIG. 29, each bit of the dot data DD is correlated to each pixel in the pixel group. Then, here, when dividing the pixel group for processing, since the pixel group is divided into two equal areas at left and right, of the dot data DD (1, 3) obtained for the left side area, the actually used data is only the start bit and the second, fifth, and sixth bits from the start. This is because only these bits are correlated to the pixels of the left side area. With FIG. 30(*b*), in the dot data DD obtained for the left side area, the actually used bits are displayed marked with diagonal lines. Similarly, for the dot data DD (1, 6) obtained for the right side area as well, the actually used data is the third, fourth, seventh, and eight bits from the start. With FIG. 30(*c*), in the dot data DD obtained for the right side area, the actually used bits are displayed marked with diagonal lines.

By extracting and combining data of the part that is actually used from the dot data obtained for the left and right areas in this way, it is possible to obtain the final dot data DD for the pixel group that is the subject. FIG. 30 (*d*) conceptually shows the final dot data synthesized in this way. Also, FIG. 30(*e*) represents the state of dot formation for each pixel in the pixel group according to the finally obtained dot data DD.

Note that with the description above, the first 4 bits of the dot data DD are correlated to the 4 pixels of the upper level in the pixel group (specifically, the pixels numbered 1 to 4 in FIG. 29*b*), and the last 4 bits of the dot data DD are correlated to the 4 pixels of the bottom level in the pixel group (the pixels numbered 5 to 8 in FIG. 29*b*). However, here, when the pixel group is divided, since it is divided into two areas at left and right, considering this kind of division mode, it is also possible to correlate each bit of the dot data DD and the pixels.

Figure 31A:
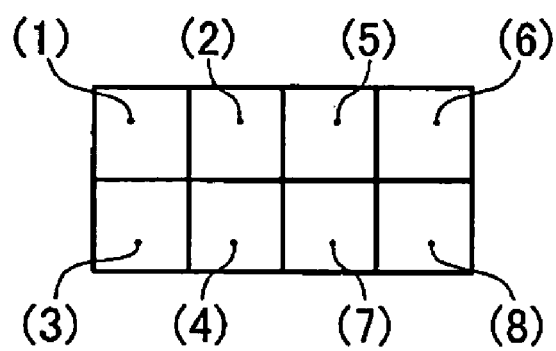
FIG. 31a and FIG. 31b are explanatory drawings showing an example of the state of the correlation of each bit of the dot data and each pixel in a pixel group considering the pixel group division mode.
Figure 31B:
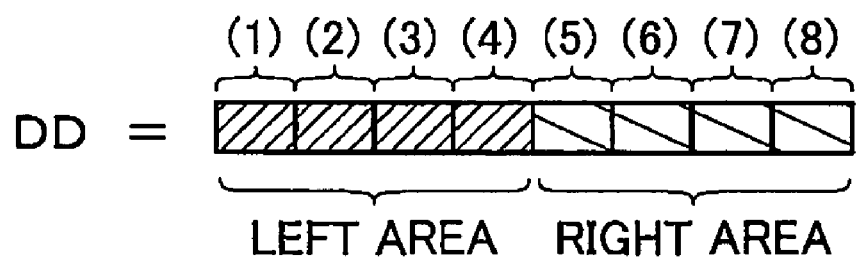

FIG. 31 is an explanatory drawing showing an example of the state of the correlation of each bit of the dot data and each pixel in a pixel group considering the pixel group division mode. FIG. 31*a* shows the state of each pixel in the pixel group being numbered using the numbers 1 through 8. Also, FIG. 31*b* shows the state of each pixel from number 1 to number 8 being correlated to each bit of the dot data DD. With the example shown in FIG. 31, the first 4 bits of the dot data DD are correlated to the 4 pixels in the left side area of the pixel group, and the last 4 bits of the dot data DD are correlated to the 4 pixels in the right side area of the pixel group. By working this way, when referencing the decoding table, rather than reading the dot data DD (1, 3) and the dot data DD (1, 6), simply by reading and combining only the first half and the last half of the dot data respectively, it is possible to obtain the final dot data. FIG. 31*b* conceptually represents the state of the final dot data being synthesized in this way.

At step S362 of FIG. 25, as described above, the process of setting the presence or absence of dot formation for each pixel in the pixel group is performed by combining the dot data obtained for each area.

When the presence or absence of dot formation for each pixel in the selected pixel group is set in this way, a determination is made of whether or not the presence or absence of dot formation was set for all the pixel groups in the image (step S364). Then, when unprocessed pixel groups remain (step S364: no), the process returns to step S300, one new pixel group is selected, and the series of operations described above is performed. When this kind of operation is repeated and it is determined that the presence of absence of dot formation was set for all the pixel groups (step S364: yes), the dot formation presence or absence setting process of the variation example of the first embodiment shown in FIG. 25 ends, and the process returns to the image printing process of FIG. 5.

Here, the method of setting the decoding table shown in FIG. 8 is described. The decoding table is set based on the principle describe above using FIG. 10, specifically, the principle of setting the pixels for which dots are formed using the number of dots formed in the pixel group and the threshold value set at the position corresponding to the pixel group in the dither matrix.

Figure 32:
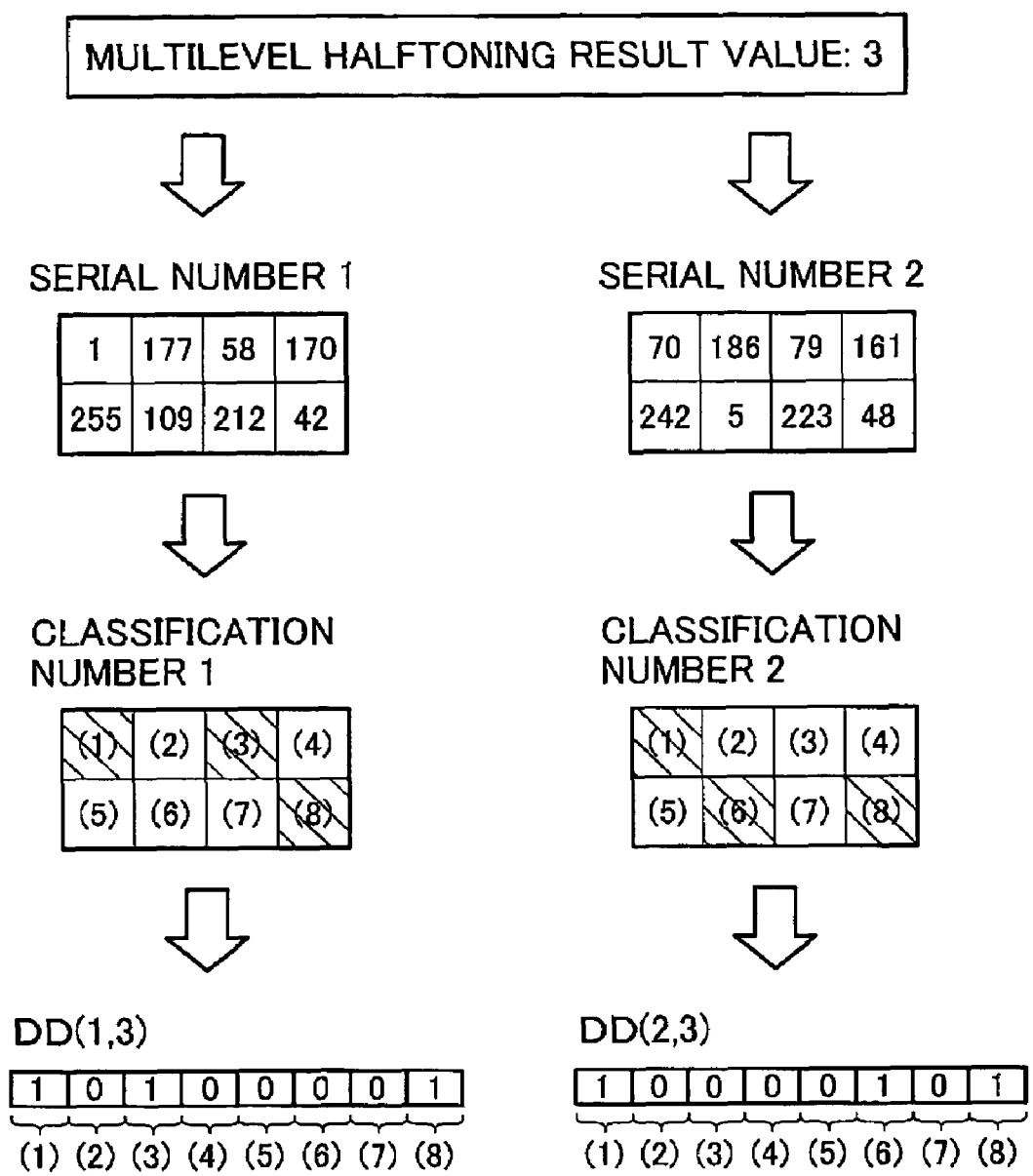
FIG. 32 is an explanatory drawing showing the method of setting the decoding table of the first embodiment.

FIG. 32 is an explanatory drawing showing the method of setting the decoding table reference with the dot formation presence or absence setting process of the variation example of the first embodiment. Here, if the pixel group multilevel halftoning result value was "3," in the left half of FIG. 32 is shown the state of setting the dot data DD (1, 3) for the pixel group with classification number 1, and the right half of FIG. 32 shows the state of the dot data DD (2, 3) being set for the pixel group with classification number 2. As described previously using FIG. 14, the block of serial number 1 in the dither matrix corresponds to the pixel group of the classification number 1, and the serial number 2 block corresponds to the pixel group of the classification number 2. At the second level from the top of FIG. 32, the threshold value set for the block of serial number 1 in the dither matrix and the threshold value set for the block of serial number 2 are set.

As described previously using FIG. 10, it is possible to think of the threshold value set in the dither matrix as representing the ease of forming dots, and the smaller the threshold number for a pixel, the easier it is for dots to be formed. Specifically, for the serial number 1 block, it is easiest for dots to be formed for the pixel for which the threshold value 1 is set, and the ease of dot formation follows the sequence of the pixel for which the threshold value 42 is set, the pixel for which the threshold value 58 is set, and the pixel for which the threshold value 109 is set. Also, the multilevel halftoning result value represents the number of dots formed on a pixel group. Therefore, for the pixel group of classification number 1, it is possible to determine that dots are formed for the pixel for which the threshold value 1 is set, the pixel for which the threshold value 42 is set, and the pixel for which the threshold value 58 is set. Similarly for the pixel group of the classification number 2, it is possible to determine that dots are formed on the pixel for which the threshold value 5 in the block of serial number 2 is set, the pixel for which the threshold value 48 is set, and the pixel for which the threshold value 70 is set. The third level from the top of FIG. 32 represents the results of determining the presence or absence of dot formation for each pixel in the pixel group in this way, and the pixels for which dots are formed are shown marked by diagonal lines.

When the presence or absence of dot formation is set for each pixel in the pixel group in this way, this can be expressed using the data format described using FIG. 29, and can be written to the corresponding locations of the decoding table. For example, for the pixel group of classification number 1 shown at the left side of FIG. 32, since dots are formed at the pixels numbered 1, 3, and 8, the dot data DD is data for which "1" is set at the first, third, and eighth bits from the start, and "0" is set for the other bits. This data is stored as dot data DD (1, 3) of the decoding table. When the kind of operation described above is performed for combinations of all the multilevel halftoning result values and all the classification numbers, and the obtained dot data is stored at the concerned location, it is possible to set the decoding table shown in FIG. 28. With the dot formation presence or absence setting process of the first embodiment described above, while referencing the decoding table set as described above, the presence or absence of dot formation is set for each pixel in the pixel group.

With the dot formation presence or absence setting process for the variation example of the first embodiment described above, when the multilevel halftoning result value supplied from the computer 100 is received, it is possible to rapidly set the presence or absence of dot formation for each pixel by referencing the decoding table. Because of this, it is possible to rapidly output images. Furthermore, the contents of the process for setting the presence or absence of dot formation for each pixel becomes a relatively simple process of referencing the decoding table, and can be executed rapidly. Because of this, even when using equipment not equipped with high data processing capability such as the computer 100, it is possible to do processing at a sufficiently practical speed.

In addition, for the dot formation presence or absence setting process of the variation example described above as well, when the multilevel halftoning result values are generated in a state with the pixel group divided, it is possible to set the presence or absence of dot formation for each area in the pixel group in accordance with this. In this kind of case as well, it is possible to use the same table for the decoding table reference to set the presence or absence of dot formation. Because of this, it is not necessary to store a plurality of decoding tables, and it is possible to execute this on equipment that does not have a large memory capacity. Furthermore, it is possible to do simple processing since the process of switching the referenced table is also unnecessary, and it is possible to execute this on equipment that does not have a high processing capability.

D. Second Embodiment

With the first embodiment described above, described was a case when there was one type of dot that can be formed with the color printer 200. However, today, with the goal of increasing the image quality, printers that are capable of formation various types of dots such as dots of different sizes or dots of different ink densities or the like (so-called multi-value dot printers) are widely used. The invention of this application is able to achieve a significant effect even when used for this kind of multi value dot printer. Following, as the second embodiment, described is a case of using the invention of this application for a multi value dot printer.

D-1. Summary of the Image Printing Process of the Second Embodiment:

The image printing process of the second embodiment is the same as the image printing process of the first embodiment shown in FIG. 5. Following, a brief description is given of the summary of the image printing process of the second embodiment while making use of the flow chart of FIG. 5.

When the image printing process of the second embodiment starts, first, after reading the image data with the computer 100, the color conversion process is performed (correlates to step S100 and step S102 of FIG. 5). Next, the resolution conversion process is performed, and after the image data resolution is converted to the printing resolution (correlates to step S104), the multilevel halftoning result value generating process is performed, and the representative gradation value of the pixel group is converted to the multilevel halftoning result value (correlates to step S106).

As described previously, with the first embodiment, there is one type of dot that can be formed by the color printer 200, and the multilevel halftoning result value represented the number of dots formed in the pixel group. In contrast to this, with the second embodiment, the color printer 200 is able to form three types of dots of different sizes, specifically large dots, medium dots, and small dots. In correspondence to this, the multilevel halftoning result values of the second embodiment represent a combination of the numbers of these various types of dots formed in the pixel group. Then, with the multilevel halftoning result value generating process of the second embodiment, the process of converting the representative gradation values of the pixel group to the multilevel halftoning result values representing the combinations of the numbers of these various types of dots. Also, when dividing the pixel group for processing, the multilevel halftoning result values are set for each area generated by division. Details of the multilevel halftoning result value generating process of the second embodiment are described later.

When the CPU built into the control circuit 260 of the color printer 200 receives the multilevel halftoning result values supplied from the computer 100, it starts the dot formation presence or absence setting process (correlates to step S108 of FIG. 5). Though described in detail later, with the dot formation presence or absence setting process of the second embodiment, after once converting the multilevel halftoning result value to intermediate data indicating the number of large dots, medium dots, and small dots, the process of determining the presence or absence of formation of each type of dot is performed for each pixel in the pixel group.

If the presence or absence of dot formation is set for each type of dot, large, medium, and small in this way, dots are formed on the printing medium according to the set dot formation presence or absence (correlates to step S110 of FIG. 5). As a result, an image corresponding to the image data is printed.

D-2. Multilevel Halftoning Result Value Generating Process of the Second Embodiment:

Next, for the image printing process of the second embodiment described above, described is the process of multilevel halftoning the representative gradation values and generating multilevel halftoning result values of the pixel group, or of each area in the pixel group. As described later, for the multilevel halftoning result value generating process of the second embodiment as well, it is possible to do generation very easily by referencing the multilevel halftoning table from the pixel group classification number and the representative gradation value. To describe why this is possible, first, a simple description is given of the process of setting the number of large, medium, and small dots formed in the pixel group using the dither method. After that, a detailed description is given of the contents of the multilevel halftoning result value generating process of the second embodiment considering the concerned description.

Figure 33:
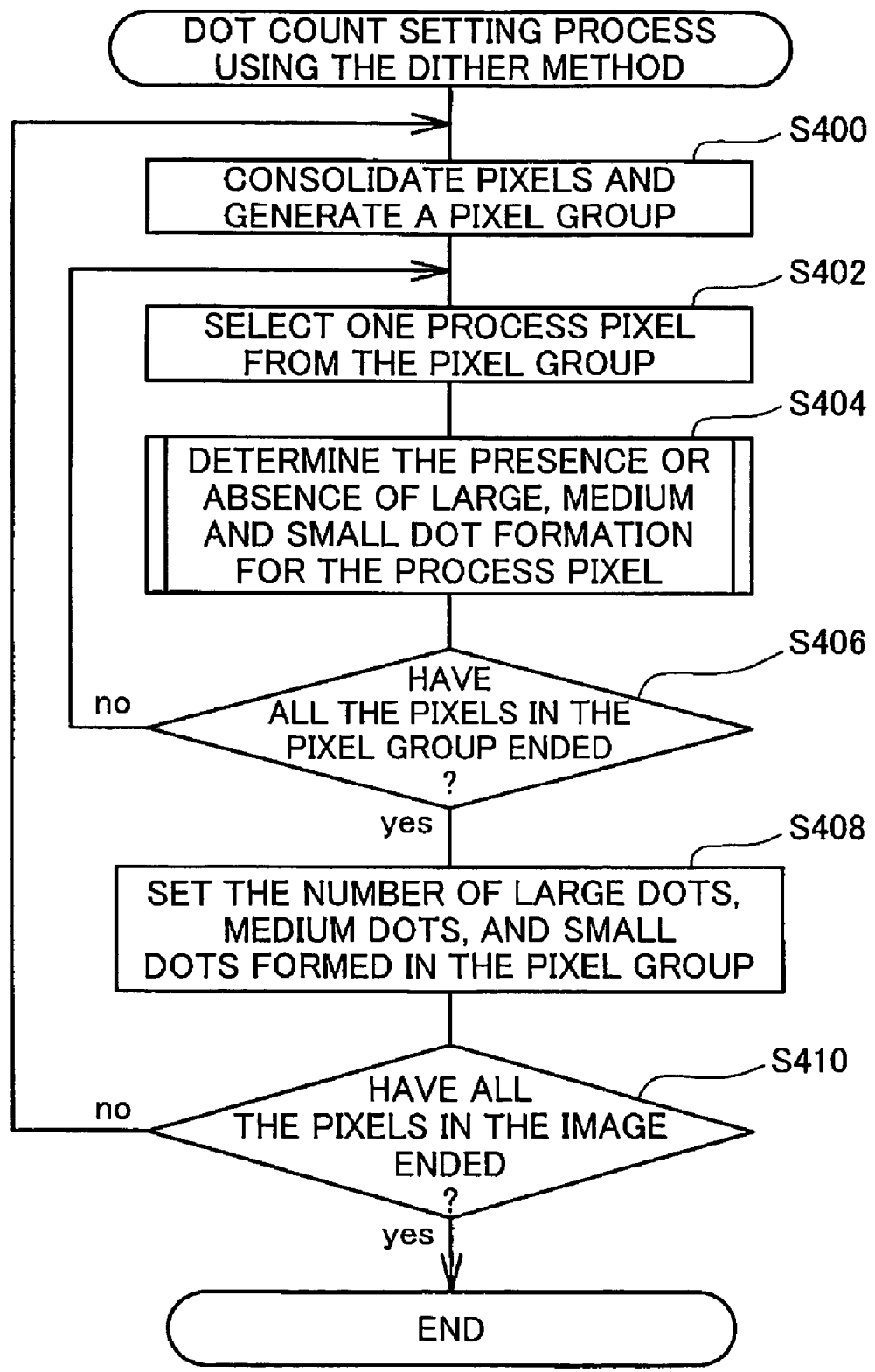
FIG. 33 is a flow chart showing the flow of the process of using the dither method to set the number of each of the large, medium and small dots formed within a pixel group.

D-2-1. Process of Setting the Large, Medium and Small Dot Formation Count Using the Dither Method:

FIG. 33 is a flow chart showing the flow of the process of using the dither method to set the number of each of the large, medium and small dots formed within a pixel group. Note that details of the process of setting the presence or absence for formation of each of the large, medium and small dots using the dither method are disclosed in Unexamined Patent No. 3292104. Specifically, the process shown in FIG. 33 can be viewed as performing the method disclosed in Unexamined Patent No. 3292104 using pixel group units. When setting the number of large, medium, and small dots as well, when the process starts, first, a specified number of mutually adjacent pixels are consolidated to form pixel groups (step S400). Here, the same as with the previously described embodiment, a total of 8 pixels, with 4 pixels in the primary scan direction and 2 pixels in the secondary scan direction are consolidated as a pixel group.

Next, to determine the presence or absence of dot formation from in the pixel group, one pixel subject to processing is selected (step s402), and for the selected processing pixel, a determination is made of the presence or absence of formation of large dots, medium dots, and small dots (step S404). The presence or absence of large, medium or small dots is determined as follows.

Figure 34:
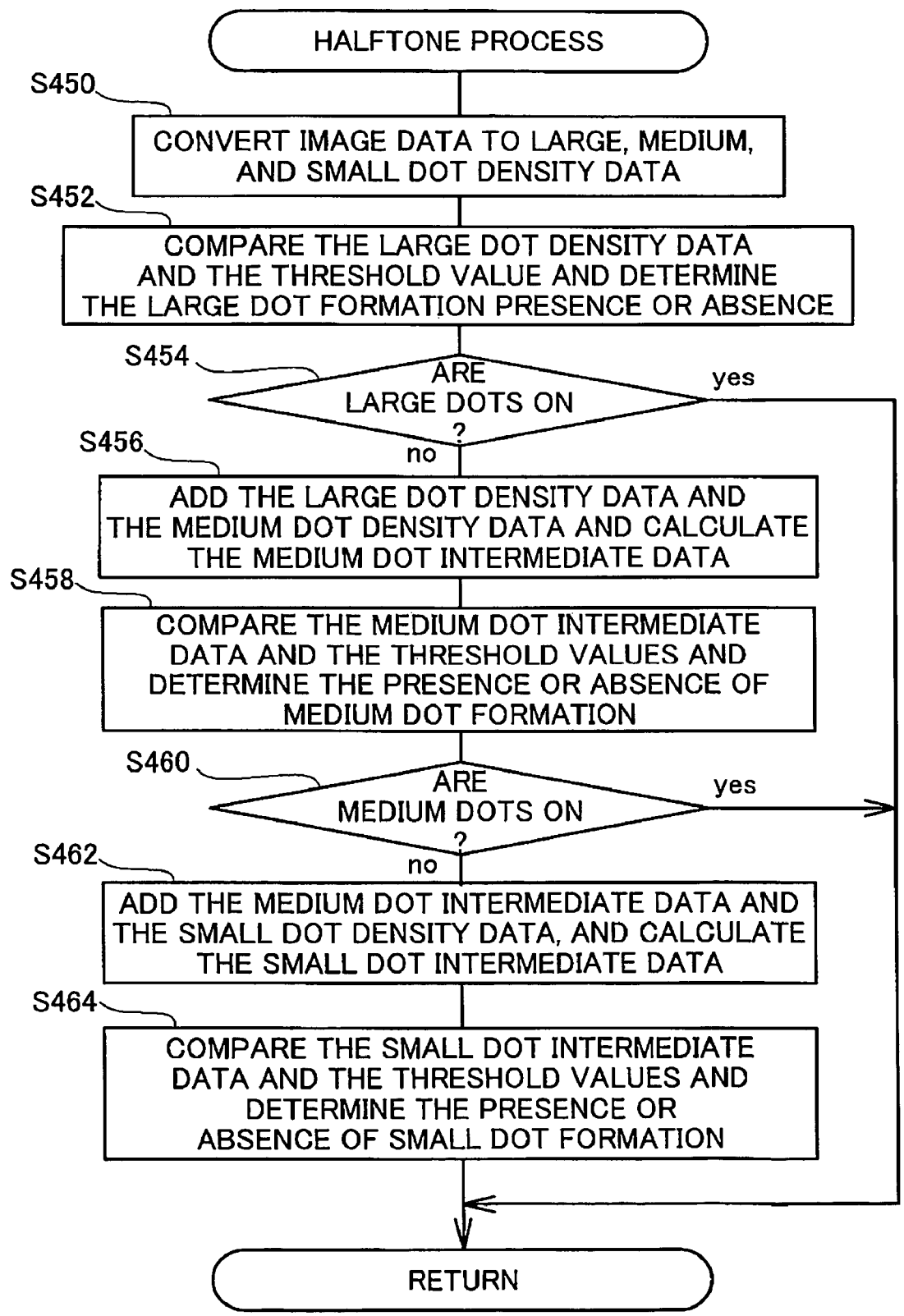
FIG. 34 is a flow chart showing the flow of a halftone process for determining the presence or absence of formation of each of the large, medium and small dots.

FIG. 34 is a flow chart showing the flow of a process for determining the presence or absence of formation of each of the large, medium and small dots by performing halftone processing for one selected pixel. When the large, medium, and small dot halftone process starts, first, image data for the pixel subject to processing is converted to density data for each dot of the large dots, medium dots, and small dots (step S450). Here, density data is data representing at what level of density dots are formed. With density data, the bigger the gradation value represents the higher the density at which dots are formed. For example, the density data gradation value "255" represents that the dot formation density is 100%, specifically that dots are formed on all the pixels, and the density data gradation value "0" represents that the dot formation density is 0%, specifically, that dots are not formed on any of the pixels. Conversion to this kind of density data can be performed by referencing a numerical table called a dot density conversion table.

Figures 35, 36, 37:
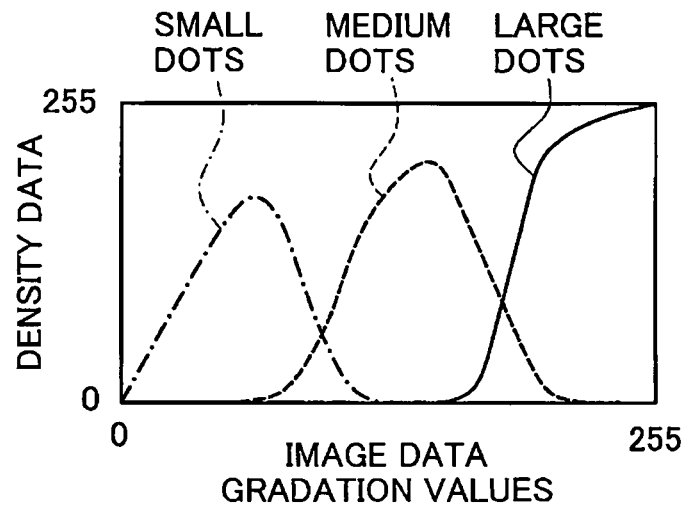
FIG. 35 is an explanatory drawing conceptually showing the dot density conversion table referenced when converting image data gradation values to density data for each of the large, medium and small dots.
FIG. 36 is an explanatory drawing conceptually showing the state of obtaining the formation count of the large, medium and small dots for each pixel group.
FIG. 37 is an explanatory drawing showing the correlation of the multilevel halftoning result values of the second embodiment and the combinations of the number of each type of dot formed in a pixel group.

FIG. 35 is an explanatory drawing conceptually showing the dot density conversion table referenced when converting image data gradation values to density data for each of the large, medium and small dots. As shown in the drawing, density data for each dots including small dots, medium dots, and large dots is set in the dot density conversion table for the gradation value of the image data obtained by color conversion. If this dot density conversion table is referenced, it is possible to rapidly convert the gradation value of the image data to large dot density data, medium dot density data, and small dot density data.

Once the density data for large, medium and small dots is obtained for the pixel subject to processing, first, a determination is made of the presence or absence of formation for the large dots (step S452 in FIG. 34). This determination is performed by comparing the large dot density data and the threshold value of the dither matrix set at the position corresponding to the pixel subject to processing. Then, when the density data is larger, it is determined that large dots are formed at the pixel subject to processing. As a result, when large dots are formed, "yes" is determined at step S454, and the process returns to the dot count setting process shown in FIG. 33 excluding the halftone process.

Conversely, if the threshold value is bigger than the large dot density data, at step S452, it is determined that large dots are not formed at the pixel subject to processing. As a result of determination, when large dots are not formed (step S454: no), this time, the process of determining the presence or absence of formation starts for medium dots. For the determination of the presence or absence of formation of medium dots, the large dot density data and the medium dot density data are added, and intermediate data for the medium dots is calculated (step S456). Then, by comparing the obtained medium dot intermediate data and the threshold value of the dither matrix, a determination is made of the presence or absence of formation of medium dots (step S458). Then, when the medium dot intermediate data is bigger, it is determined that medium dots are formed in the pixels subject to processing. When the result is that medium dots will be formed, "yes" is determined at step S460, so the process returns to the dot count setting process of FIG. 33 excluding the halftone processing.

Conversely, when the threshold value is larger than the medium dot intermediate data, at step S458, it is determined that medium dots are not formed at the pixels subject to processing. As a result of determination, when medium dots are not formed (steps S460: no), this time, the process of determining the presence or absence of formation for small dots starts. To determine the presence or absence of formation of small dots, the medium dot intermediate data and the small dot density data are added, and the small dot intermediate data is calculated (step S462). Then, by comparing the obtained small dot intermediate data and the threshold value of the dither matrix, the presence or absence of the formation of small dots is determined (step S464). As a result, when the small dot intermediate data is larger, it is determined that small dots are formed on the pixels subject to processing, and conversely, when the threshold value is larger than the small dot intermediate data, it is determined that none of the dots are formed. If the kind of process described above is performed, it is possible to determined whether any dots are formed including large dots, medium dots, or small dots for the pixels subject to processing, or whether none of the dots are formed, so the process returns to the dot count setting process of FIG. 33 excluding the halftone processing shown in FIG. 34.

When the process returns from the halftone process to the dot count setting process, a determination is made of whether or not the presence or absence of dot formation has been set for all the pixels in the pixel group (step S406 in FIG. 33). When there are still undetermined pixels remaining in the pixel group (step S406: no), the process returns to step S402 and one new pixel is selected, and a determination is made of the presence or absence of the formation of large, medium and small dots for the selected processing pixel (step S404). When this kind of operations is performed on all pixels in the pixel group, and a determination is made of the presence or absence of dot formation for all the pixels (step S406: yes), the number of large dots, medium dots, and small dots formed in the pixel group are set (step S408).

When the number of each of the large, medium, and small dots formed in one pixel group is set in this way, a determination is made of whether or not the process above was performed for all pixels of the image (step S410). Then, when unprocessed pixels remain, the process returns to step S400 and the subsequent series of processes is repeated, and when it is determined that processing for all pixels of the image has ended, the dot number setting process using the dither method shown in FIG. 33 ends. As a result, the image data is divided into a plurality of pixel groups, and the number of large dots, medium dots, and small dots formed for each pixel group is obtained. FIG. 36 is an explanatory drawing conceptually showing the state of the formation count of the large, medium and small dots in each pixel group being set for each pixel group.

D-2-2. Contents of the Multilevel Halftoning Result Value Generating Process of the Second Embodiment:

The multilevel halftoning result value generating process of the second embodiment is based on the method of determining the presence or absence of formation of large, medium, and small dots using the dither method described above, and each pixel in the pixel group has a representative gradation value, and the process is performed of multilevel halftoning the representative gradation values to values representing the number of large, medium and small dots. Specifically, the multilevel halftoning result value of the second embodiment represents the combination of the numbers of each type of dot formed in the pixel group. In light of this, first, described is the correlation between the multilevel halftoning result values of the second embodiment and the combinations of the number of each type of dot formed in the pixel group.

FIG. 37 is an explanatory drawing showing the correlation of the multilevel halftoning result values of the second embodiment and the combinations of the number of each type of dot formed in a pixel group. With the second embodiment, there is a total of 165 combinations of the number of large dots, medium dots, and small dots formed in the pixel group. Here, the types of dots that can be formed on one pixel are three types, large dots, medium dots, and small dots, and since 8 pixels are contained in the pixel group, the combination of dot counts that can be formed in one pixel group is, when simply considered, $3^8$ (=6561). However, as shown in FIG. 37, actually, there are only 165 combinations. This is due to the following reason.

Any of the large dots, medium dots, or small dots can be formed in each pixel in the pixel group, but since a plurality of dots are not formed in one pixel, the dot count total does not exceed the number of pixels in the pixel group (with the embodiment described above, 8). Therefore, the combination of the number of these large, medium and small dots is equal to the number of combinations when duplication from among the four states of "form large dots," "form medium dots," "form small dots," and "do not form dots" is allowed and 8 selections are made, so this is found using $$_4H_8(=_{4+8-1}C_8)$$

and the number of combinations is 165. Here, $_nH_r$ is an operator for finding the number of combinations (duplication combination count) that can be obtained when duplication is allowed and making r selections from within the n types of items. Also, $_nC_r$ is an operator for finding the number of combinations that can be obtained when duplication is allowed and r selections are made from within the n types of items.

If there are 165 combinations, it is possible to express this if there are 8 bits, so the multilevel halftoning result values of the second embodiment is 8-bit data. When it is possible to form the three types of dots of large, medium and small, it is possible to have four states of formation of any of the dots large, medium or small, or to not have any dots formed, so to express these states, it is necessary to have 2 bits per pixel. Since there are 8 pixels in the pixel group, 16 bits are needed to represent which of the states is taken by each pixel in the pixel group. If instead of outputting the presence or absence of dot formation for each pixel, the multilevel halftoning result value is output, the calculation allows a reduction by half of the data volume.

Figure 38:
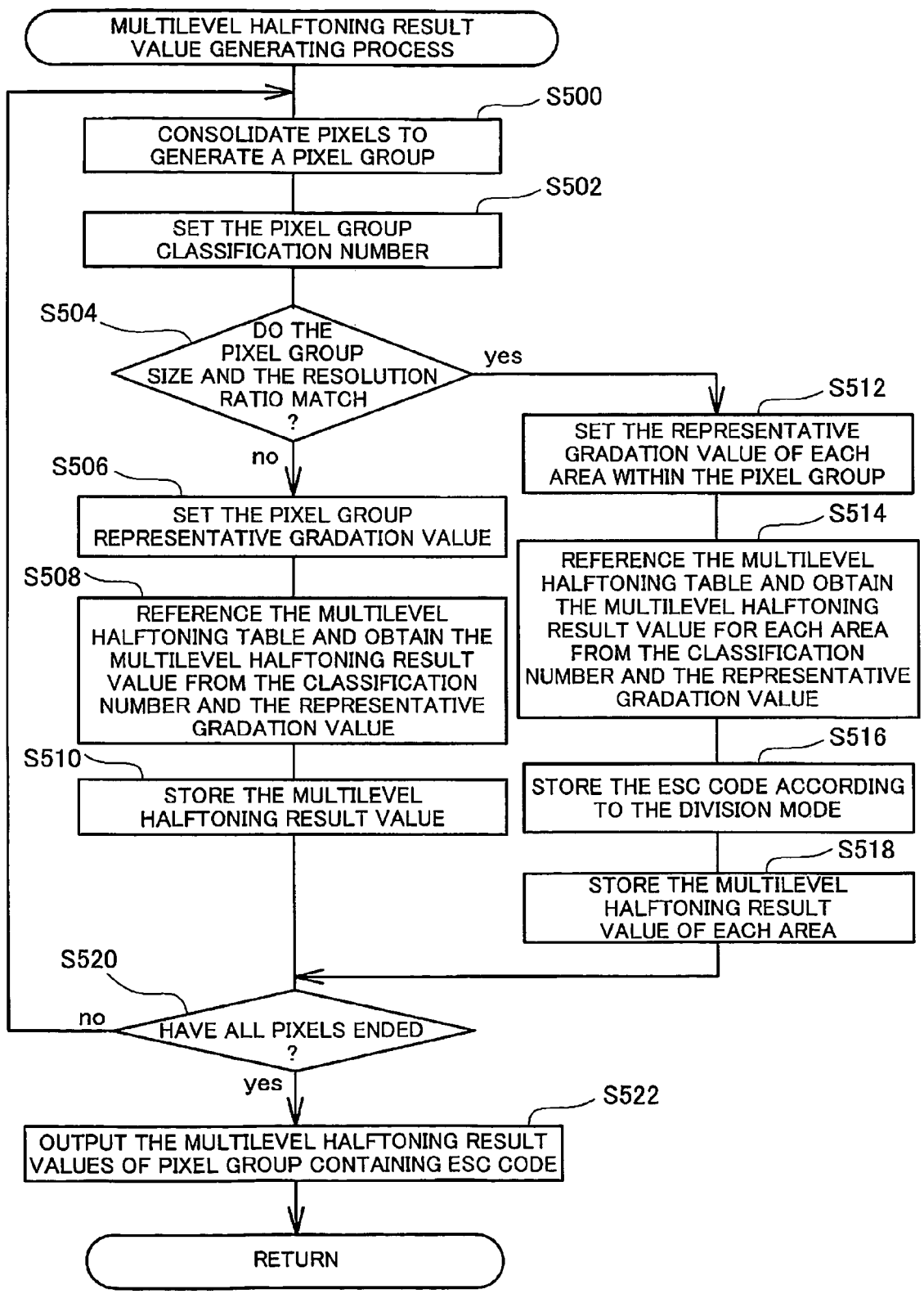
FIG. 38 is a flow chart showing the flow of the multilevel halftoning result value generating process for the second embodiment.

FIG. 38 is a flow chart showing the flow of the multilevel halftoning result value generating process for the second embodiment. As described above, in contrast to the multilevel halftoning result value of the first embodiment, the multilevel halftoning result value of the second embodiment is a value representing the number of each types of dots, but as the multilevel halftoning result value generating process, other than the difference in the referenced multilevel halftoning table, this is about the same as the process of the first embodiment shown in FIG. 12. Following, a description is given according to the flow chart in FIG. 38.

When the multilevel halftoning result value generating process of the second embodiment is started, first, after a specified number of mutually adjacent pixels is consolidated to generate a pixel group (step S500), the classification number is set based on the position of the pixel group in the image (step S502). Next, based on the resolution ratio before and after resolution conversion, a determination is made of whether or not the pixel groups are divided for processing (step S504). For convenience of the description, here, the same as the first embodiment, when dividing the pixel groups and processing, described was a case of processing with division into two equal areas at left and right as shown in FIG. 13, but it is possible to process with division into a larger number of areas. Then, when processing without dividing the pixel group (step S504: no), after setting the representative gradation values of the pixel group (step S506), by referencing the multilevel halftoning table, the multilevel halftoning result value corresponding to the pixel group classification number and representative gradation value is obtained. The representative gradation value of the pixel group is set in the same way as the first embodiment described previously.

Figures 39, 40:
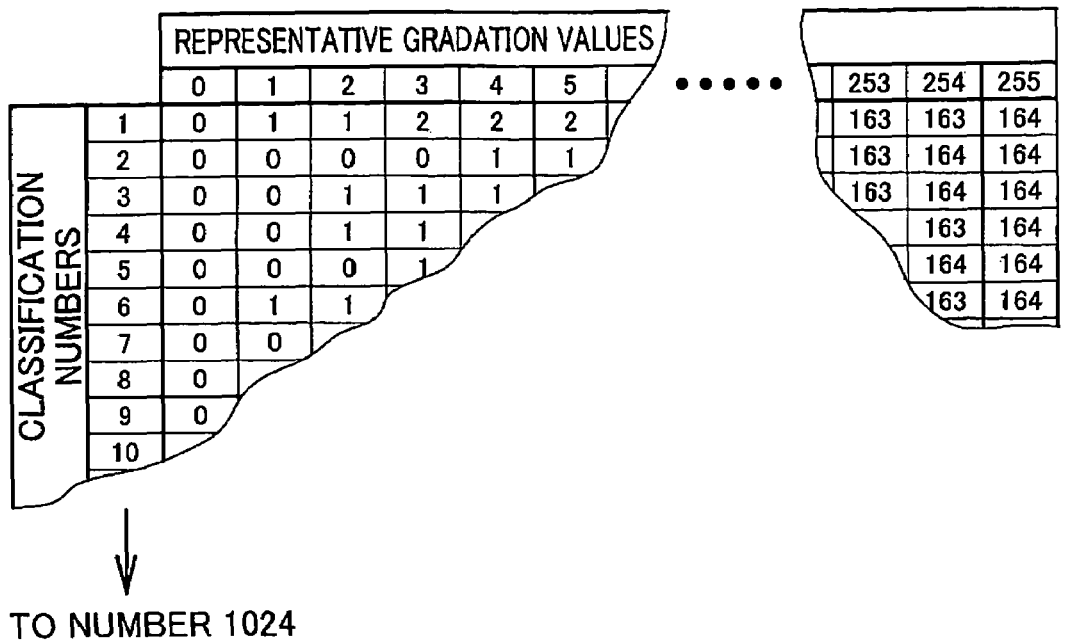
FIG. 39 is an explanatory drawing conceptually showing the multilevel halftoning table referenced with the multilevel halftoning result value generating process of the second embodiment.
FIG. 40 is an explanatory drawing showing the state of the multilevel halftoning result value and the ESC code showing the division status being allocated for the second embodiment.

FIG. 39 is an explanatory drawing conceptually showing the multilevel halftoning table referenced with the multilevel halftoning result value generating process of the second embodiment. As shown in the figure, in the multilevel halftoning table of the second embodiment, the pixel group classification number and the representative gradation value are correlated and the multilevel halftoning result value is set. This multilevel halftoning result value is a value for which all the pixels in the pixel group have a representative gradation value, the number of each type of dots formed is found using the method described with FIG. 33 through FIG. 36, and for which the obtained dot count combination is converted according to the correlation show in FIG. 37. In the multilevel halftoning table shown in FIG. 39, multilevel halftoning result values obtained in this way are set in advance, so with the multilevel halftoning result value generating process of the second embodiment, it is possible to immediately obtained the multilevel halftoning result value from the pixel group classification number and the representative gradation value simply by referencing the table. When processing without dividing the pixel group, the multilevel halftoning values obtained in this way are stored (step S510 in FIG. 38).

Meanwhile, when processing with the pixel group divided (step S504: yes), the representative gradation value is set for each area generated by dividing the pixel group (step S512). Then, by combining the representative gradation value and the pixel group classification number and referencing the multilevel halftoning table for each area, the multilevel halftoning result value for each area is obtained (step S514). Specifically, when dividing the pixel group and processing, from one pixel group, a plurality of multilevel halftoning result values is obtained for each area. When a plurality of multilevel halftoning result values are obtained in this way, first, after storing the ESC code indicating that the pixel group is divided for processing (step S516), the multilevel halftoning result value obtained for each area is stored (step S518).

FIG. 40 is an explanatory drawing showing the state of the multilevel halftoning result value and the ESC code being allocated for the second embodiment. As described previously, it is possible to get 165 multilevel halftoning result values, so the data is 8-bit data, and when the values "0" to "164" are allocated for the multilevel halftoning result values, the values "165" to "255" are open. In light of this, a value selected from any of the open values (here, "255") is allocated for the ESC code. When a plurality of pixel group division modes are prepared, it is also possible to allocate a plurality of values for the ESC code according to the type of classification mode. At step S516 in FIG. 38, the ESC code correlated to the pixel group division mode and allocated is stored.

If the ESC code representing that the pixel group is divided for processing and the multilevel halftoning result values obtained for each area are stored in this way, a determination is made of whether or not the process for all pixels of the image data has ended (step S520), and when unprocessed pixels remain (step S520: no), the process returns to step S500, a new pixel group is generated, and the subsequent series of processes is repeated. If this kind of operation is repeated, and it is determined that processing has ended for all the pixels (step S520: yes), in the case when processing is done without dividing the pixel group, only the multilevel halftoning result value is output, and in the case when the pixel group is divided for processing, the ESC code and the multilevel halftoning result value are output to the color printer 200 (step S522), and the multilevel halftoning result value generating process shown in FIG. 38 ends.

Figure 41:
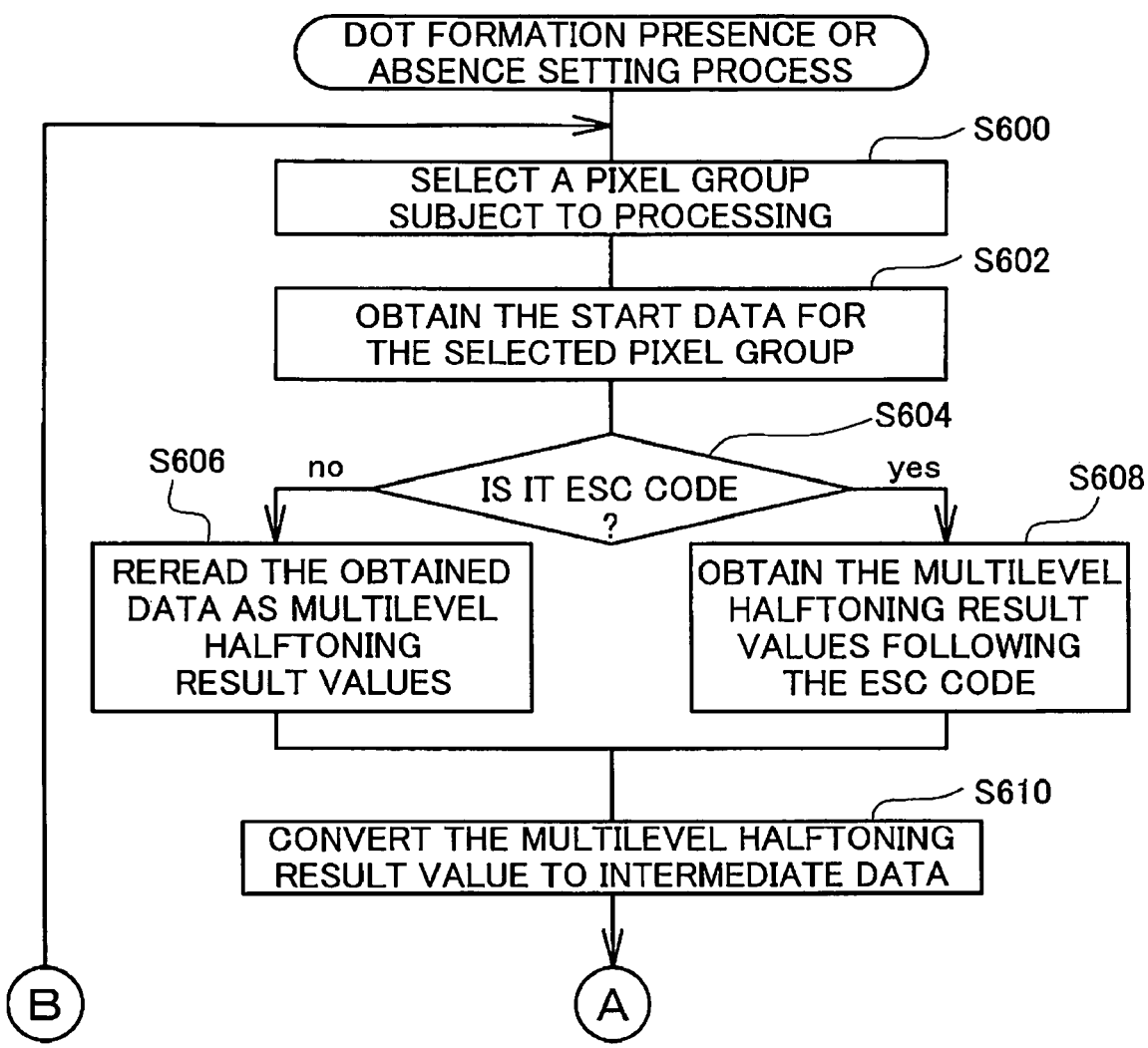
FIG. 41 is a flow chart showing the first half of the process of setting the presence or absence of dot formation for the second embodiment.
Figure 42:
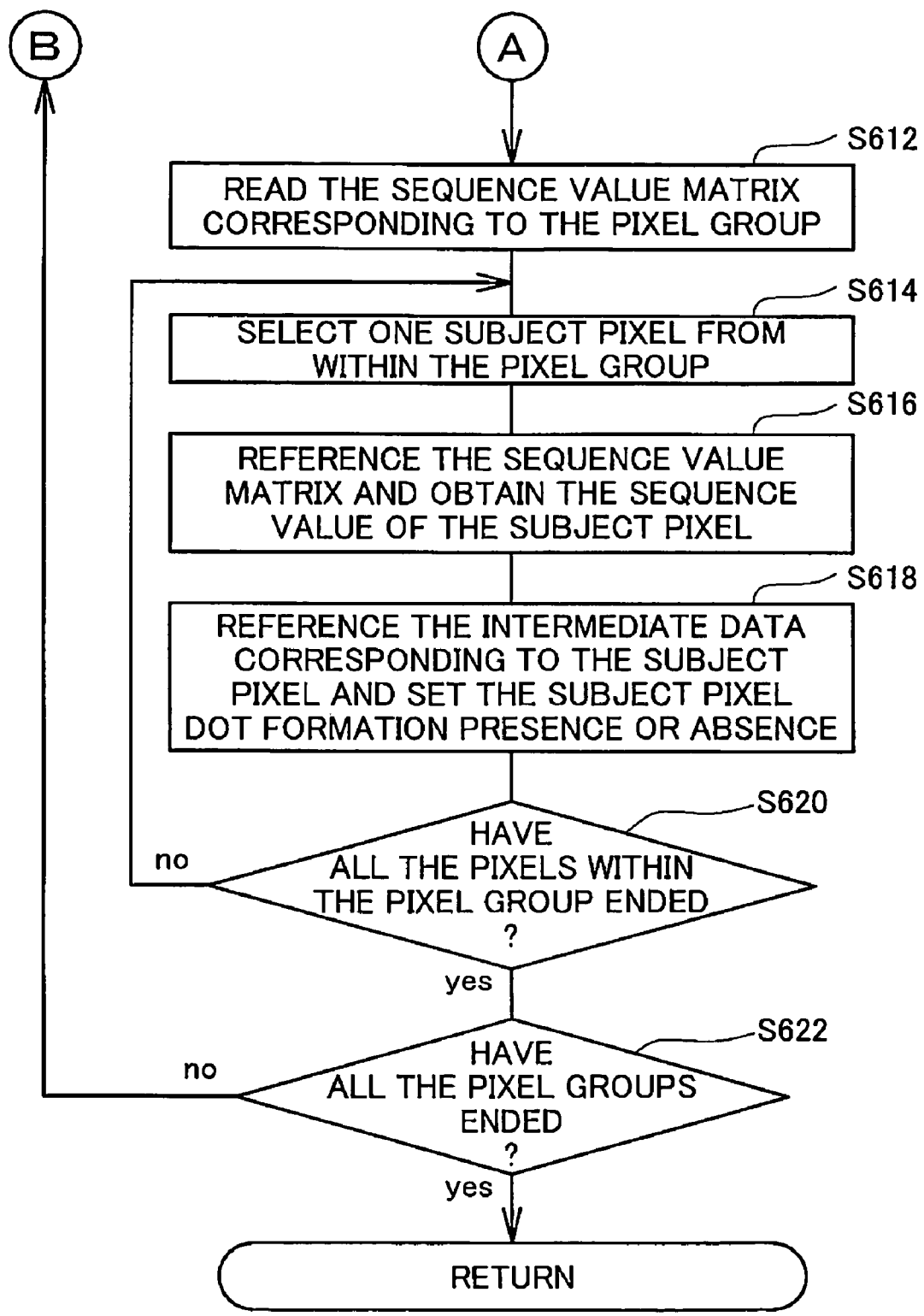
FIG. 42 is a flow chart showing the latter half of the process of setting the presence or absence of dot formation for the second embodiment.

D-3. Dot Formation Presence or Absence Setting Process of the Second Embodiment:

Next, described is the process of setting the presence or absence of formation of large, medium, and small dots after receiving the multilevel halftoning result value at the color printer 200 of the second embodiment. FIG. 41 is a flow chart showing the first half of the process of setting the presence or absence of dot formation for the second embodiment. FIG. 42 is a flow chart showing the latter half of the process of setting the presence or absence of dot formation for the second embodiment. The general flow of the process shown in these drawings is about the same as the dot formation presence or absence setting process of the first embodiment described previously using FIG. 21. However, with the second embodiment, there is a big difference in that corresponding to the fact that it is possible to form the large, medium, and small dots, after once converting the multilevel halftoning result values to intermediate data corresponding to the number of each type of dot formed in the pixel group, the presence or absence of dot formation is set for each pixel. Following, the dot formation presence or absence setting process of the second embodiment is described according to these flow charts.

When the dot formation presence or absence setting process of the second embodiment starts, first, one pixel subject to processing is selected (step S600), the start data of the multilevel halftoning result value supplied for that pixel group is obtained (step S602), and a determination is made of whether the obtained data is ESC code (step S604). Here, the pixel group division mode is only one type of mode of equally dividing into two areas at left and right, and since the ESC code "255" is allocated, and at step S604, a determination is made of whether or not the read data is "255."

Then, when the read data is not the ESC code (step S604: no), it is determined that the pixel group is processed without being divided, and the read data is reread as the multilevel halftoning result value (step S606). On the other hand, when the read data is the ESC code (step S604: yes), it is determined that the pixel group is divided, and a specified number (here, 2) of multilevel halftoning result values stored subsequent to the ESC code are obtained (step S608).

Figures 43, 44:
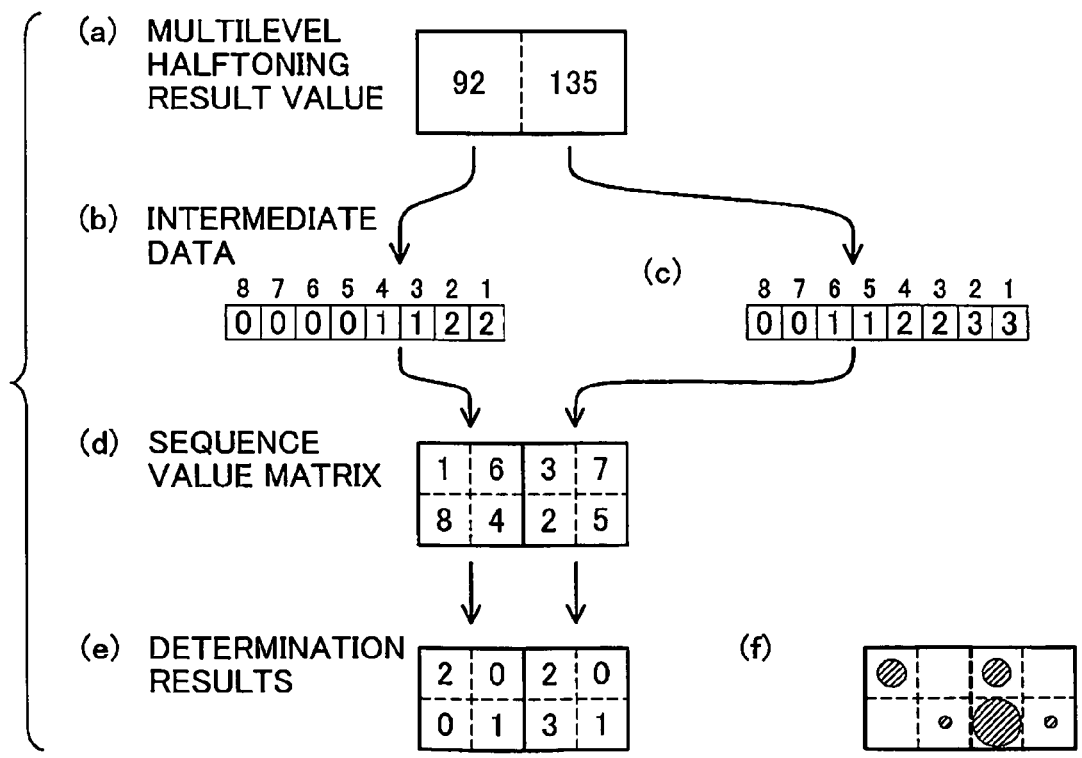
FIG. 43 is an explanatory drawing conceptually showing the intermediate data conversion table referenced for the process of setting the presence or absence of dot formation for the second embodiment.
FIG. 44 is an explanatory drawing showing the state of setting the presence or absence of dot formation using the intermediate data and the sequence value matrix for the process of setting the presence or absence of dot formation for the second embodiment.

Next, the obtained multilevel halftoning result values are converted to intermediate data corresponding to the number of each type of dot formed in the pixel group (step S610). This conversion is performed by referencing the intermediate data conversion table. FIG. 43 is an explanatory drawing conceptually showing the intermediate data conversion table referenced for the process of setting the presence or absence of dot formation for the second embodiment. As shown in the drawing, the intermediate data correlated to the multilevel halftoning result value is set in the conversion table, and with each of the respective intermediate data, values representing the type of dots to be formed are aligned in a number matching the number of pixels contained in the pixel group.

For example, to describe the multilevel halftoning result value "1," as shown in FIG. 37, the multilevel halftoning result value "1" represents the state of the dot formed in the pixel group being only one small dot, and said another way, that there is one pixel for which small dots are formed, and seven pixels for which dots are not formed. In light of this, the intermediate data for the multilevel halftoning result value "1" is data for which there are seven "0" values meaning that dots are not formed aligned, and only one "1" value meaning that small dots are formed. Note that the intermediate data is data for which these values are aligned in ascending from the start. Ultimately, the intermediate data for the multilevel halftoning result value "1" is the data "00000001." Also, the dot count corresponding to the multilevel halftoning result value is, for example, 2 for the large dots, 1 for the medium dots, and 3 for the small dots. In this case, there are two pixels for which dots are not formed, so the two values at the start are the value "0" meaning that dots are not formed, and next, there are three values "1" meaning that small dots are formed, followed by one value "2" meaning that medium dots are formed, and finally two values "3" meaning that large dots are formed. In the end, this kind of intermediate data corresponding to the multilevel halftoning result value is the data "00111233." Also, when the dots that can be formed are the three types of large dots, medium dots, and small dots, it is only possible to obtain the four values "0" through "3" for each value contained in the intermediate data, so it is possible to express each value if there are 2 bits. Therefore, if the number of pixels contained in the pixel group is 8, the intermediate data can be expressed if there are 16 bits per item.

In the intermediate data conversion table shown in FIG. 43, intermediate data generated in this way is correlated to the multilevel halftoning result values and stored. At step S610 in FIG. 41, the pixel group multilevel halftoning result value is converted to intermediate data by referencing this kind of conversion table.

Next, the process of reading the sequence value matrix corresponding to the selected pixel group is performed (step S612 in FIG. 42). As described for the first embodiment, values indicating the sequence in which dots are formed (sequence values) for each pixel in the pixel group are set in the sequence value matrix. Then, a sequence value matrix is set for each pixel group classification number.

When the intermediate data and the sequence value matrix for the selected pixel group are obtained in this way, the presence or absence of dot formation is set while selecting one pixel each for the subject pixel from within the pixel group. This state is described while referring to FIG. 44.

FIG. 44 is an explanatory drawing showing the state of setting the presence or absence of dot formation using the intermediate data and the sequence value matrix for the process of setting the presence or absence of dot formation for the second embodiment. As an example, the kind of multilevel halftoning result value shown in FIG. 44(*a*), specifically, in a state with the pixel group being divided into two parts for processing, the multilevel halftoning result value 92 is obtained for the left area and the multilevel halftoning result value 135 is obtained for the right area. Next, these multilevel halftoning result values are converted to intermediate data. FIGS. 44(*b*) and 44(*c*) show the state of the multilevel halftoning result value of the respective areas being converted to intermediate data. With the dot formation presence or absence setting process of the second embodiment, the presence or absence of dot formation is set for each pixel in the pixel group using the intermediate data and the sequence value matrix.

We will assume that the sequence value matrix of the subject pixel group was the kind of matrix shown in FIG. 44(*d*). As described previously, the sequence values are set in the sequence value matrix, and the sequence values indicate at what number dots are formed for each pixel in the pixel group. Now, since the pixel group is divided into two parts at left and right, the sequence value matrix is also divided into two parts at left and right. Then, we consider the sequence values set in the left side area being combined with the intermediate data of the left side of the pixel group, and the sequence values of the right side of the matrix being combined with the intermediate data of the right side of the pixel group.

For example, we will assume that one of any of the pixels in the pixel group is selected, and that pixel is the pixel at the upper left corner of the pixel group. By referencing the sequence value matrix of FIG. 44(*d*), it is possible to know that the sequence value of that pixel is 1. Also, since the selected pixel is in the left area of the pixel group, the intermediate data obtained for the left area is referenced. As described previously, values representing that "dots are not formed," "small dots are formed," "medium dots are formed," and "large dots are formed" are aligned from the start in this sequence in the intermediate data. Meanwhile, when forming large, medium, and small dots, first the large dots are formed, next the medium dots are formed, and last the small dots are formed. Specifically, the sequence of the dot types aligned from the start in the intermediate data is the reverse sequence of the sequence in which the dots are actually formed. Therefore, if the intermediate data is read from the final end, it is possible to know from the types of dots including large, medium, and small dots how many of each kind are formed in that pixel group. Now, since the sequence value of the selected pixel is 1, when the value at the final end is read from the intermediate data of the left area, "2" is obtained, so it is possible to determine that the dot to be formed on that pixel is a medium dot.

Also, when the lower right corner pixel of the pixel group is selected, for example, by referencing the sequence value matrix, we know that the sequence value of that pixel is 5. The selected pixel is in the right area, so when the intermediate data of the right side of the pixel group is referenced and the fifth value from the final end is read, "1" is obtained, and it is possible to determine that the dot to be formed in that pixel is a small dot.

With step S614 through step S620 in FIG. 42, while selecting subject pixels one at a time from within the pixel group in this way, the presence or absence of dot formation is set. Following, to give a simple description according to the flow chart, first, one subject pixel is selected from within the pixel group (step S614 in FIG. 42), and by referencing the sequence value matrix, the sequence value of the subject pixel is obtained (step S616). Next, the intermediate data corresponding to the subject pixel is referenced, and which dots of large, medium, and small are to be formed is set (step S618). Specifically, when processing is done without dividing the pixel group, only one intermediate data is obtained, so the presence or absence of dot formation is set by referencing this data. Also, when processing is done in a state with the pixel group divided, a plurality of intermediate data are obtained, so by referencing the intermediate data obtained for the area that contains the subject pixel, the presence or absence of dot formation is set.

When the presence or absence of dot formation for this subject pixel is set in this way, a determination is made of whether or not this has been set for all the pixels in the pixel group (step S620). When there are still pixels for which the presence or absence of dot formation has still not been set in the pixel group (step S620: no), the process returns to step S614 and a new pixel is selected, and by performing the subsequent series of operations, the presence of absence of dot formation is set. This kind of operation is repeated, and when it is determined that the presence or absence of dot formation for all pixels included in the pixel group has been set (step S620: yes), this time, a determination is made of whether or not the operation described above was performed for all the pixel groups (step S622). Then, when there are unprocessed pixel groups remaining (step S622: no), the process returns to step S600, one new pixel group is selected, and the series of operations described above is performed. This kind of operation is repeated for all the pixel groups, and when it is determined that the presence or absence of dot formation has been set for all the pixel groups (step S622: yes), the dot formation presence or absence setting process of the second embodiment shown in FIG. 41 and FIG. 42 ends, and the process returns to the image printing process of FIG. 5.

Above, the multilevel halftoning result value generating process (FIG. 38) and the dot formation presence or absence setting process (FIG. 41, FIG. 42) performed during the image printing process of the second embodiment were described. With the image printing process of the second embodiment, it is possible to print high image quality images by forming various types of dots, large, medium, and small.

Also, generally, when the types of dots that can be formed increase, the process of determining the presence absence of dot formation is complex, and in addition, the data volume to be supplied to the color printer from the computer increases. Because of this, though high image quality images are obtained, there was an unavoidable tendency for the printing speed to decrease. However, compared to the first embodiment, the image printing process of the second embodiment increases the data length of the multilevel halftoning result value from 4 bits to 8 bits, but the process of generating the multilevel halftoning result values itself is no different, with simply referencing the multilevel halftoning table from the pixel group classification number and the representative gradation value, so it is possible to output the multilevel halftoning result values rapidly with a very simple process. Also, compared to the fact that when expressing the presence or absence of the formation of large, medium, and small dots for each pixel that 16 bits are necessary, even when the multilevel halftoning result values are 8 bits, the data volume is reduced by half. Therefore, it is possible to rapidly supply the multilevel halftoning result values from the computer 100 to the color printer 200, and it is possible to rapidly output a high image quality image.

Meanwhile, even when setting the presence or absence of dot formation, with the second embodiment, though the multilevel halftoning result values are converted once to intermediate data, it is possible to rapidly set the presence or absence of dot formation of each pixel based on the intermediate data and the sequence value matrix. Also, for the process of converting the multilevel halftoning result values to intermediate data as well, it is possible to rapidly execute this because it is a simple process of simply referencing the table. Because of this, there is no tendency to cause more complex processing or to decrease the processing speed regardless of the fact that it is possible to output high image quality images by forming large, medium, and small dots.

In addition, the same as with the first embodiment, for the second embodiment as well, it is possible to use a simple process for any of the processes of the multilevel halftoning result value generating process and the dot forming presence or absence setting process, so even for equipment that does not have high level processing capability such as a computer, it is possible to execute at a sufficiently practical speed.

Also, for the image printing process of the second embodiment described above as well, the same as with the first embodiment described previously, it is possible to do processing for suitable size areas by dividing the pixel groups. At this time, regardless of whether or not pixel groups are divided for processing, it is possible to use the same time for the multilevel halftoning table, the sequence values, and the like, so it is possible to save memory capacity.

D-4. Variation Example of the Second Embodiment:

For the dot formation presence or absence setting process of the second embodiment described above as well, the same as with the first embodiment described above, it is possible to set the presence or absence of dot formation more rapidly by referencing the decoding table. Following, a variation example of this kind of second embodiment is described.

Figure 45:
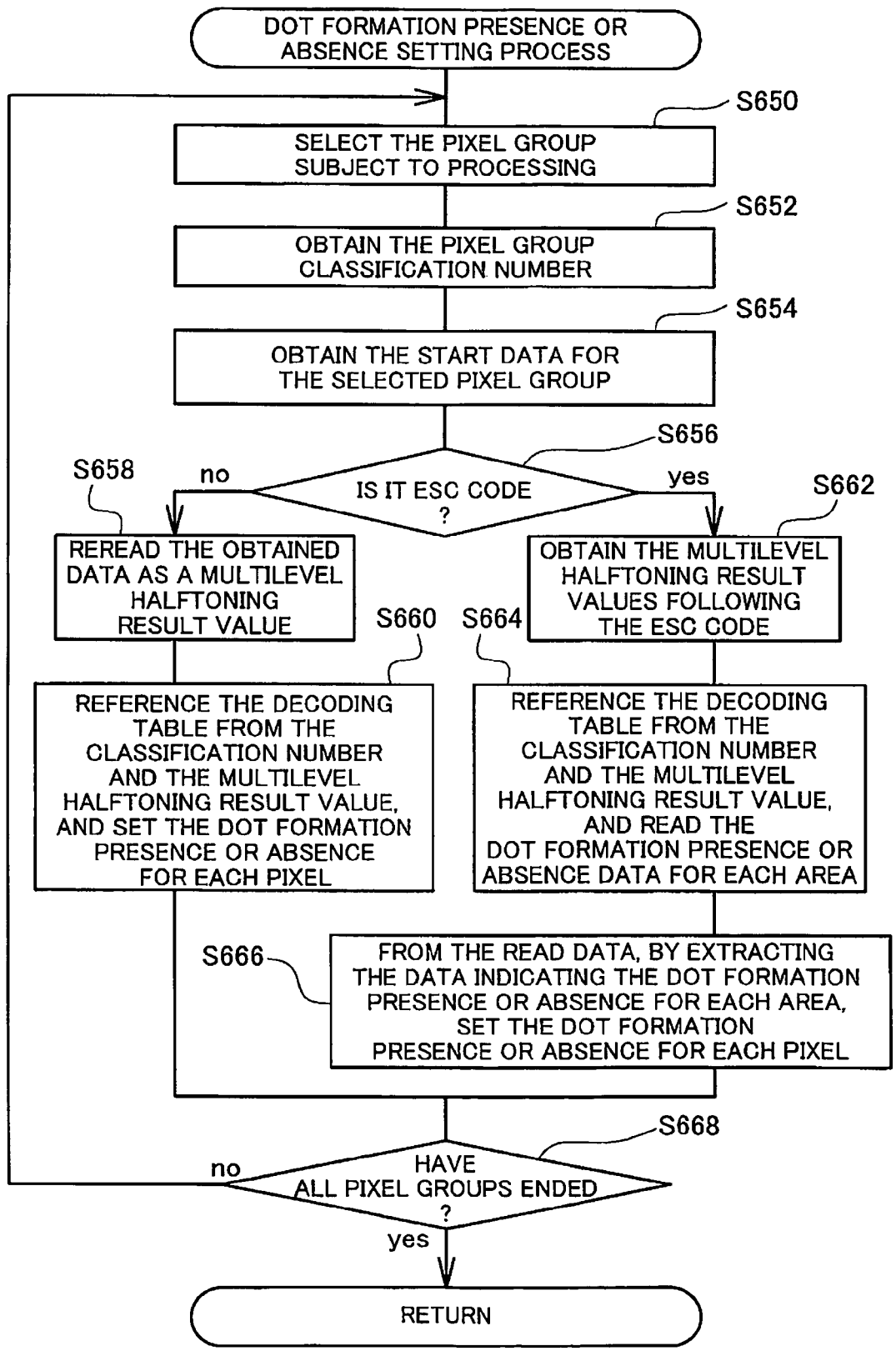
FIG. 45 is a flow chart showing the flow of the process of setting the presence or absence of dot formation for a variation example of the second embodiment.

FIG. 45 is a flow chart showing the flow of the process of setting the presence or absence of dot formation for a variation example of the second embodiment. Following, the dot formation presence or absence setting process of the second embodiment is described according to the flow chart.

When the dot formation presence or absence setting process of a variation example of the second embodiment is started, first, one pixel group subject to processing is selected (step S650), and the classification number of that pixel group is obtained (step S652). The pixel group classification number can be obtained in the same way as the dot formation presence or absence setting process of the variation example of the first embodiment described previously.

Next, after obtaining the start data supplied as the multilevel halftoning value for the selected pixel group (step S654), a determination is made of whether or not the obtained data is the ESC code (step S656). Here, there is only one mode for the pixel group division, and when the pixel group is divided for processing, the ESC code "255" is given to the multilevel halftoning result value, so at step S656, a determination is made of whether or not the read data is "255."

When the read data is not the ESC code (step S656: no), it is determined that processing is done without dividing the pixel groups, and the read data is reread as multilevel halftoning result values (step S658). Then, from the classification number and the multilevel halftoning result values obtained for that pixel group, by referencing the decoding table, the presence or absence of dot formation is set for each pixel in the pixel group (step S660). Here, the decoding table referenced with the dot formation presence or absence setting process of the variation example of the second embodiment is about the same as the decoding table of the first embodiment described previously using FIG. 28. However, corresponding to the fact that it is possible to form three types of dots, large, medium, and small, with the variation example of the second embodiment, the dot data DD set in the decoding table of the second embodiment is data indicating which of the large dots, medium dots, and small dots are formed for each pixel in the pixel group.

FIG. 46 is an explanatory drawing showing the data structure of the dot data DD set in the decoding table of the second embodiment. The dot data DD of the variation example of the second embodiment is 16-bit data consisting of 8 sets with 2 bits as one set, and each set is correlated to each pixel in the pixel group. Then, the 2-bit data "11" represents that large dots are formed, the 2-bit data "10" represents that medium dots are formed, the 2-bit data "01" represents that small dots are formed, and the 2-bit data "00" represents that dots are not formed.

For example, we will assume that the dot data DD is data like that shown in FIG. 46*a*. "11" is set for the set numbered 1 in the dot data DD, so large dots are formed at the corresponding pixel in the pixel group (the pixel numbered 1 in FIG. 46*b*). Also, "00" is set for the set numbered 2 in the dot data DD, so dots are not formed for any pixels numbered 2 in the pixel group. In this way, the data set for each set of the dot data DD represents the type of dot formed for each pixel in the pixel group. This kind of dot data DD is set in the decoding table referenced with the dot formation presence or absence setting process of the second embodiment.

At step S660 shown in FIG. 45, the decoding table is referenced based on the pixel group classification number and the multilevel halftoning result value, and by reading the kind of dot data DD shown in FIG. 46, the presence or absence of dot formation for each pixel in the pixel group is set. Note that the method of setting the decoding table referenced with the dot formation presence or absence setting process of the variation example of the second embodiment is described later.

Meanwhile, when the data read at step S654 is the ESC code (step S656: yes), it is determined that the pixel group is divided for processing, and a specified number of multilevel halftoning result values stored successively in the ESC code are obtained (step S662). These multilevel halftoning result values are the multilevel halftoning result values obtained from the representative gradation values of each area generated by dividing the pixel group.

Next, by referencing the decoding table, each of the obtained multilevel halftoning result values are converted to dot data DD (step S664). Then, from the dot data DD found from the multilevel halftoning result values of each area, by extracting data of the parts correlating to each area and combining them, the presence or absence of dot formation for each pixel in the pixel group is set (step S666).

FIG. 47 is an explanatory drawing showing the state of setting the presence of absence of dot formation for each pixel in the pixel group from a plurality of dot data DD. Here, as shown in FIG. 47(*a*), the multilevel halftoning result value 92 and the multilevel halftoning result value 135 are obtained for each area for which the pixel group is divided into two equal parts at left and right. Next, by referencing the decoding table, these multilevel halftoning result values are converted to dot data DD. FIG. 47(*b*) and FIG. 47(*c*) respectively represent the dot data DD obtained from the multilevel halftoning result values of the left area and right area. With the step S664 shown in FIG. 45, the process of converting the multilevel halftoning result values to the dot data DD is performed in this way. Note that as described previously, the dot data DD of the second embodiment is 16-bit data with 2 bits each as one set (see FIG. 46), but to avoid the drawing becoming complex, with FIG. 47, the 2-bit data of each set is expressed in decimal form. Specifically, the 2-bit data "11" representing large dots is displayed as "3" in FIG. 47, the 2-bit data "10" representing medium dots is displayed as "3," the 2-bit data "01" representing small dots is displayed as "2," and the 2-bit data "00" representing that dots are not formed is displayed as "0."

Next, by extracting the data of the concerned parts in each area from the respective dot data DD and combining them, the dot data DD for within the divided pixel group is synthesized. Specifically, the dot data DD shown in FIG. 47(b) was obtained for the left area, so from this dot data DD, the data of the part correlating to the 4 pixels constituting the left area are extracted. With the example shown in FIG. 47, the four pixels number 1, 2, 5, and 6 correspond to the pixels of the left area. Also, since the dot data DD shown in FIG. 47(c) was obtained for the right area, the data of the part correlating to the 4 pixels constituting the right area are extracted. With the example shown in FIG. 47, the four pixels number 3, 4, 7, and 8 correspond to the pixels of the right area. Then, the data extracted from each dot data DD is combined, and a new dot data DD is synthesized. FIG. 47(d) shows the state of the dot data DD being synthesized in this way for the divided pixel group. Also, FIG. 47(e) shows the state of dots being formed for each pixel according to the synthesized dot data DD.

As shown in FIG. 47(e), in the area of the left half, smaller dots than in the area of the right half are formed sparsely. Specifically, this is a dot distribution that suitably reflects the multilevel halftoning result values shown in FIG. 47(a). With step S666 of FIG. 45, by working in this way to synthesize dot data DD for the divided pixel groups, the process of setting the presence or absence of dot formation for each pixel is performed.

When the presence or absence of dot formation is set for each pixel in the selected pixel group as described above (steps S660 and S666), a determination is made of whether or not the process has ended for all the pixel groups (step S668). Then, when there are unprocessed pixel groups remaining (step S668: no), the process returns to step S650, a new pixel group is selected, and the subsequent series of operations is performed to set the presence or absence of dot formation. This kind of operation is repeated, and when it is determined that the process has ended for all the pixel groups (step S668: yes), the dot formation presence or absence setting process of the second embodiment shown in FIG. 45 ends.

Here, a simple description is given of the method of setting the decoding table referenced with the dot formation presence or absence setting process of the variation example of the second embodiment. For setting of the decoding table referenced with the variation example of the second embodiment, setting can be done in about the same way as the decoding table of the first embodiment described previously. However, the point that a determination is made of the presence or absence of dot formation for each type of dot large, medium, and small with the second embodiment is different from the first embodiment.

Figure 48:
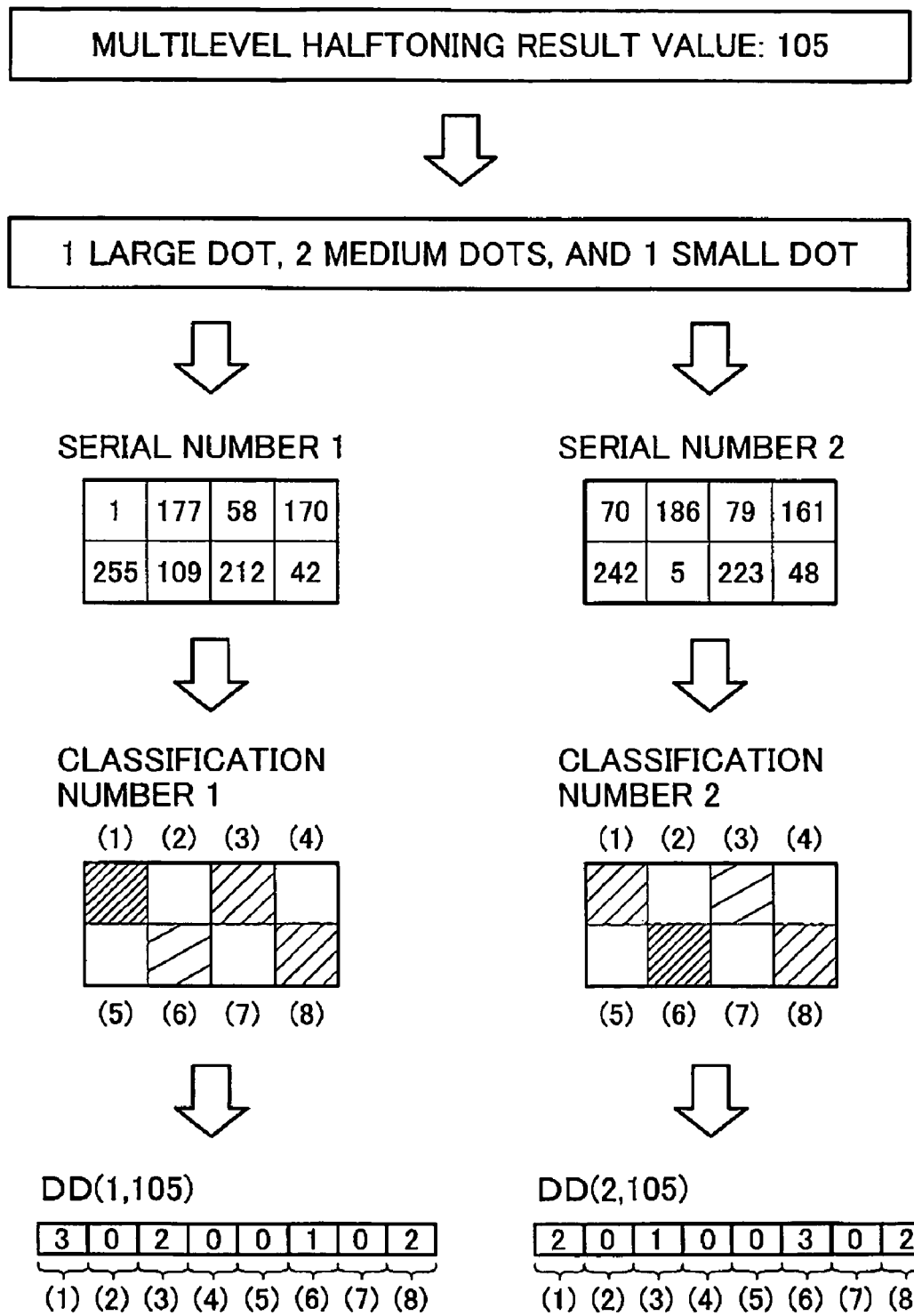
FIG. 48 is an explanatory drawing showing the method of setting the decoding table for the second embodiment.

FIG. 48 is an explanatory drawing showing the method of setting the decoding table referenced with the dot formation presence or absence setting process of the variation of the second embodiment. Here, we will assume that the multilevel halftoning result value of the pixel group is "105." The dot data DD representing the presence or absence of formation of large, medium, and small dots is set in the decoding table referenced with the variation example of the second embodiment, so first, the multilevel halftoning result values are converted to data representing the number of these types of dots. This conversion can be executed easily based on the correlations shown in FIG. 37. Here, the multilevel halftoning result value 105 represents the combination of 1 large dots, 2 medium dots, and 1 small dot. Next, by referencing the threshold value set in the dither matrix, which of the pixels in the pixel group these dots is to be formed on is set. With FIG. 48, using the pixel group of classification number 1 and the pixel group of classification number 2 as examples, pixels for which large, medium, and small dots are formed within these pixel groups are set, and the state of finding the corresponding dot data DD is shown.

In the left half of FIG. 48 is shown the state of finding the dot data DD (1, 105) for the pixel group of classification number 1. Here, the dot data DD (1, 105) unit the dot data set corresponding to the combination of the pixel group classification number 1 and the multilevel halftoning result value 105. To find the dot data DD for the pixel group of the classification number 1, the threshold value set in the block with the serial number 1 in the dither matrix is referenced. The threshold value set for the serial number 1 block is shown at the left side of the third level from the top in FIG. 48. As described previously, these threshold values can be thought of as representing the ease of dot formation. In light of this, the positions of pixels at which dots are formed in the sequence large dots, medium dots, and small dots are set according to these threshold values. Following is a specific description.

First, since the number of large dots formed is 1, a large dot is formed at the pixel for which dot formation is easiest within the serial number 1 block (the pixel for which the threshold value 1 is set). Then, the positions of pixels for which the two medium dots are formed are set. The pixels for which dot formation is second and third easiest in the serial number block are the pixel for which the threshold value 42 is set and that for which the threshold value 58 is set, so medium dots are set to be formed in these pixels. Finally, the position of the pixel at which the small dot is formed is set. The pixel at which dots can be formed the fourth easiest in the serial number 1 block is the pixel for which the threshold value 109 is set, so the small dot is formed in this pixel. At the left side of the fourth level from the top of FIG. 48 is represented the state of setting the position of the pixel at which the large, medium and small dots are formed for the pixel group of classification number 1 in this way. In the drawing, large dots are formed in the pixel marked by fine diagonal lines, medium dots are formed at the pixels marked by slightly loose diagonal lines, and small dots are formed at pixels marked by loose diagonal lines, and then, pixels not marked by diagonal lines represent that dots are not formed. When the presence or absence of dot formation is set for each pixel in the pixel group in this way, this dot arrangement is expressed by dot data in the data format shown in FIG. 43, and is set in the decoding table as the dot data DD (1, 105) corresponding to the classification number 1 and the multilevel halftoning result value 105.

It is possible to set the dot data DD (2, 105) in the same way for the pixel group of the classification number 2 as well. Specifically, the threshold value set in the serial number 2 block is obtained. Then, after setting the position of the pixel at which the large dots, medium dots, and small dots are formed in that order according to the obtained threshold value, the dot arrangement is expressed using the data format shown in FIG. 43, and this is stored in the decoding table as the dot data DD (2, 105). When the kind of operation described above is performed on combinations of all the multilevel halftoning result values and all the classification numbers, and the obtained dot data is stored in the applicable location, it is possible to set the decoding table referenced during the dot formation presence or absence setting process of the variation example of the second embodiment.

For the dot formation presence or absence setting process of the variation example of the second embodiment described above as well, when the multilevel halftoning result values supplied from the computer 100 are received, it is possible to rapidly set the presence or absence of dot formation for each pixel using a simple process of referencing the decoding table. Because of this, it is possible to rapidly output images. In addition, when the multilevel halftoning result values are generated in a state with the pixel groups divided, in accordance with this, it is possible to set the presence or absence of dot formation for each area in the pixel group. In this kind of case as well, it is possible to use the same table for the decoding table referenced for setting the presence or absence of dot formation. Because of this, it is not necessary to store a plurality of decoding tables, and it is possible to execute even with equipment that does not have large memory capacity.

E. Third Embodiment

With the first embodiment or the second embodiment described above, the meaning of the multilevel halftoning result values can be interpreted in the same way when that result value is obtained for any of the pixel groups. For example, if we say the multilevel halftoning result value 3 for the first embodiment, no matter which pixel group that result value is obtained for, this represents that three dots are formed within the pixel group. Also, if we say the multilevel halftoning result value 125 for the second embodiment, this value represents the formation of a specified number only of large dots, medium dots, and small dots in the pixel group according to the correlation shown in FIG. 37. In this way, if the value is the same even for multilevel halftoning result values obtained for different pixel groups, it was possible to interpret the meaning of these in the same way. However, the contents meant by the multilevel halftoning result values can be made different according to the pixel group. By doing this, it is possible to reduce the data volume of the multilevel halftoning result values. In particular, as with the case in the second embodiment, in cases such as when a large number of values like 165 can be obtained for the multilevel halftoning result value, by reducing the data volume of the multilevel halftoning result values, it is possible to supply the multilevel halftoning result values more rapidly. Following is described this kind of image printing process of the third embodiment. Note that for the third embodiment as well, the same as with the second embodiment described previously, the color printer 200 is able to form three types of dots, large, medium, and small.

E-1. Multilevel Halftoning Result Value Generating Process of the Third Embodiment:

The multilevel halftoning result value generating process of the third embodiment has a different referenced multilevel halftoning table than the multilevel halftoning result value generating process of the second embodiment described above, but the overall flow of the process is almost the same. In this way, with the image printing process of this embodiment, even when the process contents are complex and high level contents, in most cases, it is possible to handle simply by changing the multilevel halftoning table, and it is possible to use something simple for the actual process flow. Following is described the multilevel halftoning result value generating process of the third embodiment while making use of the flow chart of the multilevel halftoning result value generating process of the second embodiment shown in FIG. 38.

When the multilevel halftoning result value generating process of the third embodiment is started, first, a specified number of mutually adjacent pixels are consolidated to generate a pixel group (correlates to step S500), and the classification number of the pixel group is set (correlates to step S502). Next, a determination is made of whether or not the pixel group is divided based on the resolution ratio before and after resolution conversion (correlates to step S504). Here, for convenience of the description, when processing with the pixel groups divided, this is described as being divided equally into two parts at left and right. When processing is done without dividing the pixel groups, after setting the representative gradation value of the pixel group in the same way as each of the embodiments described previously (correlates to step S506), by referencing the multilevel halftoning table, the multilevel halftoning result value corresponding to the pixel group classification number and the representative gradation value is obtained.

Figure 49:
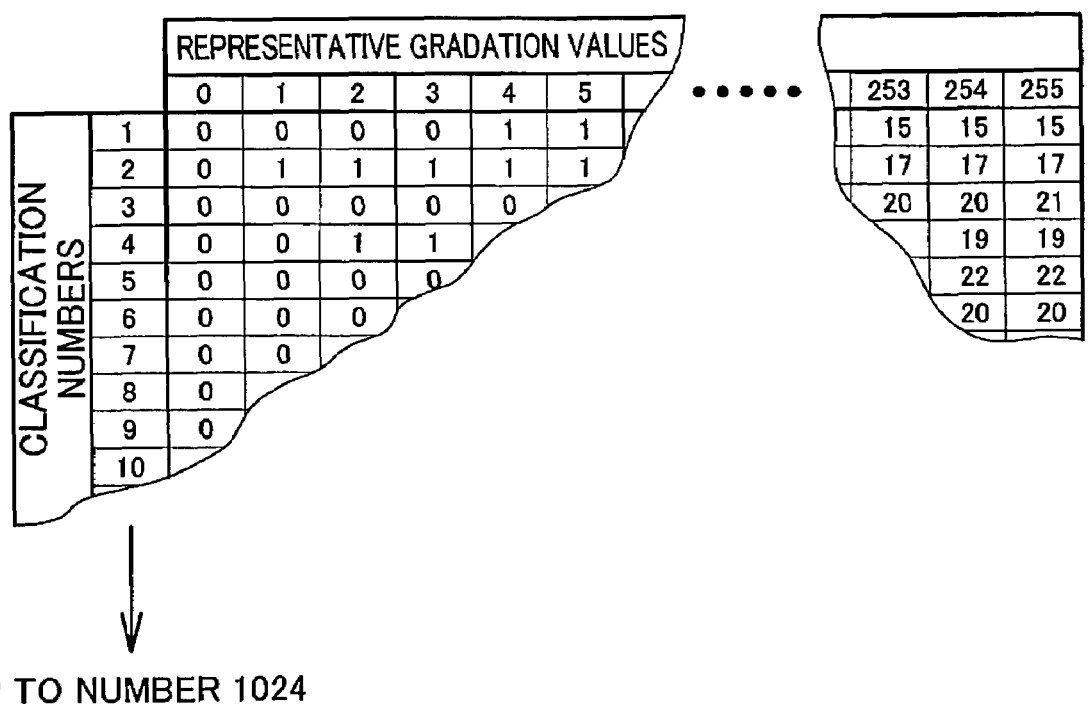
FIG. 49 is an explanatory drawing conceptually showing the multilevel halftoning table referenced with the multilevel halftoning result value generating process of the third embodiment.

FIG. 49 is an explanatory drawing conceptually showing the multilevel halftoning table referenced with the multilevel halftoning result value generating process of the third embodiment. As is clear by comparing the multilevel halftoning table referenced with the multilevel halftoning result value generating process of the second embodiment described previously (see FIG. 39) and this multilevel halftoning table, the multilevel halftoning value set in the multilevel halftoning table of the third embodiment is a smaller value than the multilevel halftoning result value of the second embodiment. This is because, in contrast to the fact that with the second embodiment, the multilevel halftoning result value is set to a value that can be interpreted in the same way regardless of the pixel group, with the third embodiment, a value is set such that it is first possible to interpret when the pixel group for which that multilevel halftoning result value is obtained is identified (more precisely, the pixel group classification number is identified).

Figure 50:
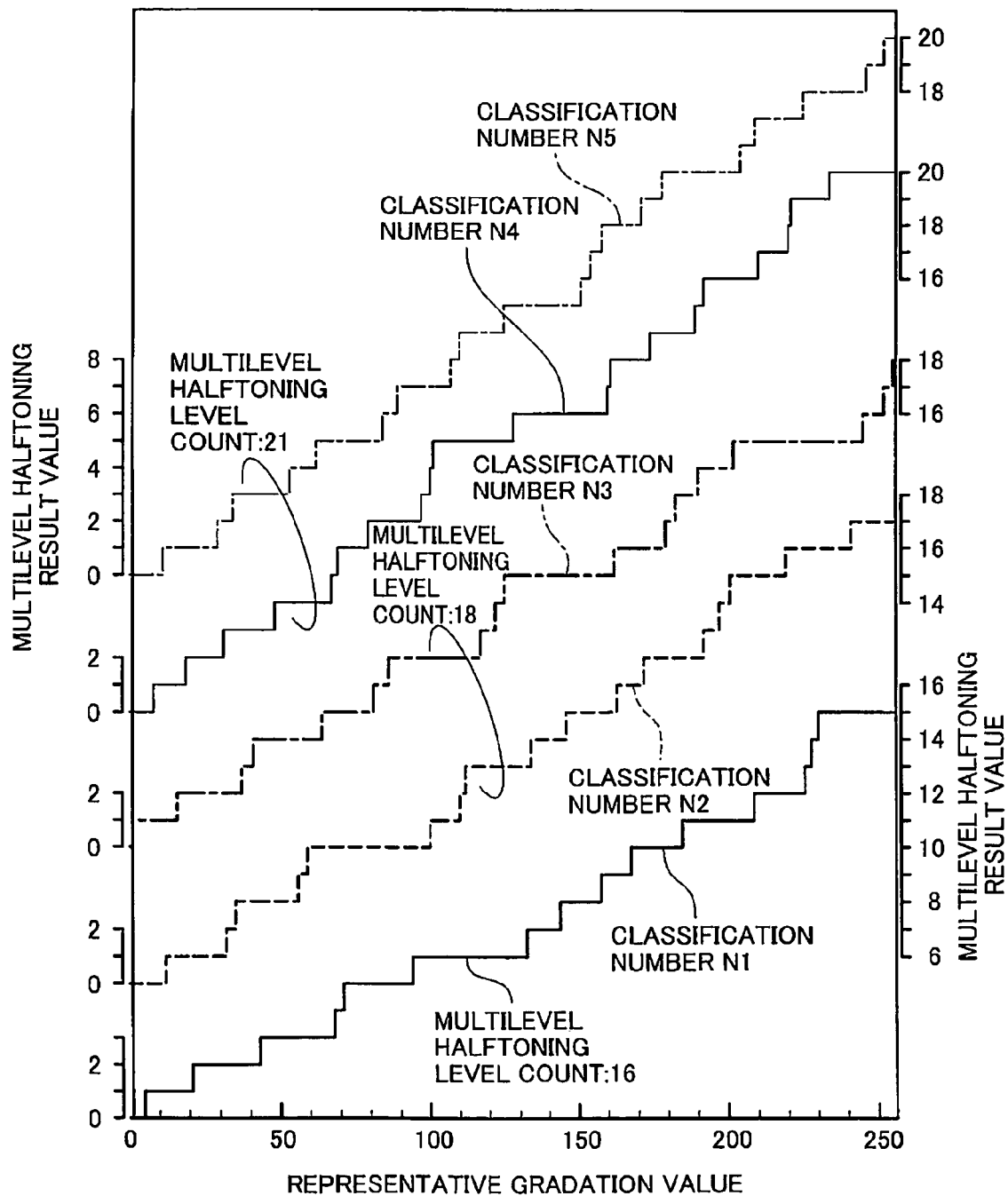
FIG. 50 is an explanatory drawing showing an example of the correlation of the representative gradation value and the multilevel halftoning result value set for each classification number of the pixel group for the multilevel halftoning table of the third embodiment.

FIG. 50 is an explanatory drawing showing an example of the correlation of the representative gradation value and the multilevel halftoning result value set for each classification number of the pixel group for the multilevel halftoning table of the third embodiment. In the drawing, using a polygonal line graph for which the horizontal axis is used for the representative gradation values, and the vertical axis is used for the multilevel halftoning result value, the multilevel halftoning result values set for the representative gradation values are displayed. Also, in the drawing, the multilevel halftoning results for five pixel groups having different classification numbers N1 to N5 are shown, but to avoid the polygonal lines of these pixel groups overlapping making them difficult to distinguish, the multilevel halftoning result value original point positions are displayed in a state slightly displaced in the vertical axis direction.

The polygonal lines expressed using bold solid lines in FIG. 50 show the correlation between the representative gradation values and the multilevel halftoning result values for the pixel group of classification number N1. For the pixel group of the classification number N1, for the representative gradation values 0 through 4, the multilevel halftoning result value 0 is set. For the representative gradation values 5 through 20, the multilevel halftoning result value 1 is set. Next, when the representative gradation values are increased to a range of 21 to 42, the multilevel halftoning result value is increased to "2," and when the representative gradation values are increased to a range of 43 to 69, the multilevel halftoning result value is increased to "3." In this way, the multilevel halftoning result values are increased in stepwise fashion according to increases in the representative gradation value, and ultimately, the multilevel halftoning result value increases up to "15." Similarly, for the pixel group of the classification number N2 shown by a bold dotted line in the drawing and the pixel group of the classification number N3 shown by a bold dot-dash line, as the representative gradation values increase from 0 to 255, the multilevel halftoning result value is set so as to increase in stepwise fashion form 0 to 17. Furthermore, for the pixel group of the classification number N4 shown by a fine solid line in the drawing and the pixel group of the classification number N5 shown by a fine dot-dash line, as the representative gradation values increase from 0 to 255, the multilevel halftoning result value is set so as to increase in stepwise fashion form 0 to 20. As a result, for example, for the pixel group of the classification number N1, multilevel halftoning is done to any multilevel halftoning result value of 0 to 15 (in other words, to 16 values), for the pixel groups of the classification numbers N2 or N3, multilevel halftoning is done to any multilevel halftoning value of 0 to 17 (in other words, to 18 values), and for the pixel groups of the classification numbers N4 or N5, multilevel halftoning is done to any multilevel halftoning value of 0 to 20 (in other words, to 21 values).

In this way, with the multilevel halftoning result value generating process of the third embodiment, the number of levels of multilevel halftoning of each pixel group (the number of states that can be obtained as a result of multilevel halftoning) is not the same, but rather multilevel halftoning is done at a specific level count according to the pixel group classification number. As a result, even when multilevel halftoning the same representative gradation values, the pixel group classification number is different, so if the multilevel halftoning level count differs because of this, then multilevel halftoning will be done to a different result value.

Also, even when the multilevel halftoning level count is the same, this does not mean that it is not possible to obtain the same multilevel halftoning result value. For example, as is clear when the pixel group of the classification number N2 and the pixel group of the classification number N3 shown in FIG. 50 are compared, for these pixel groups, the representative gradation value is changed to 18 values for all of them, and when there are many cases of representative gradation values for which the multilevel halftoning result values are switched, these do not match. From this fact, even when the level count of multilevel halftoning of the pixel groups is the same, for example, if the classification number is different, different multilevel halftoning result values are obtained.

In this way, with the multilevel halftoning result values set for the multilevel halftoning table of the third embodiment shown in FIG. 49, the correlation of the representative gradation values and the multilevel halftoning result values differs for each pixel group classification number. To say this another way, the multilevel halftoning result values of the third embodiment are values that can be first interpreted when the classification number is identified of the pixel group for which that result value is obtained. By using the multilevel halftoning result value as a value depending on the pixel group in this way, it is possible to reduce the number of values that can be obtained for the multilevel halftoning result values. With the example shown in FIG. 50, even in the case of the most common classification number N4 pixel group and the classification number N5 pixel group, the number of multilevel halftoning result values is only 21 choices from "0" to "21." In actuality, the values that can be obtained for the multilevel halftoning result value can be sufficiently expressed using 5 bits if it is 30 choices and does not exceed 30 choices at the high estimate. With the second embodiment, when compared to the fact that 8 bits were needed to express the multilevel halftoning result values, there is a ⅝ reduction in data volume of the multilevel halftoning result value. Note that the method of setting the multilevel halftoning table of the third embodiment shown in FIG. 49 is described later.

With the multilevel halftoning result value generating process of the third embodiment, when processing is done without dividing the pixel groups, by referencing the multilevel halftoning table shown in FIG. 49, after obtaining the multilevel halftoning result values (correlates to step S508 in FIG. 38), and the obtained multilevel halftoning result values are stored (correlates to step S510).

Meanwhile, with the multilevel halftoning result value generating process of the third embodiment, when processing is done with the pixel groups divided (correlates to step S504: yes in FIG. 38), after setting the representative gradation values of each area generated by dividing the pixel groups (correlated to step S512), the pixel group classification number and the multilevel halftoning table from the respective representative gradation values are referenced, and the multilevel halftoning value of each area is obtained (correlates to step S514). Specifically, the multilevel halftoning result values are generated by the amount of the number of areas generated when the pixel group is divided. Next, following the ESC code representing that the pixel groups are divided and processed, the multilevel halftoning results values generated for each area are stored (correlates to steps S516 and S518).

FIG. 51 is an explanatory drawing showing the state of correlation of the multilevel halftoning result value and the ESC code showing the division status to 5-bit data. As described previously, with the third embodiment, for the multilevel halftoning result value, a unique value is set for the classification number of the pixel group, so even with a high estimate it is only possible to have 30 values for the multilevel halftoning result value of the respective classification numbers, and it is possible to express this with 5 bits. In light of this, data representing "31" which is not used as a multilevel halftoning result unit is allocated for the ESC code. Here, since we are assuming only one pixel group division mode, it is possible to represent that the pixel group is divided and the division mode simultaneously with only one ESC code.

When the pixel group multilevel halftoning result values are stored as described above, a determination is made of whether or not processing has ended for all pixels of the image data (correlates to step S520), and if unprocessed pixels remain, after generating a new pixel group, the subsequent series of processes are repeated. This kind of operation is repeated, and when the processing ends for all pixels, when processing without dividing the pixel groups, only the multilevel halftoning result values are output to the color printer 200, and when processing with the pixel groups divided, the ESC code and the multilevel halftoning result values are output (correlates to step S522), and the multilevel halftoning result value generating process of the third embodiment ends.

Note that above, we described there being only one type of pixel group division mode, but it is also possible to use a larger number of division modes. For example, with the above description, the value "31" that is not used in the multilevel halftoning result values was used as the ESC code, but as shown in FIG. 51, the value "30" is also a value that is not used. In light of this, it is also possible to allocate this value "30" for the ESC code indicating a second division mode. For example, the ESC code "30" can also represent that the pixel group is divided equally into four areas overall, with two each vertically and horizontally.

E-2. Dot Formation Presence or Absence Setting Process of the Third Embodiment:

As described above, with the multilevel halftoning result value generating process of the third embodiment, to decrease the data volume of the multilevel halftoning result values, a unique multilevel halftoning result value is generated for the pixel group classification number and output to the color printer 200. Specifically, the meaning of the multilevel halftoning result value can first be interpreted when the pixel group classification number is identified. Because of this, with the color printer 200 of the third embodiment, when this kind of multilevel halftoning result value is received, by performing the following kind of dot formation presence or absence setting process, the process of setting the presence or absence of dot formation for each pixel in the pixel group is performed.

Figure 52:
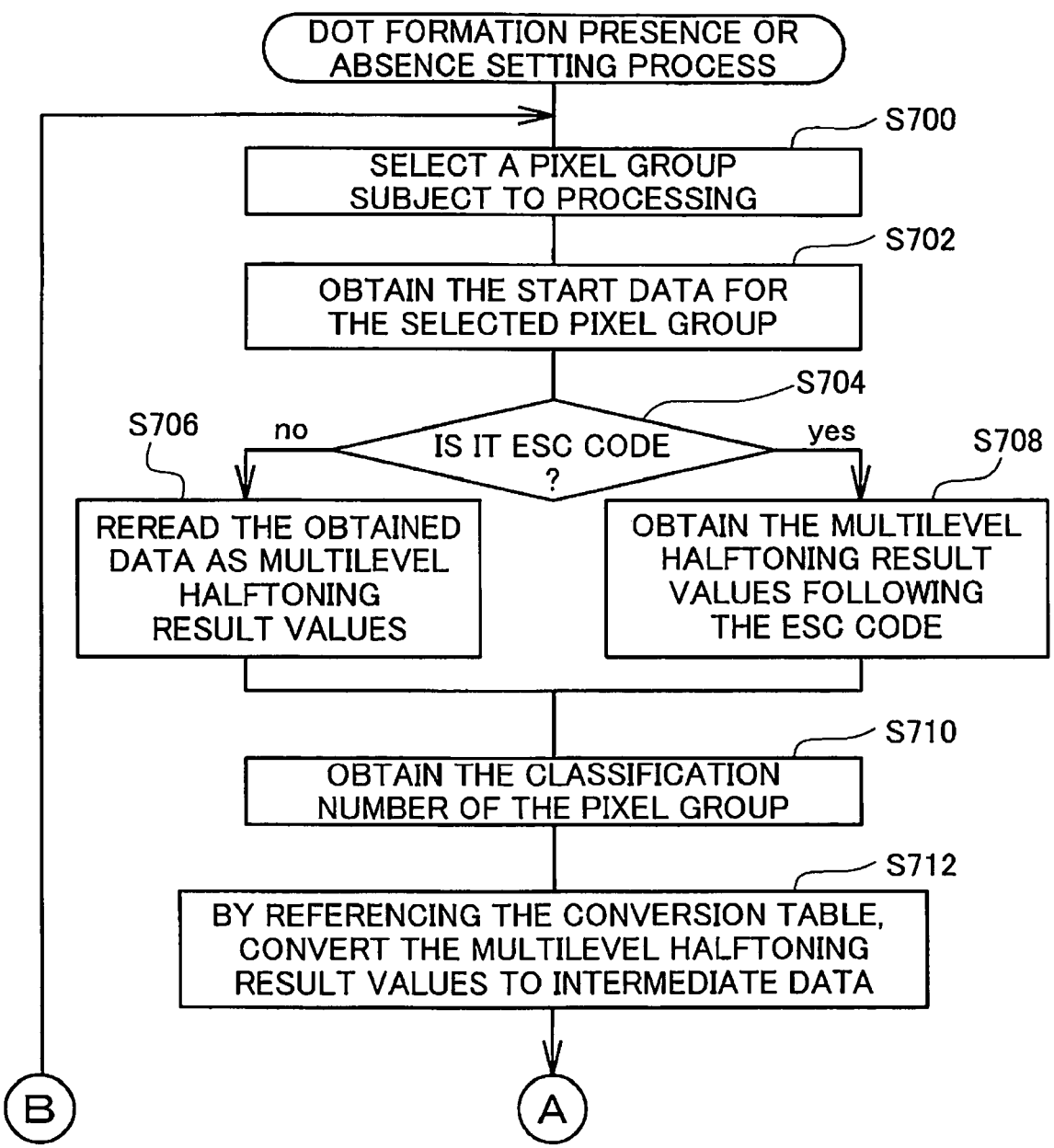
FIG. 52 is a flow chart showing the first half of the process of setting the presence or absence of dot formation for the third embodiment.
Figure 53:
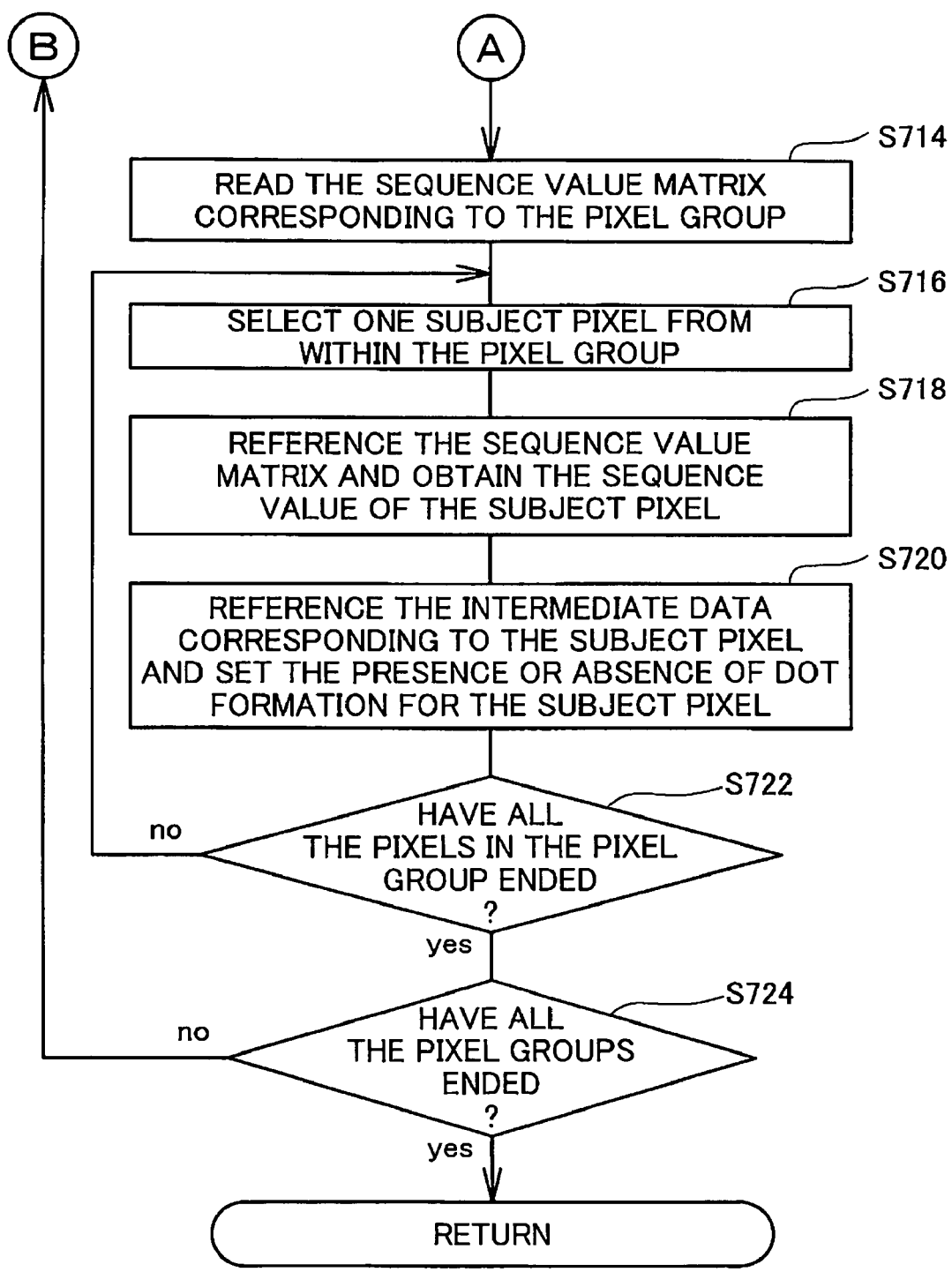
FIG. 53 is a flow chart showing the latter half of the process of setting the presence or absence of dot formation for the third embodiment.

FIG. 52 is a flow chart showing the first half of the process of setting the presence or absence of dot formation for the third embodiment. FIG. 53 is a flow chart showing the latter half of the process of setting the presence or absence of dot formation for the third embodiment. With the dot formation presence or absence setting process of the third embodiment shown in the drawings, in contrast to the process of the second embodiment described previously using FIG. 41 and FIG. 42, the multilevel halftoning result value received from the computer 100 is a value that depends on the pixel group, and this multilevel halftoning result value is converted to intermediate data that does not depend on the pixel group, so the point that the presence or absence of dot formation is set for each pixel is a big difference. Following, with a focus on the difference points in relation to the second embodiment in this way, the dot formation presence or absence setting process of the third embodiment is described.

For the dot formation presence or absence setting process of the third embodiment as well, the same as with the second embodiment described above, when the process starts, first, one pixel group subject to processing is selected (step S700). Then, the start data of the multilevel halftoning result value supplied to that pixel group is obtained (step S702), and a determination of whether or not the obtained data is ESC code or not is made (step S704) When the read data is not ESC code (step S704: no), it is determined that processing is done without dividing the pixel groups, and the read data is reread as a multilevel halftoning result value (step S706). Meanwhile, when the read data is ESC code (step S704: yes), it is determined that processing is done with the pixel group in a divided state, and a specified number of the multilevel halftoning result values stored following the ESC code is obtained (step S708).

With the third embodiment, in contrast to the second embodiment described previously, multilevel halftoning result values read in this way are values that can be interpreted first when the classification number of the pixel group for which that value was obtained is identified. In light of this, with the dot formation presence or absence setting process of the third embodiment, after this multilevel halftoning result value is converted to data that does not depend on the pixel group classification number, the presence or absence of dot formation is set for each pixel within the pixel group. As preparation for converting the multilevel halftoning result values to data that does not depend on the classification number, first, the process of obtaining the pixel group classification number is performed (step S710). The pixel group classification number can be obtained rapidly by using the method described previously using FIG. 26 and FIG. 27 during the dot formation presence or absence setting process of the variation example of the first embodiment. Next, by referencing the conversion table set in advance, the multilevel halftoning result values expressed in a format depending on the pixel group are converted to intermediate data expressed in a format that does not depend on the pixel group (step S712).

Figures 54, 55:
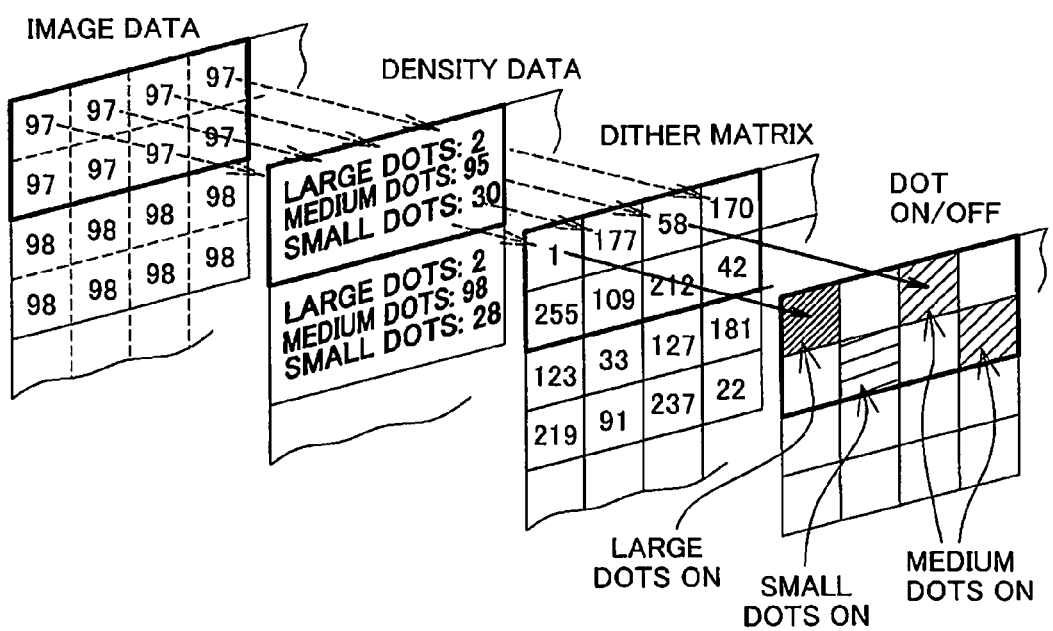
FIG. 54 is an explanatory drawing conceptually showing the conversion table referenced when converting the multilevel halftoning result value to intermediate data for the process of setting the presence or absence of dot formation for the third embodiment.
FIG. 55 is an explanatory drawing conceptually showing the state of determining the presence or absence of the formation of large, medium, and small dots for each pixel in a pixel group.

FIG. 54 is an explanatory drawing conceptually showing the conversion table referenced when converting the multilevel halftoning result value to intermediate data for the process of setting the presence or absence of dot formation for the third embodiment. As shown in the drawing, in the conversion table reference with the process of setting the presence or absence of dot formation for the third embodiment, combinations of the pixel group classification numbers and the multilevel halftoning result values are correlated, and corresponding intermediate data is set. The DD (n, m) shown in the drawing represents intermediate data when the pixel group classification number is number n and the multilevel halftoning result values of that pixel group is "m." Also, as shown in FIG. 43, this intermediate data is expressed in a format indicating the types of dots formed in that pixel group and the number of those dots. Then, this intermediate data is data that can be interpreted in the same way regardless of which pixel group it is data for. Therefore, by referencing the conversion table shown in FIG. 54, it is possible to convert the multilevel halftoning result values of a format that depends on the pixel group to intermediate data expressed in a format for which the type and number of dots to be formed in the pixel group do not depend on the pixel group.

When the multilevel halftoning result values are converted to the intermediate data in this way, this time, the process of reading the sequence value matrix corresponding to the selected pixel group is performed (step S714 in FIG. 53). As described previously, in the sequence value matrix, the values indicating the sequence in which dots are formed for each pixel in the pixel group (sequence values) are set. Next, the same as with the second embodiment described previously, while referencing the intermediate data for the selected pixel group and the sequence values set in the sequence value matrix, one pixel at a time is selected as the subject pixel from within the pixel group, and the presence or absence of dot formation is set. Specifically, one pixel as a subject (subject pixel) is selected from within the pixel group (step S716), and by referencing the sequence value matrix, the sequence value of the subject pixel is obtained (step S718). Next, the intermediate data corresponding to the subject pixel is referenced, and which of the large, medium, and small dots is to be formed is set (step S720). At this time, when processing is done in a state with the pixel group divided, a plurality of intermediate data is obtained, so by referencing the intermediate data obtained for the area in which the subject pixel is contained, the presence or absence of dot formation is set. Meanwhile, when processing is done without dividing the pixel groups, only one intermediate data is obtained, so this data is referenced to set the presence or absence of dot formation.

While selecting one subject pixel each from within the pixel group in this way, the operations described above are repeated until the presence or absence of dot formation is set for all the pixels (step S722), and when the presence or absence of dot formation is set for all the pixels, this time, a determination is made of whether or not the operation described above was performed for all the pixel groups (step S274). Then, when unprocessed pixel groups remain, the process returns to step S700, one new pixel group is selected, and the series of operations described above is performed. When the operations are repeated in this way for all the pixel groups, and the presence or absence of dot formation is set for all the pixel groups, the dot formation presence or absence setting process of the third embodiment shown in FIG. 52 and FIG. 53 ends.

With the image printing process of the third embodiment described above, when multilevel halftoning the representative gradation values of the pixel group, by generating multilevel halftoning result values that depend on the pixel group, it is possible to reduce the data volume to be output from the computer 100 to the color printer 200. Because of this, it is possible to rapidly output the multilevel halftoning result values. Also, a simple process can be used for the process of generating this kind of multilevel halftoning result value as well by referencing the valuation table in the same way as each type of embodiment described previously. In addition, when processing with the pixel group divided or not divided, it is possible to share the same multilevel halftoning table or the sequence value, so it is possible to save memory capacity.

E-3. Multilevel Halftoning Table Setting Method of the Third Embodiment:

Next, the method of setting the multilevel halftoning table (see FIG. 49) referenced during the multilevel halftoning result value generating process of the third embodiment is described. As described previously, in the multilevel halftoning table, the multilevel halftoning result value in relation to the representative gradation value is set for each pixel group classification number, and by multilevel halftoning while referencing the multilevel halftoning table, the representative gradation values are converted to multilevel halftoning result values that do not depend on the pixel group classification number as shown in FIG. 50.

The multilevel halftoning table of this embodiment is set based on the method disclosed in U.S. Pat. No. 3,292,104 described previously using FIG. 33 through FIG. 36, specifically, the method of expanding the dither method so as to make it possible to set the presence or absence of the formation of a plurality of types of dots of different sizes.

As described previously, with the multilevel halftoning result value generating process, by representing the image data of each pixel contained in the pixel group with a representative gradation value, pixel groups are consolidated and undergo multilevel halftoning. In light of this, when setting the multilevel halftoning table, first, assuming that all the pixels in the pixel group have image data of the same value as the representative gradation value, we will consider the determination of the presence or absence of the formation of each type of dot, large, medium, and small for each pixel. The determination of presence or absence of formation for each type of dot is performed using the halftone process described previously using FIG. 34.

FIG. 55 is an explanatory drawing conceptually showing the state of determining the presence or absence of the formation of large, medium, and small dots for each pixel in a pixel group. In the drawing, the pixel groups of focus for performing the halftone process are represented surrounded by a bold solid line. A pixel group consists of 8 pixels, and the image data of each pixel all have the same value as the representative gradation value (with the example shown in the drawing, gradation value 97). To determine the presence or absence of formation of each type of dot, large, medium, and small, image data is converted to density data for each dot. Conversion to density data is performed by referencing the dot density conversion table described previously using FIG. 35. Here, since we are assuming that all the pixels in the pixel group have the same image data, for each type of dot, the density data is also the same value for all pixels. The example shown in the figure represents a case when the large dot density data gradation value is "2," the medium dot density data gradation value is "95," and the small dot density data gradation value is "30."

Next, as described previously using the flow chart in FIG. 34, by comparing the large dot density data, the medium dot intermediate data, or the small dot intermediate data with the threshold values set in the dither matrix, the presence or absence of formation for each type of dot is determined for each pixel. Here, for the threshold value of the dither matrix used for comparison, the threshold value set in the location corresponding to the pixel group of focus from the dither matrix is used. For example, with the example shown in FIG. 55, since the pixel group is in the upper left corner of the image, for the threshold value as well, the threshold value set in the pixel group in the upper left corner in the dither matrix is used.

Then, it is determined that large dots are formed for the pixels for which, among the 8 threshold values set in the pixel group, a threshold value smaller than the large dot density data is set. Here, since the large dot density data is the threshold value "2," the pixels for which large dots are formed are only the pixels for which the threshold value "1" is set. In FIG. 55, pixels for which it is determined that large dots are formed are displayed marked by fine diagonal lines. It is determined that medium dots are formed for the pixels for which a threshold value is set that is larger than the large dot density data "2," and smaller than the medium dot intermediate data "97" obtained by adding the large dot density data and intermediate dot density data. There are only two of this kind of pixel, the pixel for which the threshold value "42" is set and pixels for which the threshold value "58" is set. In FIG. 55, pixels for which it is determined that medium dots are formed are displayed marked by slightly loose diagonal lines. Then, finally, it is determined that small dots are formed for pixels for which a threshold value is set that is larger than the medium dot intermediate data "97," and smaller than the small dot intermediate data "127" obtained by adding the medium dot intermediate data and the small dot density data. The only pixel of this type is the pixel for which the threshold value "109" is set. In FIG. 55, pixels for which it is determined that small dots are formed are displayed marked by loose diagonal lines. As a result of determining the presence or absence of large dots, medium dots, and small dots in this way, when the representative gradation value of the pixel group of focus is "97," one large dot, two medium dots, and one small dot will be formed.

If there is a large difference in the representative gradation value, then the number of large dots, medium dots, and small dots formed in the pixel group will also be different. Also, if the representative gradation values are changed from "0" to "255," in accordance with this, the number of large dots, medium dots, and small dots should also change at several levels. Furthermore, if the pixel group classification numbers are different, since the dither matrix threshold value is also different, the way of changing the dot count should also be different. The multilevel halftoning table shown in FIG. 49 is set by checking for each classification number the behavior of the number of each type of dot change in stepwise fashion when the representative gradation value is changed from "0" to "255."

Figure 56:
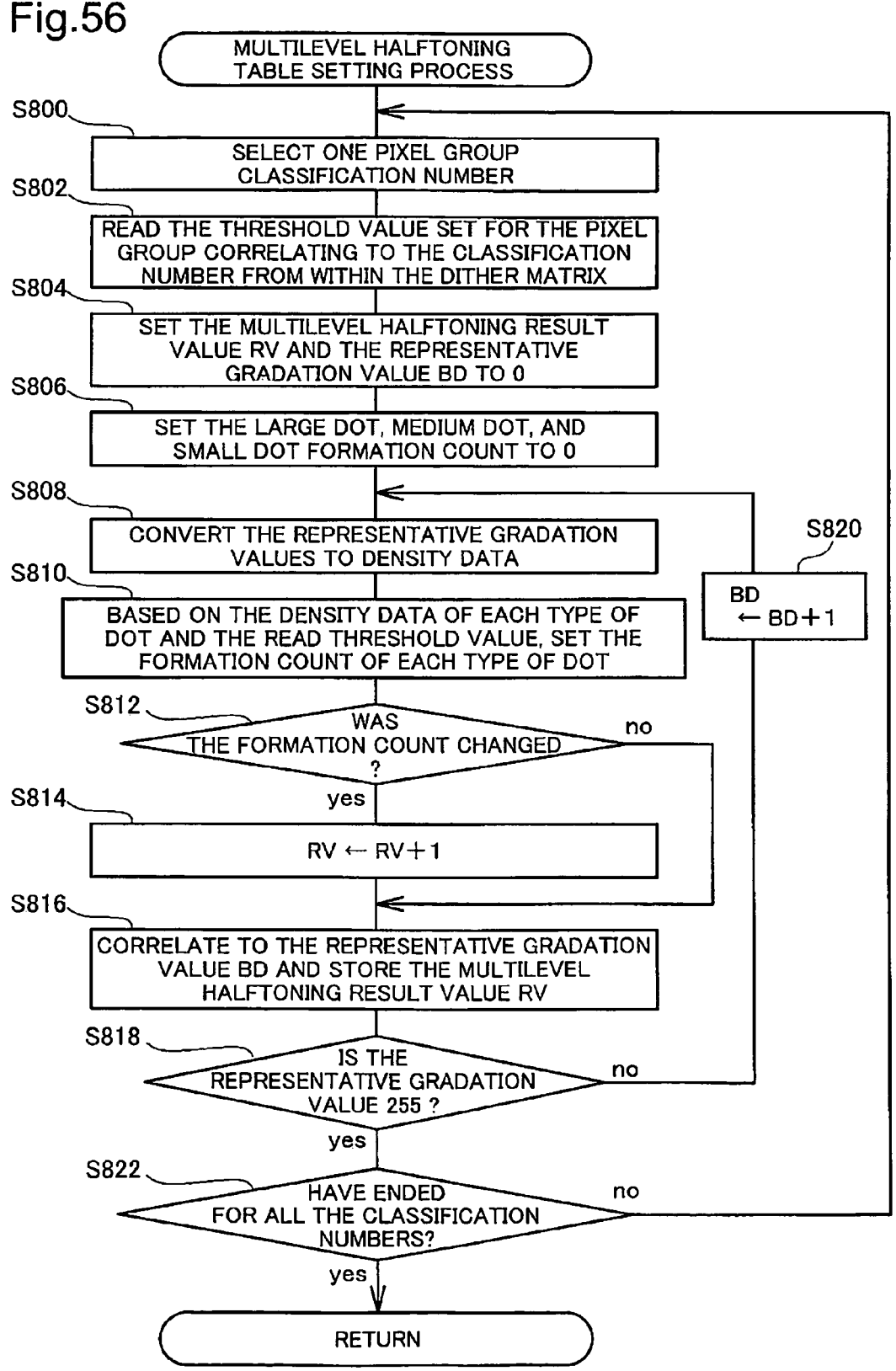
FIG. 56 is a flow chart showing the flow of the process of setting the multilevel halftoning table referenced during the multilevel halftoning result value generating process for the third embodiment.

FIG. 56 is a flow chart showing the flow of the process of setting the multilevel halftoning table referenced during the multilevel halftoning result value generating process for the third embodiment. Following, a description is given according to the flow chart. When the process of setting the multilevel halftoning table is started, first, one pixel group classification number is selected (step S800) For example, here, the classification number 1 is selected.

Next, the threshold value corresponding to the pixel group of the selected classification number is read from within the dither matrix (step S802). For example, here, since the classification number 1 is selected, the 8 threshold values set at the block positions displayed with the number 1 in FIG. 14*b* are read from within the dither matrix shown as an example in FIG. 7.

Then, the multilevel halftoning result value RV and the representative gradation value BD are set to "0" (step S804), and furthermore, all of the formation counts of large dots, medium dots, and small dots are set to 0 (step S806).

Then, by referencing the dot density conversion table shown in FIG. 35, after converting the representative gradation values into density data for large dots, medium dots, and small dots (step S808), the number of each type of dot, large, medium, and small, that are formed is set based on these density data and the threshold values that were just read (step S810). Specifically, as described using FIG. 34, the number of threshold values smaller than the large dot density data is found, and the obtained number is used as the large dot formation count. Also, the number of threshold values that are larger than the large dot density data and smaller than the medium dot intermediate data is found, and these are used as the medium dot formation count. Furthermore, the number of threshold values that are larger than the medium dot intermediate data and smaller than the small dot intermediate data is found, and these are used as the number of small dots formed.

A determination is made of whether or not the formation count of each type of dot found in this way has changed in relation to the formation count set previously (step S812). Then, if it is determined that the formation count has changed (step S812: yes), the multilevel halftoning result value RV is increased by "1" (step S814), and the obtained multilevel halftoning result value RV is correlated to the representative gradation value BD and stored (step S816). Meanwhile, when it is determined that the formation count has not changed (step S812: no), without increasing the multilevel halftoning result value RV, the value is correlated as is to the representative gradation value BD and stored (step S816).

When the multilevel halftoning result value relating to a certain representative gradation value is stored in this way, a determination is made of whether or not the representative gradation value BD has reached the gradation value 255 (step S818). If the gradation value 255 has not been reached (step S818: no), the representative gradation value BD is increased by "1" (step S820), the process returns to step S808, and after converting the representative gradation value BD is again converted to density data, the subsequent series of processes is performed, this is correlated to a new representative gradation value BD and the multilevel halftoning result value RV is stored (step S816). This kind of operation is repeated until the representative gradation value BD reaches the gradation value 255. Then, when the representative gradation value BD reaches the gradation value 255 (step S816: yes), all the multilevel halftoning result values are set for the selected classification number.

In light of this, a determination is made of whether or not the kind of process described above was performed for all the classification numbers (step S822), and when unprocessed classification numbers remain (step S822: no), the process returns to step S800 and the processes described above are performed again. This kind of process is repeated, and when it is determined that all the multilevel halftoning result values have been set for all the classification numbers (step S822: yes), the multilevel halftoning table setting process shown in FIG. 56 ends.

As is clear from the description above, the multilevel halftoning result values are set by the large, medium, and small dot density data obtained by converting the representative gradation values and the threshold values stored at the positions corresponding to the pixel group in the dither matrix. Here, for the dot density conversion table shown in FIG. 35, the same table is referenced even if the pixel group classification number is different, so for the density data of each dot in relation to the representative gradation value, the same density data is also obtained regardless of the classification number. However, the sets of threshold values read from the dither matrix differ for each classification number. This is because the dither matrix is generated with a pattern for which the dots on the image are fixed, or so that there is no degradation of the image quality due to generation with positions gathered close together, the threshold value is set to be as dispersed as possible and as random as possible. Because of this, when viewed as a set of a plurality of threshold values included in the pixel group, there is a very low possibility of having exactly the same combination. From this kind of reason, the multilevel halftoning table referenced with the multilevel halftoning result value generating process of the third embodiment has a different correlation of the representative gradation value and multilevel halftoning result value for each classification number, and the number of times that the multilevel halftoning result value changes (number of levels of multilevel halftoning shown in FIG. 50) is also different according to the classification number.

E-4. Multilevel Halftoning Result Value Generating Process of a Variation Example of the Third Embodiment:

With the multilevel halftoning result value generating process of the third embodiment described above, a multilevel halftoning table is referenced for which the corresponding multilevel halftoning result value is stored for each representative gradation value from gradation value 0 to gradation value 255. However, the multilevel halftoning result values only increase in stepwise fashion according to the increase in the representative gradation values, so if only representative gradation values for which the multilevel halftoning result value is switched are stored, it is possible to find a multilevel halftoning result value in relation to the representative gradation values. Following is described this kind of multilevel halftoning result value generating process of a variation example of the third embodiment.

Figure 57:
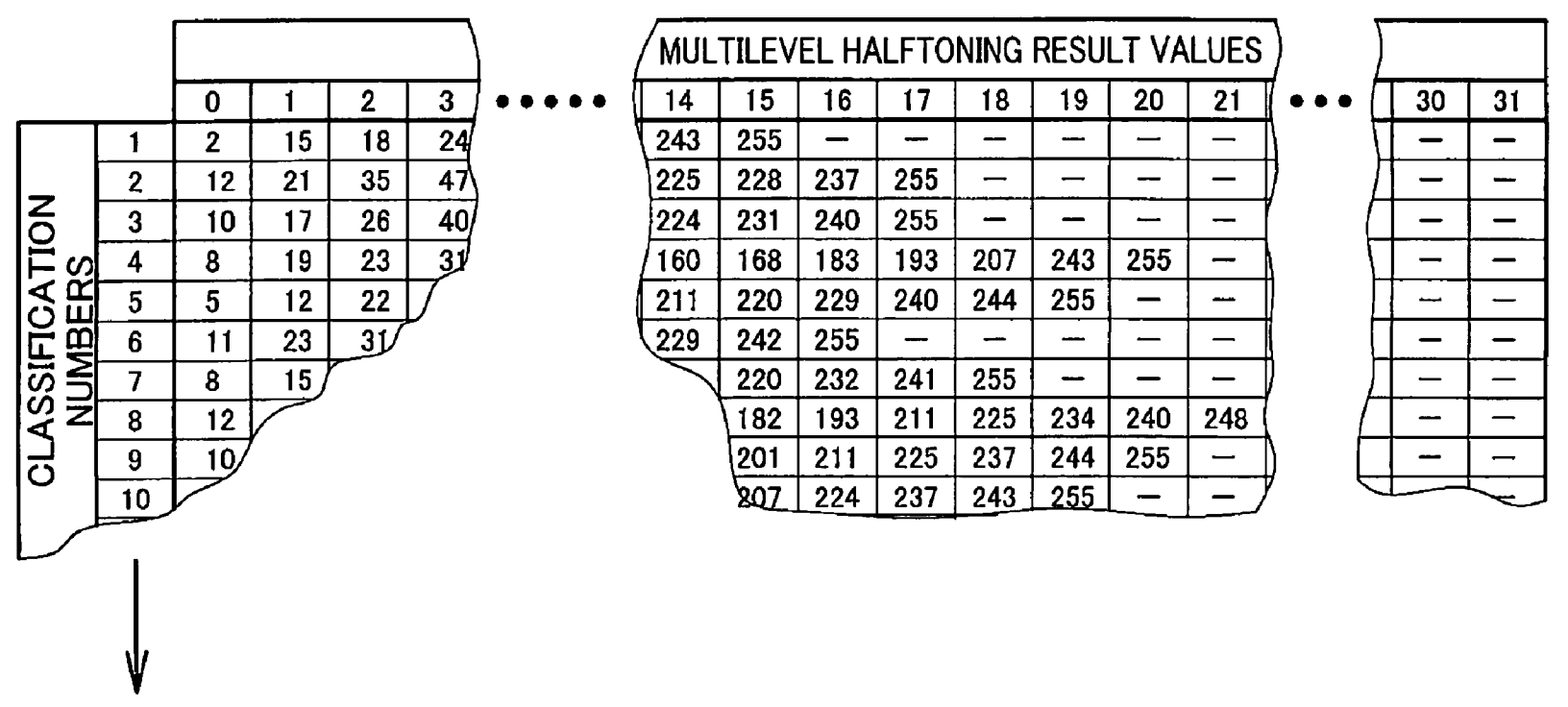

FIG. 57 is an explanatory drawing conceptually showing the threshold value table referenced for the multilevel halftoning result value generating process of a variation example of the third embodiment. As shown in the drawing, in the threshold value table, threshold values corresponding to the multilevel halftoning result values are set for each classification number. This threshold value represents the largest representative gradation value that becomes that multilevel halftoning result value when the representative gradation value is increased from the gradation value 0 to the gradation value 255. As an example, a description is given for the classification number 1 pixel group. For the classification number 1, the threshold value "2" is set for the multilevel halftoning result value "0." This represents that for the pixel groups of the classification number 1, if the representative gradation value is in a range from "0" to "2," the multilevel halftoning result value is "0." Also, the threshold value "15" is set for the multilevel halftoning result value "1." This represents that for the pixel groups of the classification number 1, if the representative gradation value is in a range from "3" to "15," the multilevel halftoning result value is "1." Similarly, the threshold value "243" is set in relation to the multilevel halftoning result value "14," and the threshold value "255" is set in relation to the multilevel halftoning result value "15." This represents that if the representative gradation value is in the range from "244" to "255," the multilevel halftoning result value is "15," and for pixel groups of the classification number 1, the maximum value of the multilevel halftoning result value is "15."

Note that with FIG. 57, the threshold value for each classification number is set corresponding to the respective multilevel halftoning result values. However, it is also possible to simply store a set of threshold values for each classification number without correlating in particular to a multilevel halftoning result value. In this case, it is possible to find the multilevel halftoning result value by counting the number of threshold values smaller than the representative gradation values. A description is now given again using an example of a pixel group of the classification number 1. For example, we will assume that the representative gradation value is "20." The threshold values that are smaller than the gradation value 20 within the set of threshold values set for the classification number 1 are the three values "2," "15," and "18." From this, it is also possible to find that the multilevel halftoning result value is "3" in relation to the representative gradation value 20.

With the multilevel halftoning result value generating process of a variation example of the third embodiment described above, after finding the representative gradation value and the classification number for the pixel group, the multilevel halftoning result values are generated by referencing the threshold value table shown by example in FIG. 57. The threshold value table can be stored using a smaller data volume than the multilevel halftoning table (see FIG. 41) referenced during the multilevel halftoning result value generating process of the third embodiment described previously. Because of this, the multilevel halftoning result value generating process of the variation example can save memory use volume compared to the process of the third embodiment. In contrast to this, the multilevel halftoning result value generating process of the third embodiment described previously can find the multilevel halftoning result value immediately simply by referencing the multilevel halftoning table from the classification number and the representative gradation value. Specifically, since a comparison of the representative gradation value and the threshold value is not necessary as it is with the process of the variation example, so it is possible to do multilevel halftoning rapidly.

E-5. Dot Formation Presence or Absence Setting Process of a Variation Example of the Third Embodiment:

For the dot formation presence or absence setting process of the third embodiment described above, the same as with the first embodiment and the second embodiment described previously, it is possible to set the presence or absence of dot formation more rapidly by referencing the decoding table. Following is described the dot formation presence or absence setting process of a variation example of the third embodiment.

The dot formation presence or absence setting process of a variation example of the third embodiment is almost the same as the dot formation presence or absence setting process of a variation example of the second embodiment described previously except that the referenced decoding table is different. In light of this, the dot formation presence or absence setting process of a variation example of the third embodiment is described making use of the flow chart in FIG. 45 shown for the dot formation presence or absence setting process of a variation example of the second embodiment.

When the dot formation presence or absence setting process of a variation example of the third embodiment is started, one pixel group is selected as the subject, and after the pixel group classification number is obtained, the start data supplied as the multilevel halftoning result value is obtained (correlates to steps S650, S652, and S654). Next, a determination is made of whether or not the obtained data is ESC code (correlates to step S656). When the read data is not ESC code, it is determined that processing is done without dividing the pixel group, and after the read data is reread as multilevel halftoning result values, the decoding table is referenced and the presence or absence of dot formation is set for each pixel in the pixel group (correlates to steps S658 and S660). The decoding table referenced at this time is referenced with the dot formation presence or absence setting process of a variation example of the third embodiment, so is a specially set exclusive table. The method of setting this decoding table is described later.

Meanwhile, when the read data is ESC code, this indicates that processing is done in a state with the pixel group divided. In light of this, a specified number of multilevel halftoning result values stored following the ESC code is obtained (correlates to step S662). Next, the decoding table is referenced, and after the dot data DD relating to the respective multilevel halftoning result values is read, by combining these dot data, the presence or absence of dot formation is set for each pixel in the pixel group (correlates to steps S664 and S666).

It is possible to set the presence or absence of dot formation for each pixel in the selected pixel group by acting as described above. When it is determined that this kind of process is performed for all pixel groups and processing has ended for all the pixel groups (correlates to step S668: yes), the dot formation presence or absence setting process of a variation example of the third embodiment has ended.

For the dot formation presence or absence setting process of a variation example of the third embodiment described above as well, the same as with the dot formation presence or absence setting process of a variation example of the second embodiment described previously, it is possible to rapidly set the presence or absence of dot formation for each pixel from the multilevel halftoning result values, and thus it is possible to rapidly output images.

Finally, a simple description is given of the method of setting the decoding table referenced with the dot formation presence or absence setting process of a variation example of the third embodiment. FIG. 58 is an explanatory drawing showing the state of setting the decoding table for the third embodiment. The method of setting the decoding table for the third embodiment is almost the same as the method of setting the decoding table of the second embodiment described previously using FIG. 48. However, since the multilevel halftoning result values of the third embodiment are values that can first be interpreted with identification of the classification number of the pixel group, so the point that the multilevel halftoning values are converted to data representing the number of large, medium, and small dots for each pixel group is a big difference. Following, a description is given while referring to FIG. 58.

With FIG. 58, with the assumption that the multilevel halftoning result value is "10," shown is the method of setting the respective dot data DD (1, 10) and DD (2, 10) for the classification number 1 pixel group and the classification number 2 pixel. First, one multilevel halftoning result value is selected, and this multilevel halftoning result value is converted to the number of the large, medium, and small dots for each pixel group. Specifically, the multilevel halftoning result value of the third embodiment has different meaning contents for each pixel group classification number, so the multilevel halftoning result values are interpreted for each classification number. The results of interpreting the contents of the multilevel halftoning result values for each classification number are shown in the second level from the top in FIG. 58.

Next, the threshold values set for the blocks corresponding to the respective classification numbers are read from within the dither matrix. The threshold values of each block read in this way are shown in the third level from the top in FIG. 58. Then, according to these threshold values, the positions of the pixels for which these dots are formed in the sequence of large dots, medium dots, and small dots are set. The state of setting the positions of the pixels on which the dots are formed for each pixel group is shown in the fourth level from the top in FIG. 58. In the drawing, large dots are formed at the pixels marked by fine diagonal lines, medium dots are formed at the pixels marked by slightly loose diagonal lines, small dots are formed at the pixels marked by loose diagonal lines, and the pixels not marked by diagonal lines represent that dots are not formed. When the presence of absence of dot formation is set for each pixel in the pixel group in this way, this dot arrangement is expressed by dot data of the data format shown in FIG. 46. Then, the obtained dot data DD is stored in the position corresponding to the combination of the multilevel halftoning result value and the classification number. This kind of operation is performed for the combinations of all the multilevel halftoning result values and all the classification numbers, if the obtained dot data is stored in the applicable location, it is possible to set the decoding table referenced with the dot formation presence or absence setting process of the variation example of the third embodiment.

Above, various embodiments were described, but the invention is not limited to the embodiments noted above, and can be implemented in various aspects in a range that does not stray from the key points. For example, with the embodiments above, described were cases of printing images by forming dots on printing paper, but the scope of the invention is not limited to the case of printing images. For example, by dispersing bright spots at a suitable density on a liquid crystal display screen, it is possible to suitable use the invention for liquid crystal display devices or the like that express images by continuously changing gradations.

What is claimed is:

1. An image processing system that performs specified image processing on image data of a first resolution, and outputs dot data to form dots at a second resolution on a medium based on the results of the image processing, the image processing system comprising:

encoding preparation unit that prepares a plurality of types in advance of encoding correlations to obtain the code values correlated to the results of multilevel halftoning for each pixel constituting the pixel group based on the representative gradation value that is the gradation value representing the pixel group consisting of a specified number of consecutive pixels;

division determination unit that determines whether or not the sequentially fetched pixel groups from the image data are divided into a plurality of areas and processed based on the first resolution and the second resolution;

representative gradation value setting unit that sets the representative gradation value for the entire pixel group when it is determined to process the pixel group without dividing, and that sets the respective representative gradation values for each area into which the pixel group is divided when it is determined to process the pixel group divided into a plurality of areas;

encoding unit that, using the set representative gradation value, obtains the code value for each of the representative gradation values by referencing the encoding correlation allocated to the pixel group that is any one of the plurality of types of encoding correlations;

decoding preparation unit that correlates the decoding correlation for obtaining the output dot arrangement representing the presence or absence of formation of dots for each pixel within the pixel group to the encoding correlation from the code that has a specific range of values and prepares a plurality of types in advance;

decoding unit that references the decoding correlation corresponding to the encoding correlation allocated to the pixel group based on the obtained code value; and obtains the output dot arrangement corresponding to either the representative gradation value for the entire pixel group or the representative gradation values for each of the areas;

dot arrangement setting unit that synthesizes the applicable obtained output dot arrangement if the obtained output dot arrangement corresponds to the entire pixel group, synthesizes the dot arrangement corresponding to each of the areas of the obtained output dot arrangement if it corresponds to each of the areas, and sets the output dot arrangement for each pixel constituting the pixel group; and output unit that outputs the set output dot arrangement as dot data.

2. The image processing system in accordance with claim 1, wherein the encoding preparation unit stores as the code value data of the dot count generated for the pixel group corresponding to the representative gradation value for each of the encoding correlations;

the decoding preparation unit stores sequence values that determine the sequence for forming dots within the pixel group for the encoding correlation to which the decoding correlation is correlated for each of the decoding correlations; and the decoding unit obtains the output dot arrangement using the dot count data received as the code value and the sequence values specified as the decoding correlation.

3. The image processing system in accordance with claim 1, wherein the encoding preparation unit stores the arrangement of the dots generated for the pixel group corresponding to the representative gradation value for each of the encoding correlations with directly identifiable data as the code values;

the decoding preparation unit stores the arrangement of dots formed within the pixel group from the code values for each of the decoding correlations with directly identifiable data as a table; and the decoding unit directly obtains the output dot arrangement by referencing the table based on data received as the code value.

4. The image processing system in accordance with claim 1, further comprising:

dot formation unit that forms dots on a medium for which an image can be formed; and image forming unit that receives the output dot data, and according to this dot data, drives the dot forming unit, and by forming dots on the medium, forms the image.

5. The image processing system in accordance with claim 4, wherein the dot forming unit is capable of forming dots of a plurality of types of different gradation values that can be expressed for each unit dot; and the decoding unit obtains the output dot arrangement for the plurality of types of dots by referencing the decoding correlations based on the obtained code values.

6. The image processing system in accordance with claim 4, wherein at least from the encoding preparation unit to the image forming unit are housed within a single case as a printing device.

7. The image processing system in accordance with claim 4, wherein each unit upstream of the encoding unit is housed within single case as the image processing device;
   each unit downstream of the decoding preparation unit is housed within single case as the printing device; and
   the image processing device and the printing device are connected either by with or without wire to be able to communicate at least the code values.

8. The image processing system in accordance with claim 1, wherein the division determination unit determines whether to do processing with the pixel group divided when the second resolution is a specified magnitude or less than the first resolution.

9. The image processing system in accordance with claim 1, wherein the division unit divides the pixel group into a plurality of equal size areas when it is determined that processing will be done with the pixel group divided.

10. The image processing system in accordance with claim 1, wherein the encoding correlation is defined based on a threshold value group for which a number of threshold values corresponding to the number of pixels contained in the pixel group are collected; and
    the threshold value group is constituted from a plurality of threshold values selected from within a dither matrix, for which threshold values of different values are arranged according to specified characteristics, while sequentially changing the obtaining position.

11. The image processing system in accordance with claim 10, wherein the dither matrix is a global dither matrix for which the number of included threshold values is larger than the gradation count of the image.

12. The image processing system in accordance with claim 10, wherein here;
    in the plurality of encoding correlations, the classification number that specifies each correlation is given according to the obtaining position of the threshold value from the dither matrix; and
    the decoding unit determines the classification number of the encoding correlation used for obtaining the code value according to the position of the pixel group in the image, and obtains the dot arrangement according to the decoding correlation set by the classification number.

13. An image processing device that processes image data of a first resolution, the image processing device sending control data obtained by processing the image data to an image output device that outputs an image for which dots are formed at a second resolution, the image processing device comprising:
    encoding preparation unit that prepares a plurality of types in advance of encoding correlations to obtain the code values correlated to the results of multilevel halftoning for each pixel constituting the pixel group based on the representative gradation value that is the gradation value representing the pixel group consisting of a specified number of consecutive pixels;
    division determination unit that determines whether or not the sequentially obtained pixel groups from the image data are divided into a plurality of areas and processed based on the first resolution and the second resolution;
    representative gradation value setting unit that sets the representative gradation value for the entire pixel group when it is determined to process the pixel group without dividing, and that sets the respective representative gradation values for each area into which the pixel group is divided when it is determined to process the pixel group divided into a plurality of areas;
    encoding unit that, using the set representative gradation value, obtains the code value for each of the representative gradation values by referencing the encoding correlation allocated to the pixel group that is any one of the plurality of types of encoding correlations; and
    control data sending unit that sends the code value as the control data to the image output device.

14. The image processing device in accordance with claim 13, wherein the division determination unit determines that the pixel group is divided and processed when the second resolution is a specified multiple or lower than the first resolution.

15. The image processing device in accordance with claim 13, wherein the division unit divides the pixel group into a plurality of equal sized areas when it is determined that the pixel group is to be divided and processed.

16. An image output device that receives a code value obtained with performance of multilevel halftoning processing on image data that has a pixel group consisting of a plurality of pixels as a unit, and converts this to data of the dots to be formed on the medium,
    the code value is generated by referencing one correlation selected from a plurality of encoding correlations prepared in advance for the multilevel halftoning results of the representative gradation value that is the gradation value representing the pixel group and each pixel constituting the pixel group, based on the representative gradation value that represents the gradation of the pixel group or the gradation of each area for which the pixel group is divided into a plurality;
    and the image output device comprises:
        decoding preparation unit that receives a code value that has a specified range of values, correlates the decoding correlation for obtaining the output dot arrangement representing the presence or absence of formation of dots for each pixel within the pixel group to the encoding correlation from the code value, and prepares a plurality of types in advance;
        decoding unit that references the decoding correlation corresponding to the encoding correlation allocated to the pixel group based on the obtained code value, and obtains the output dot arrangement corresponding to either the representative gradation value of the entire pixel group or the representative gradation values for each of the areas;
        dot arrangement setting unit that synthesizes the applicable obtained output dot arrangement if the obtained output dot arrangement corresponds to the entire pixel group, synthesizes the dot arrangement corresponding to each of the areas of the obtained output dot arrangement if it corresponds to each of the areas, and sets the output dot arrangement for each pixel constituting the pixel group; and
        output unit that outputs the set output dot arrangement as dot data.

17. The image output device in accordance with claim 16, wherein the decoding preparation unit prepares correlations of at least 100 types or more as the decoding correlations to be able to be referenced based on the code values.

18. The image output device in accordance with claim 16, wherein the decoding preparation unit prepares correlations for which, when the number of pixels contained in the pixel group is N, the decoding correlation number of types P is $$P \times N \geq 1000$$

and these can be referenced based on the code values.

19. The image output device in accordance with claim 16, wherein each of the encoding correlations is a correlation for which the data of the number of dots formed in the pixel group is correlated to the representative gradation value and output as the code value;
    the decoding preparation unit stores sequential values for which the dot formation sequence is set within the pixel group for the encoding correlation to which the decoding correlation is correlated for each of the decoding correlations; and
    the decoding unit obtains the output dot arrangement using the data of the dot count received as the code values and the sequential values specified as the decoding correlations.

20. The image output device in accordance with claim 16, wherein
    each of the encoding correlations is a correlation for which the directly identifiable data of the arrangement of dots generated for the pixel group is correlated to the representative gradation value and output as the code value;
    the decoding preparation unit stores as a table directly identifiable data of the arrangement of dots within the pixel group from the code values for each of the decoding correlations; and
    the decoding unit directly obtains the output dot arrangement by referencing the table based on data received as the code value.

21. The image output device in accordance with claim 16, further comprising:
    dot forming unit that forms dots on a medium on which it is possible to form an image; and
    image forming unit that receives the output dot data, and according to the dot data, drives the dot forming unit, and by forming dots on the medium, forms the image.

22. A computer-implemented image processing method that performs specified image processing on image data of a first resolution, and outputs dot data for forming dots of a second resolution on a medium based on the image processing results, the method comprising:
    preparing a plurality of types in advance of encoding correlations to obtain the code values correlated to the results of multilevel halftoning for each pixel constituting the pixel group based on the representative gradation value that is the gradation value representing the pixel group consisting of a specified number of consecutive pixels, and of decoding correlations correlated to the encoding correlations that are decoding correlations for obtaining the output dot arrangement representing the presence or absence of dot formation for each pixel within the pixel group from the code value that has a value in a specified range;
    determining whether or not the sequentially fetched pixel groups from the image data are divided into a plurality of areas and processed based on the first resolution and the second resolution;
    setting the representative gradation value for the entire pixel group when it is determined to process the pixel group without dividing, and setting the respective representative gradation values for each area into which the pixel group is divided when it is determined to process the pixel group divided into a plurality of areas;
    obtaining the code value for each of the representative gradation values by referencing the encoding correlation allocated to the pixel group that is any one of the plurality of types of encoding correlations, using the set representative gradation value;
    referencing the decoding correlation corresponding to the encoding correlation allocated to the pixel group based on the obtained code value, and obtaining the output dot arrangement corresponding to either the representative gradation value for the entire pixel group or the representative gradation values for each of the areas;
    synthesizing the applicable obtained output dot arrangement if the obtained output dot arrangement corresponds to the entire pixel group, synthesizes the dot arrangement corresponding to each of the areas of the obtained output dot arrangement if it corresponds to each of the areas, and setting the output dot arrangement for each pixel constituting the pixel group; and
    outputting the set output dot arrangement as dot data,
    wherein each operation of the image processing method is executed by a processor.

23. A computer-implemented method that processes image data of a first resolution, and the method sends control data obtained by processing the image data to the image output device that outputs an image formed by dots of a second resolution, the method comprising:
    preparing a plurality of types in advance of encoding correlations to obtain the code values correlated to the results of multilevel halftoning for each pixel constituting the pixel group based on the representative gradation value that is the gradation value representing the pixel group consisting of a specified number of consecutive pixels;
    determining whether or not the sequentially fetched pixel groups from the image data are divided into a plurality of areas and processed based on the first resolution and the second resolution;
    setting the representative gradation value for the entire pixel group when it is determined to process the pixel group without dividing, and setting the respective representative gradation values for each area into which the pixel group is divided when it is determined to process the pixel group divided into a plurality of areas;
    obtaining the code value for each of the representative gradation values by referencing the encoding correlation allocated to the pixel group that is any one of the plurality of types of encoding correlations, using the set representative gradation value; and
    sending the code value as the control data to the image output device:
    wherein each operation of the method is executed by a processor.

24. A computer-implemented image conversion method that receives a code value obtained with performance of multilevel halftoning processing on image data that has a pixel group consisting of a plurality of pixels as a unit, and converts this to data of the dots to be formed on the medium wherein,
    the code value is generated by referencing one correlation selected from a plurality of encoding correlations prepared in advance for the multilevel halftoning results of the representative gradation value that is the gradation value representing the pixel group and each pixel constituting the pixel group, based on the representative gradation value that represents the gradation of the pixel group or the gradation of each area for which the pixel group is divided into a plurality;

the method comprising:

receiving a code value that has a specified range of values, correlates the decoding correlation, for obtaining the output dot arrangement representing the presence or absence of formation of dots for each pixel within the pixel group to the encoding correlation from the code value, and preparing a plurality of types in advance;

referencing the decoding correlation corresponding to the encoding correlation allocated to the pixel group based on the obtained code value, and obtaining the output dot arrangement corresponding to either the representative gradation value of the entire pixel group or the representative gradation values for each of the areas;

synthesizing the applicable obtained output dot arrangement if the obtained output dot arrangement corresponds to the entire pixel group, synthesizing the dot arrangement corresponding to each of the areas of the obtained output dot arrangement if it corresponds to each of the areas, and setting the output dot arrangement for each pixel constituting the pixel group; and outputting the set output dot arrangement as dot data;

wherein each operation of the image conversion method is executed by a processor.

25. A program product that realizes using a computer a method that performs specified image processing on image data of a first resolution, and outputs dot data for forming dots of a second resolution on a medium based on the image processing results, consisting of a computer readable recording medium and a program code recorded on the recording medium;

the recording medium stores a plurality of types in advance of encoding correlations to obtain the code values correlated to the results of multilevel halftoning for each pixel constituting the pixel group based on the representative gradation value that is the gradation value representing the pixel group consisting of a specified number of consecutive pixels, and of decoding correlations correlated to the encoding correlations that are decoding correlations for obtaining the output dot arrangement representing the presence or absence of dot formation for each pixel within the pixel group from the code value that has a value in a specified range, and;

the program code comprises:

a first program code that determines whether or not the sequentially fetched pixel groups from the image data are divided into a plurality of areas and processed based on the first resolution and the second resolution;

a second program code that sets the representative gradation value for the entire pixel group when it is determined to process the pixel group without dividing, and sets the respective representative gradation values for each area into which the pixel group is divided when it is determined to process the pixel group divided into a plurality of areas;

a third program code that, using the set representative gradation value, obtains the code value for each of the representative gradation values by referencing the encoding correlation allocated to the pixel group that is any one of the plurality of types of encoding correlations;

a fourth program code that references the decoding correlation corresponding to the encoding correlation allocated to the pixel group based on the obtained code value, and obtains the output dot arrangement corresponding to either the representative gradation value for the entire pixel group or the representative gradation values for each of the areas;

a fifth program code that synthesizes the applicable obtained output dot arrangement if the obtained output dot arrangement corresponds to the entire pixel group, synthesizes the dot arrangement corresponding to each of the areas of the obtained output dot arrangement if it corresponds to each of the areas, and sets the output dot arrangement for each pixel constituting the pixel group; and a sixth program code that outputs the set output dot arrangement as dot data.

26. A program product that realizes using a computer a method that processes image data of a first resolution, and the method sends control data obtained by processing the image data to the image output device that outputs an image formed by dots of a second resolution, consisting of a computer readable recording medium and a program code recorded on the recording medium;

the recording medium stores a plurality of types in advance of encoding correlations to obtain the code values correlated to the results of multilevel halftoning for each pixel constituting the pixel group based on the representative gradation value that is the gradation value representing the pixel group consisting of a specified number of consecutive pixels, and;

the program code comprises:

a first program code that determines whether or not the sequentially fetched pixel groups from the image data are divided into a plurality of areas and processed based on the first resolution and the second resolution;

a second program code that sets the representative gradation value for the entire pixel group when it is determined to process the pixel group without dividing, and sets the respective representative gradation values for each area into which the pixel group is divided when it is determined to process the pixel group divided into a plurality of areas;

a third program code that, using the set representative gradation value, obtains the code value for each of the representative gradation values by referencing the encoding correlation allocated to the pixel group that is any one of the plurality of types of encoding correlations; and a fourth program code that sends the code value as the control data to the image output device.

27. A program product that realizes using a computer a method that receives a code value obtained with performance of multilevel halftoning processing on image data that has a pixel group consisting of a plurality of pixels as a unit, and converts this to data of the dots to be formed on the medium, consisting of a computer readable recording medium and a program code recorded on the recording medium;

the code value is generated by referencing one correlation selected from a plurality of encoding correlations prepared in advance for the multilevel halftoning results of the representative gradation value that is the gradation value representing the pixel group and each pixel constituting the pixel group, based on the representative gradation value that represents the gradation of the pixel group or the gradation of each area for which the pixel group is divided into a plurality;

the recording medium stores a plurality of types prepared in advance for which a code value is received that has a specified range of values, and the decoding correlation for obtaining the output dot arrangement representing the presence or absence of formation of dots for each pixel within the pixel group is correlated to the encoding correlation from the code value, and;

the program code comprises:

a first program code that references the decoding correlation corresponding to the encoding correlation allocated to the pixel group based on the obtained code value, and obtains the output dot arrangement corresponding to either the representative gradation value of the entire pixel group or the representative gradation values for each of the areas;

a second program code that synthesizes the applicable obtained output dot arrangement if the obtained output dot arrangement corresponds to the entire pixel group, synthesizes the dot arrangement corresponding to each of the areas of the obtained output dot arrangement if it corresponds to each of the areas, and sets the output dot arrangement for each pixel constituting the pixel group; and a third program code that outputs the set output dot arrangement as dot data.

* * * * *